US012371203B2

(12) United States Patent
Howe et al.

(10) Patent No.: US 12,371,203 B2
(45) Date of Patent: Jul. 29, 2025

(54) VERTICAL AIR VEHICLE TAKEOFF AND LANDING STABILIZATION APPARATUSES, SYSTEMS, AND METHODS

(71) Applicant: The Boeing Company, Arlington, VA (US)

(72) Inventors: Wayne Richard Howe, Irvine, CA (US); Terrance Mason, Pasadena, CA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/637,856

(22) Filed: Apr. 17, 2024

(65) Prior Publication Data

US 2024/0278945 A1 Aug. 22, 2024

Related U.S. Application Data

(63) Continuation of application No. 17/588,477, filed on Jan. 31, 2022, now Pat. No. 11,993,409.

(Continued)

(51) Int. Cl.
*B60L 53/00* (2019.01)
*B60L 53/16* (2019.01)
(Continued)

(52) U.S. Cl.
CPC ............... *B60L 53/00* (2019.02); *B60L 53/16* (2019.02); *B64U 30/299* (2023.01); *B64U 70/30* (2023.01);
(Continued)

(58) Field of Classification Search
CPC ........ B64U 70/97; B64U 70/90; B64U 70/95; B64U 70/70
See application file for complete search history.

(56) References Cited

U.S. PATENT DOCUMENTS

| 2,225,525 A | 12/1940 | Pitcairn |
| 6,464,459 B2 | 10/2002 | Illingworth |

(Continued)

FOREIGN PATENT DOCUMENTS

| CN | 201023656 Y | 2/2008 |
| CN | 102756805 A | 10/2012 |

(Continued)

OTHER PUBLICATIONS

EP Search Report mailed Aug. 2, 2022 in re EP Application No. 22160429.1.

(Continued)

*Primary Examiner* — Ashesh Dangol
(74) *Attorney, Agent, or Firm* — COATS & BENNETT, PLLC

(57) ABSTRACT

Vertical takeoff and landing vehicles (VTOLs) of the type used for the point-to-point delivery and transport of payloads (e.g., packages, equipment, etc.) and personnel, are significantly stabilized at least during takeoff and landing with present aspects significantly ameliorating or significantly eliminating destabilizing effects, including ground effect, during VTOL takeoff and/or landing. VTOL performance is further improved through the use of increased lift pressure and battery charging during takeoff.

20 Claims, 45 Drawing Sheets

Related U.S. Application Data

(60) Provisional application No. 63/167,248, filed on Mar. 29, 2021.

(51) Int. Cl.
  *B64U 10/14* (2023.01)
  *B64U 30/299* (2023.01)
  *B64U 70/30* (2023.01)
  *B64U 70/70* (2023.01)
  *B64U 101/64* (2023.01)

(52) U.S. Cl.
  CPC .......... *B64U 70/70* (2023.01); *B60L 2200/10* (2013.01); *B64U 10/14* (2023.01); *B64U 2101/64* (2023.01)

(56) References Cited

U.S. PATENT DOCUMENTS

| | | | |
|---|---|---|---|
| 6,616,094 | B2 | 9/2003 | Illingworth |
| 7,530,318 | B2 | 5/2009 | Kristiansen |
| 8,286,909 | B2 | 10/2012 | Lee |
| 8,910,903 | B2 | 12/2014 | Zhu |
| 9,745,047 | B2 | 8/2017 | Zhu |
| 10,131,423 | B2 | 11/2018 | Geise et al. |
| 10,434,885 | B2 | 10/2019 | Antonini et al. |
| 2004/0244633 | A1 | 12/2004 | Witmer |
| 2010/0076625 | A1 | 3/2010 | Yoeli |
| 2011/0024553 | A1 | 2/2011 | Choi |
| 2013/0140404 | A1 | 6/2013 | Parks |
| 2013/0313364 | A1 | 11/2013 | Shachor et al. |
| 2015/0008280 | A1 | 1/2015 | Smoker |
| 2016/0144956 | A1 | 5/2016 | Parks |
| 2016/0200438 | A1 | 7/2016 | Bokeno et al. |
| 2016/0208742 | A1 | 7/2016 | Pande |
| 2017/0175564 | A1 | 6/2017 | Schlak |
| 2017/0203839 | A1 | 7/2017 | Giannini et al. |
| 2018/0156616 | A1 | 6/2018 | Bennett et al. |
| 2018/0370653 | A1* | 12/2018 | Fujita .................... B64U 70/97 |
| 2019/0133363 | A1 | 5/2019 | Burchat |
| 2019/0202578 | A1 | 7/2019 | Fox et al. |
| 2019/0241282 | A1 | 8/2019 | Strobel |
| 2019/0270526 | A1 | 9/2019 | Hehn et al. |
| 2019/0276147 | A1 | 9/2019 | Lee |
| 2019/0383052 | A1 | 12/2019 | Blake et al. |
| 2020/0003529 | A1* | 1/2020 | Benezra ................. B64U 80/70 |
| 2020/0031466 | A1 | 1/2020 | Anderson |
| 2020/0290752 | A1 | 9/2020 | Kolosiuk |
| 2021/0276735 | A1* | 9/2021 | Raptopoulos .......... A47G 29/14 |
| 2021/0387744 | A1* | 12/2021 | Melamed ................. B64F 1/04 |

FOREIGN PATENT DOCUMENTS

| | | |
|---|---|---|
| CN | 206552260 U | 10/2017 |
| CN | 207208447 U | 4/2018 |
| CN | 207631474 U | 7/2018 |
| CN | 108473194 A | 8/2018 |
| CN | 108715223 A | 10/2018 |
| CN | 110884660 A | 3/2020 |
| EP | 2279944 A1 | 2/2011 |
| GB | 2543816 A | 5/2017 |
| KR | 20100094056 A | 8/2010 |
| KR | 102403431 B1 | 6/2022 |
| MX | 2014014172 A | 12/2015 |
| WO | 1994020741 A1 | 9/1994 |
| WO | 2014025444 A2 | 2/2014 |
| WO | 2016137982 A1 | 9/2016 |
| WO | 2017106376 A1 | 6/2017 |
| WO | 2017155348 A1 | 9/2017 |
| WO | 2018209911 A1 | 11/2018 |
| WO | 2021023795 A1 | 2/2021 |

OTHER PUBLICATIONS

EP Search Report mailed Aug. 2, 2022 in re EP Application No. 22160425.9.

EP Search Report mailed Aug. 2, 2022 in re EP Application No. 22160423.4.

* cited by examiner

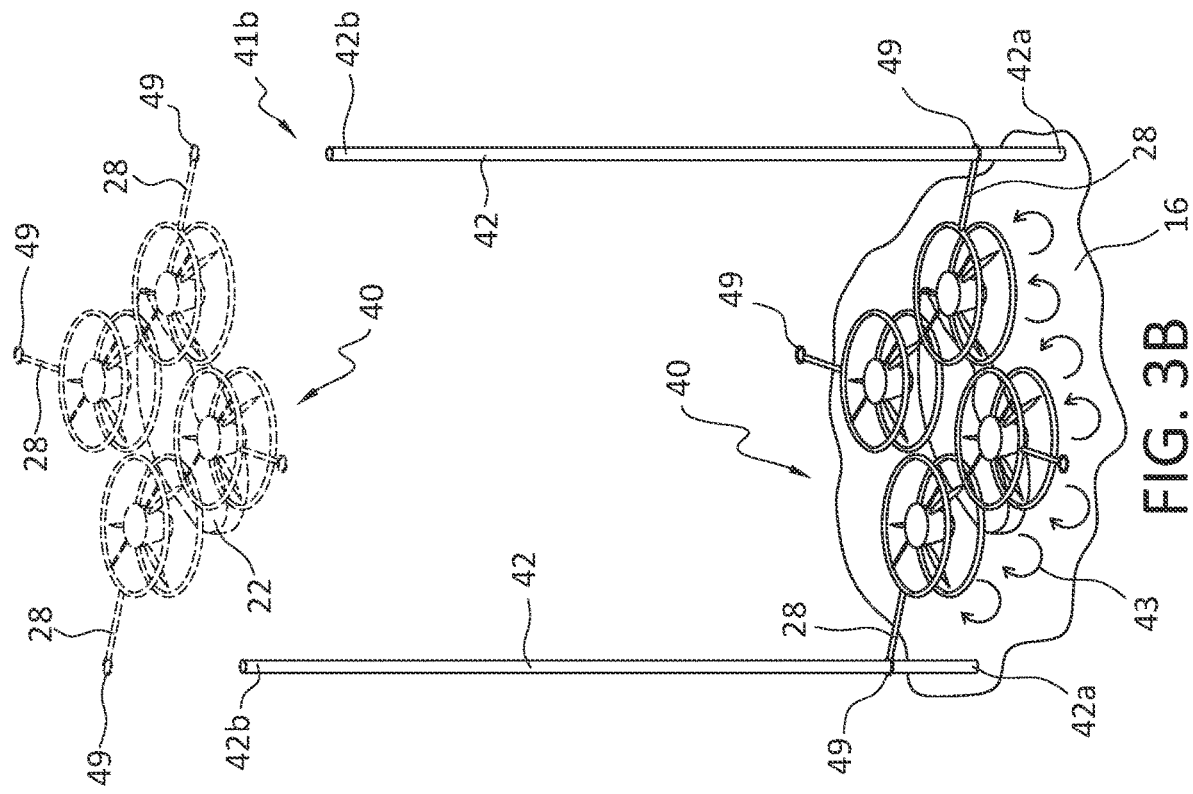
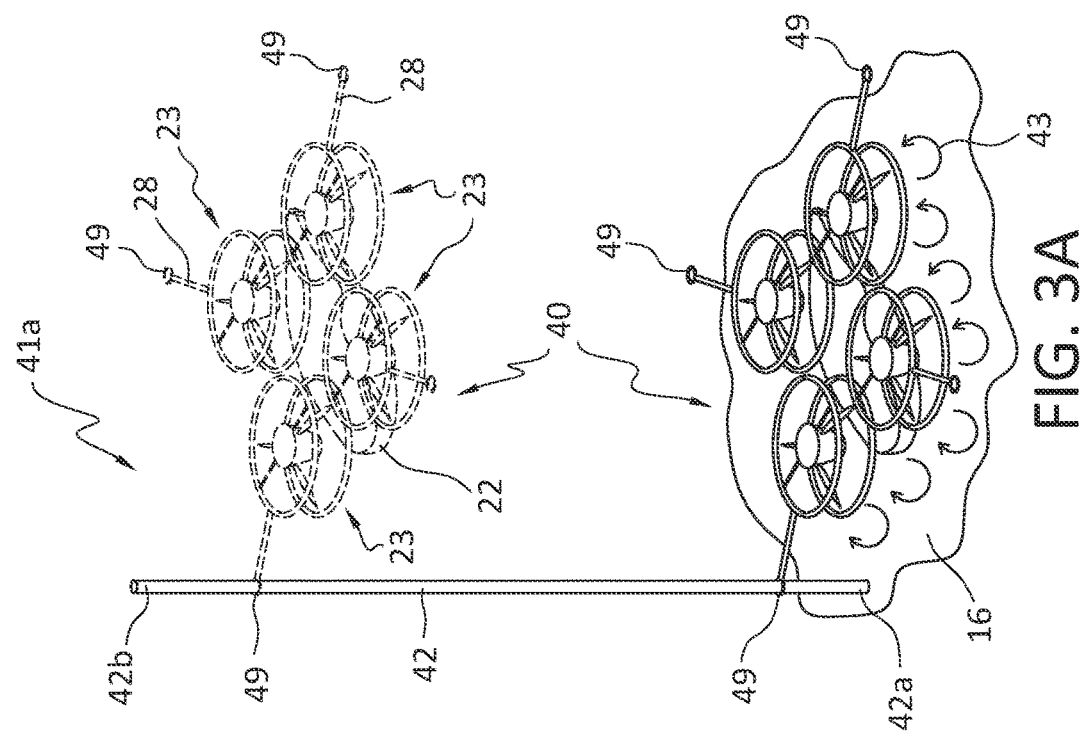

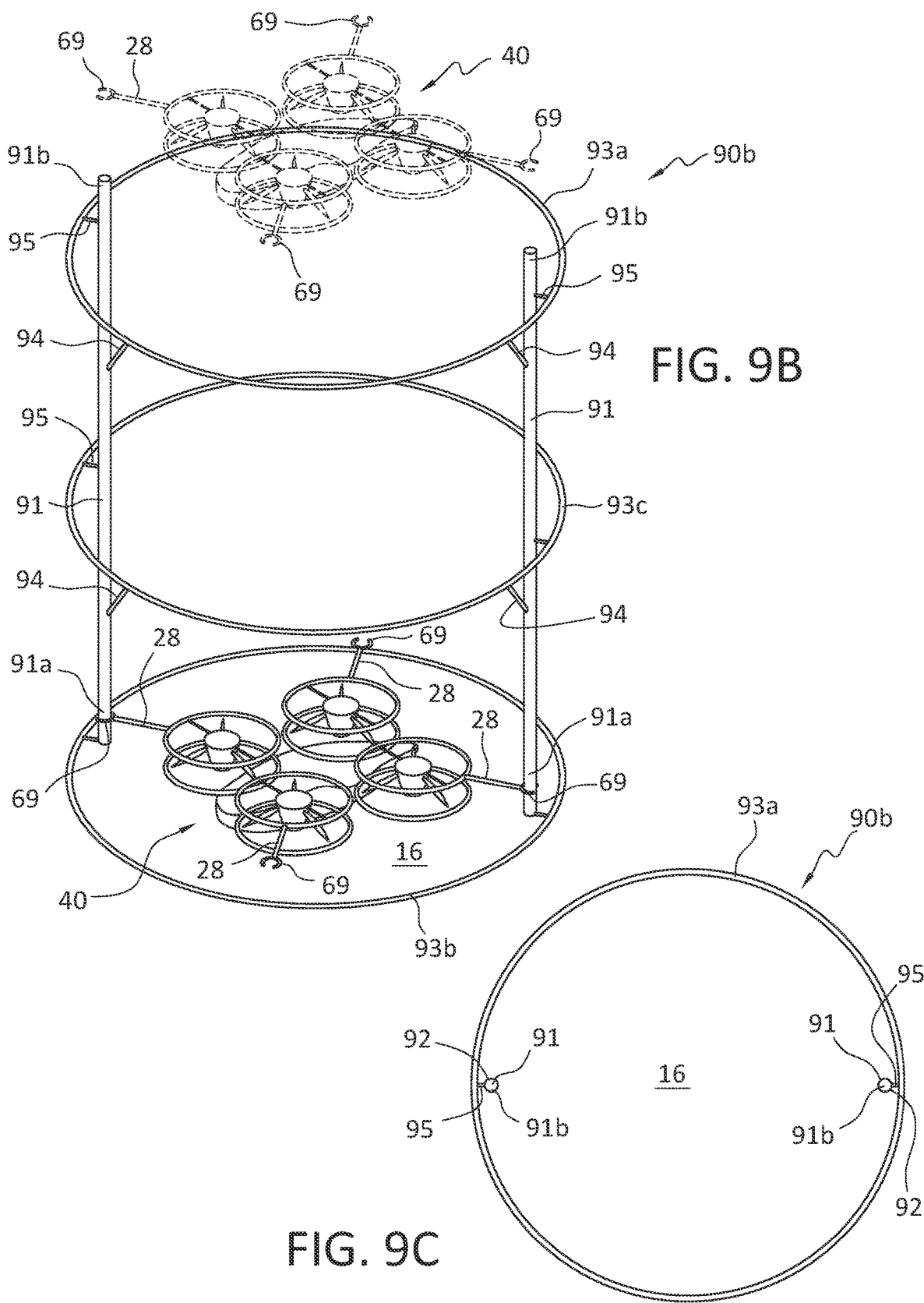

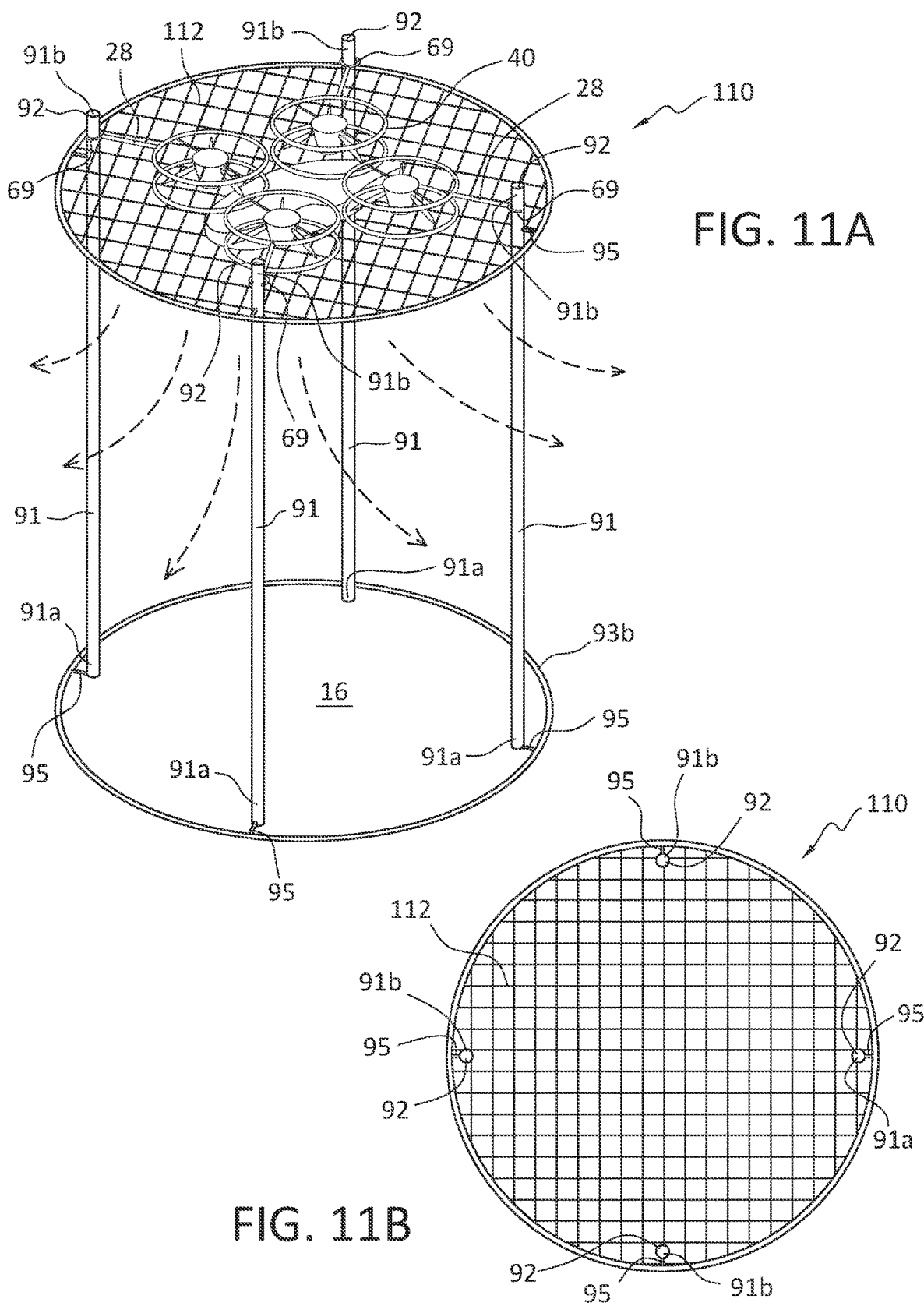

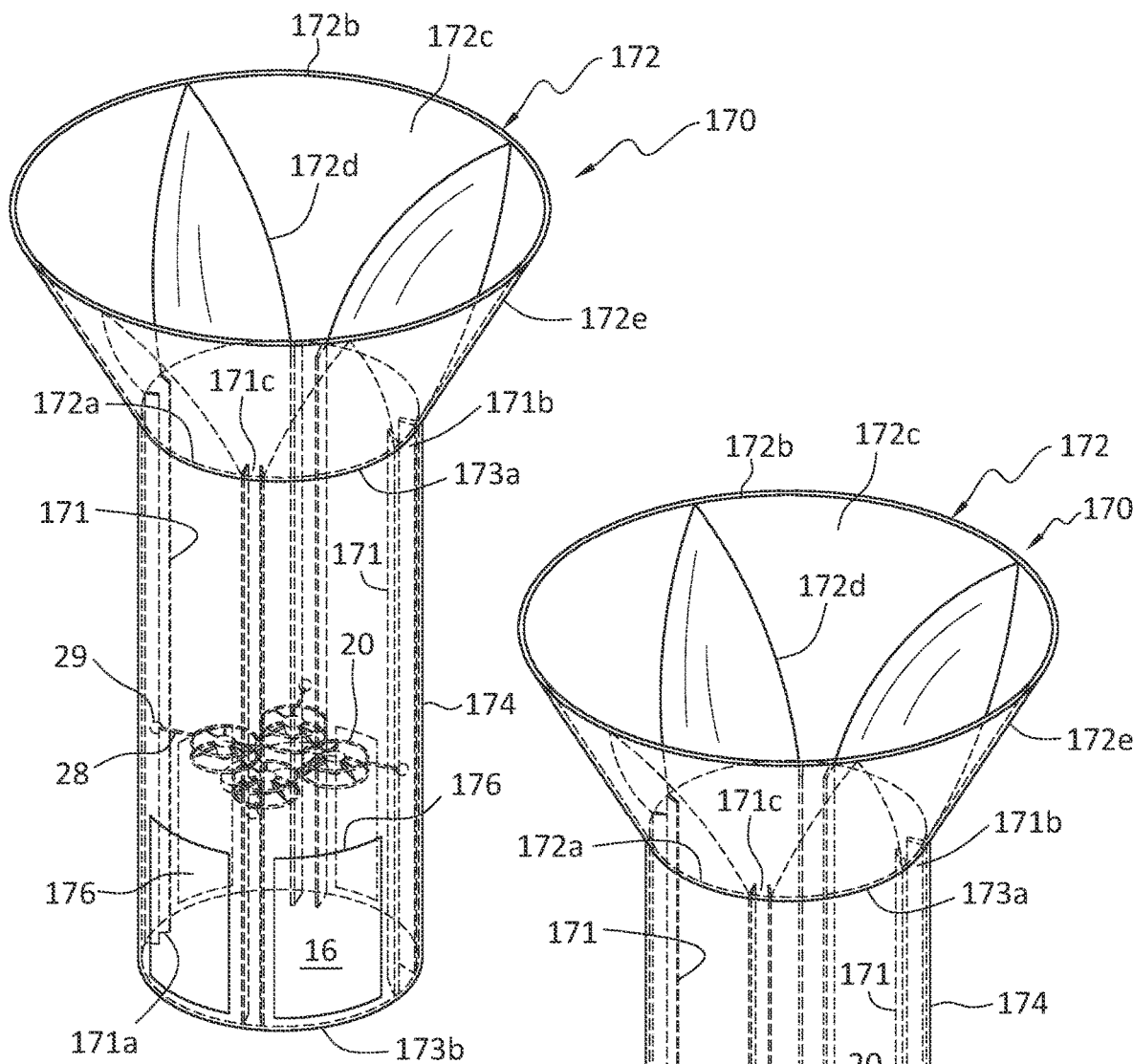
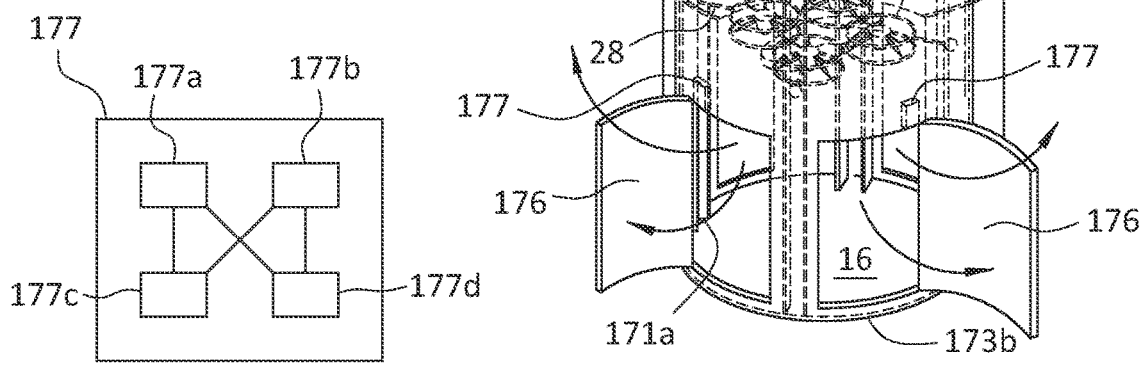
FIG. 17A  FIG. 17C  FIG. 17B

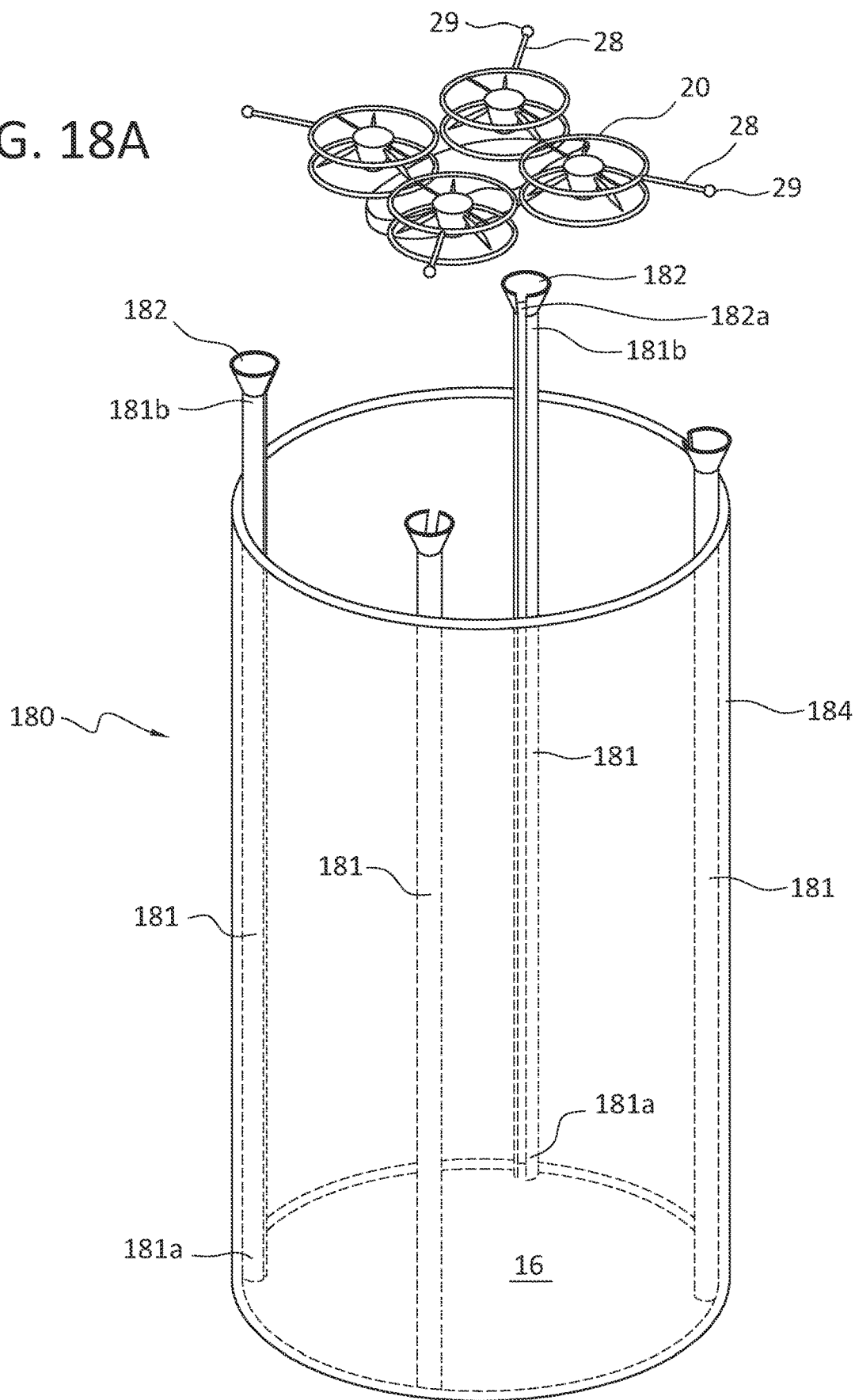

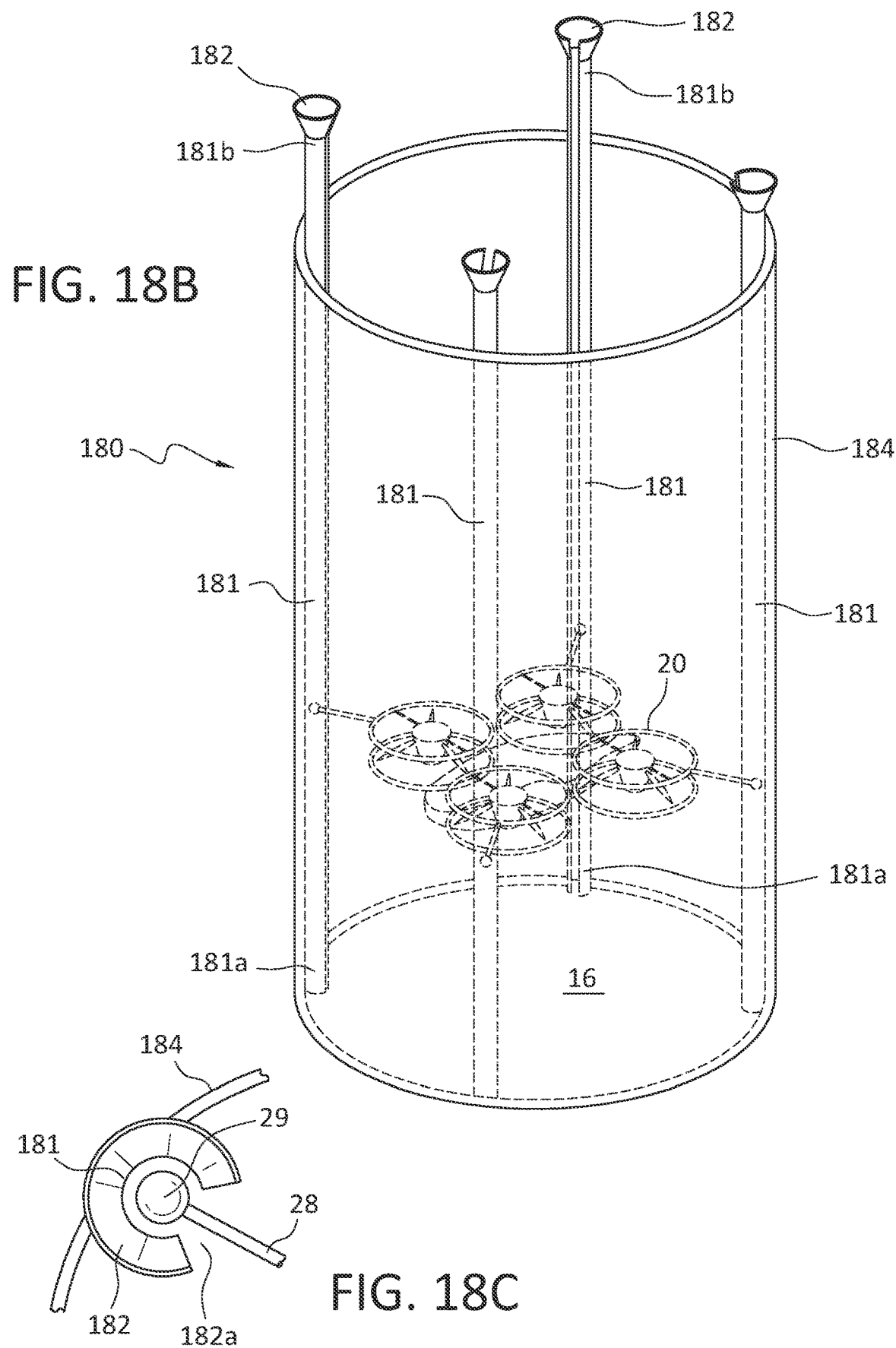

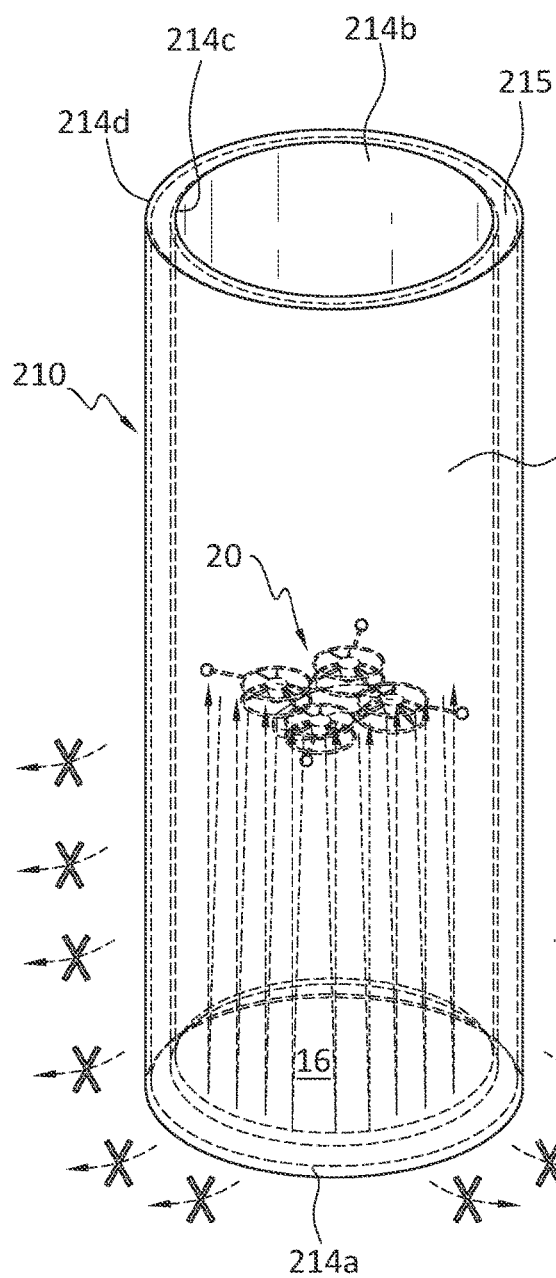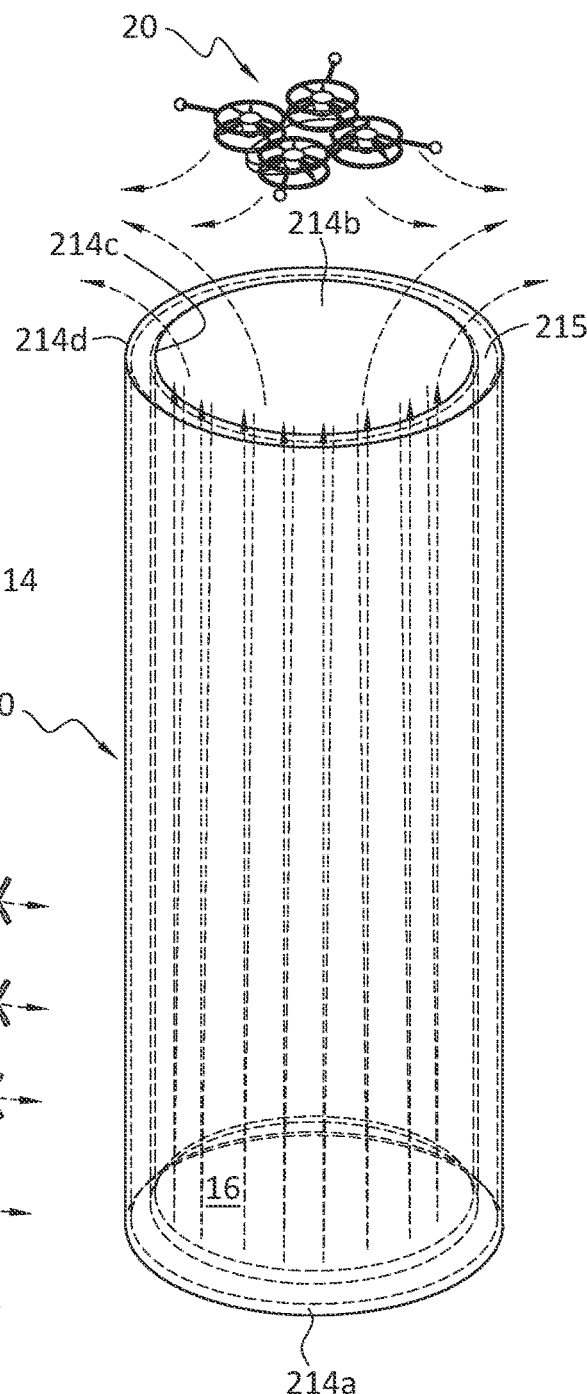
FIG. 21
FIG. 22

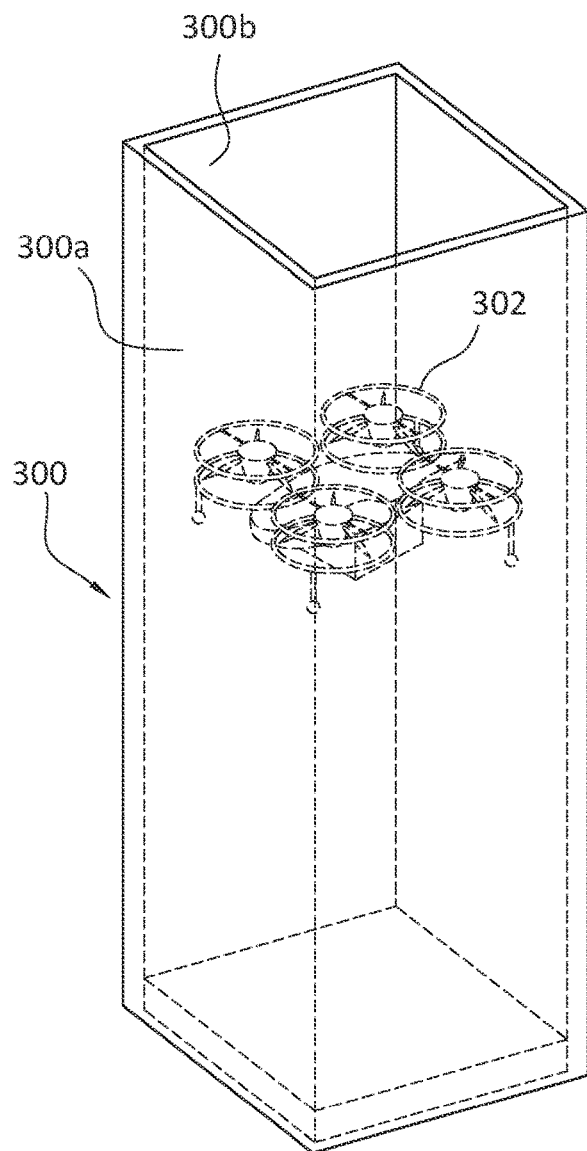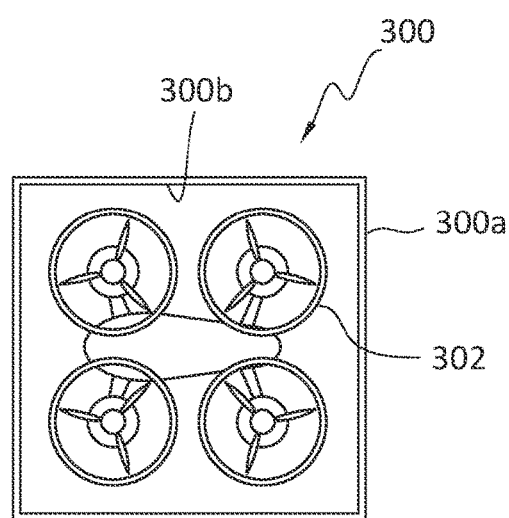
FIG. 34A
FIG. 34B

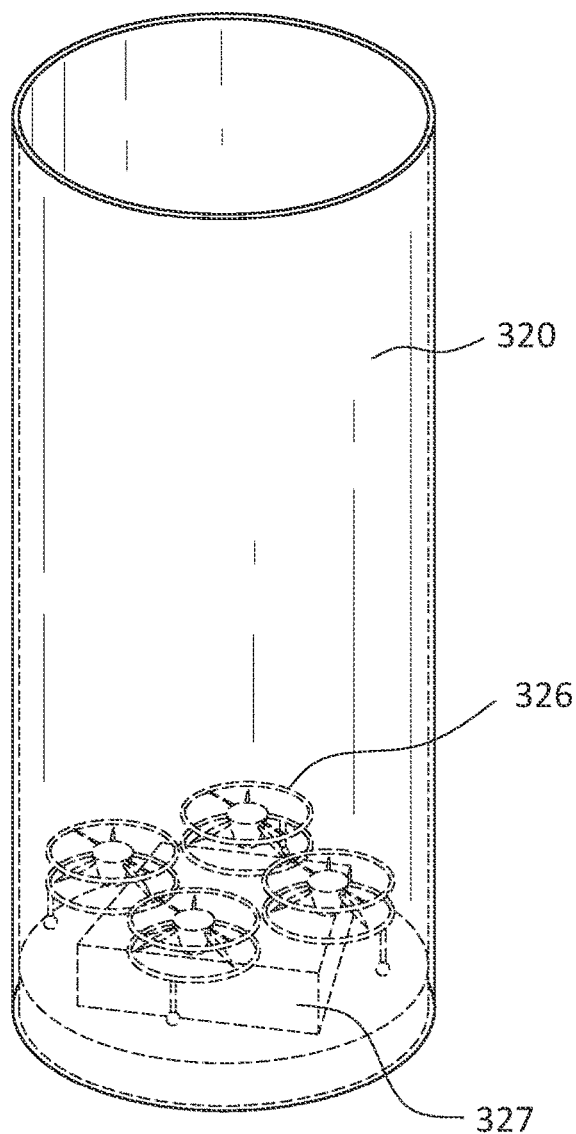
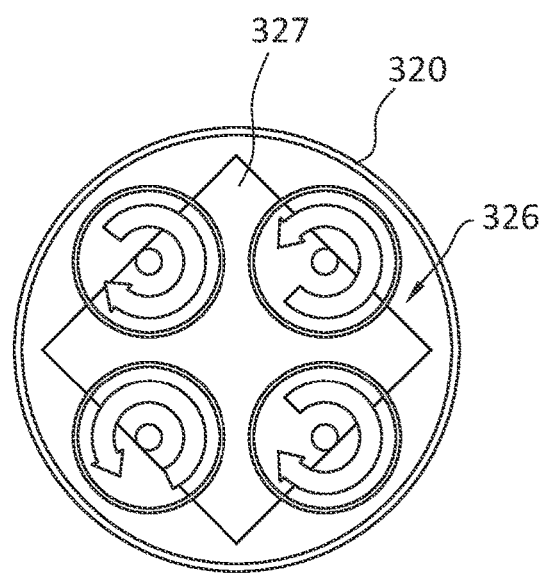
FIG. 41A
FIG. 41B

VERTICAL AIR VEHICLE TAKEOFF AND LANDING STABILIZATION APPARATUSES, SYSTEMS, AND METHODS

RELATED APPLICATIONS

This application is a continuation of U.S. patent application Ser. No. 17/588,477 filed Jan. 31, 2022 issued May 28, 2024 as U.S. Pat. No. 11,993,409, that claims priority to U.S. Provisional Patent Application Ser. No. 63/167,248 filed on Mar. 29, 2021, the entire contents of both of which are incorporated herein by reference.

TECHNOLOGICAL FIELD

The present disclosure relates generally to the field of vertical lift-off and vertical descent air vehicles. More specifically, the present disclosure relates to improving the use of vertical lift-off and vertical descent vehicles in proximity to inhabited locations.

BACKGROUND

The demand for point-to-point delivery of packages, payloads, and personnel has increased the potential need for air vehicles used for such delivery and personnel transportation. Rotor-driven aircraft (e.g., rotorcraft), including non-crewed smaller-scale rotorcraft collectively referred to as "drones" are typically vertical lift-off and vertical descent vehicles that create the lift required for flight by engaging one or more powerful rotors. Such "vertical air vehicles" can create significant air turbulence, noise, and safety issues during takeoff and landing, and otherwise adversely impact structures and people located at ground level during, for example, takeoff and landing. In addition, the vehicles themselves can incur damage due to instability due to ground effect turbulence during takeoff and landing. These issues and others have become impediments to the mass adoption of air vehicles in inhabited areas for delivery services and personnel transport. Unless explicitly identified as such, no statement herein is admitted as prior art merely by its inclusion in the Technological Field and/or Background section.

SUMMARY

Transport of and delivery of cargo and personnel can facilitate point-to-point via use of aircraft that does not require significant space for takeoff and landing. Accordingly, vertical air vehicles referred to equivalently herein as "vertical takeoff and landing vehicles" (VTOLs), including rotorcraft, that obviate the need for runways, etc., to achieve the lift required to become airborne offer many advantages. However, drawbacks to an increased adoption of VTOLs, including commercial use of VTOLs, include increased localized noise, ground effect from the rotors, safety issues, likelihood of incurring damage to VTOLs or land-based structures during takeoff and landing, etc. In addition, various factors can impact VTOL stability, flight, and performance during takeoff and landing, including wind gusts, etc. Present methods, systems, and apparatuses address, significantly ameliorate, and/or eliminate drawbacks to the widespread (e.g., commercial) adoption of VTOLs, and further facilitate the increased use of VTOLs, including a widespread adoption of VTOLs in inhabited areas, including inhabited areas having dense human populations.

According to present aspects, a method for stabilizing takeoff and landing of a vertical takeoff and landing vehicle, with the method including providing an at least partially enclosed vertical takeoff and landing apparatus, with the at least partially enclosed vertical takeoff and landing apparatus including a vertically-oriented support element, with the vertically-oriented support element having a vertically-oriented support element first end and a vertically-oriented support element second end, with the vertically-oriented support element first end proximate to a base, with the vertically-oriented support element extending from the vertically-oriented support element first end to the vertically-oriented support element second end, with the vertically-oriented support element second end located at a selected distance away from the vertically-oriented support element first end, with the vertically-oriented support element comprising a first cooperating stabilizer element, and with the first cooperating stabilizer element located proximate to or integral with the vertically-oriented support element second end, and an enclosure, with the enclosure comprising an enclosure inner surface, and with the enclosure dimensioned to substantially surround the at least one vertically-oriented support element. The apparatus further includes an electric charging element, with the electric charging element in communication with a power supply, and with the charging element including at least one charging element contact that can be a charging element surface. The method further includes providing a vertical takeoff and landing vehicle, with the vertical takeoff and landing vehicle comprising at least one second cooperating stabilizer element, with the second cooperating stabilizer element dimensioned to engage with the first cooperating stabilizer element, and with the vertical takeoff and landing vehicle further including a rechargeable battery, and at least one vehicle electrical contact in communication with the rechargeable battery, with the at least one electrical contact configured to engage the charging element charging contact. The method further includes engaging the first cooperating stabilizer element of the vertically-oriented support element with the second cooperating stabilizer element of the vertical takeoff and landing vehicle, and delivering an electric charge from the electric charging element to the vertical takeoff and landing vehicle.

In another aspect, the enclosure is in direct communication with the vertically-oriented support element.

In a further aspect, the enclosure comprises at least one moveable panel, with the moveable panel configured to have a range of motion between an open position and a closed position.

In another aspect, the moveable panel is proximate to the vertically-oriented support element first end.

In another aspect, the moveable panel is proximate to the base.

In another aspect, the method further includes commencing a takeoff protocol by initiating vertical takeoff and landing vehicle rotor movement, restricting vertical movement of the vertical takeoff and landing vehicle within the enclosure, and increasing air pressure within the enclosure prior to vertical takeoff and landing vehicle takeoff, with said at least one moveable enclosure panel set in the closed position.

In another aspect, the method further includes detecting air pressure in at least a region of the enclosure, and releasing the vertical takeoff and landing vehicle for takeoff at a selected enclosure internal pressure.

In another aspect, the method further includes maintaining contact of the at least one vehicle electrical contact with the charging element charging contact during takeoff.

In another aspect, the method further includes maintaining contact of the at least one vehicle electrical contact with the charging element charging contact during takeoff.

In another aspect, the method further includes maintaining contact of the at least one vehicle electrical contact with the charging element charging contact during takeoff until the vertical takeoff and landing vehicle exits the enclosure.

In another aspect, the method further includes powering the takeoff of the vertical takeoff and landing vehicle from an external voltage, said external voltage delivered to the vertical takeoff and landing vehicle from the charging element.

According to another aspect, the stabilizing, at least angularly, of the vertical takeoff and landing vehicle during at least one of takeoff and landing can comprise horizontal stabilization, angular stabilization, and combinations thereof, that can further include the stabilization of aerial conditions including, for example, at least one of pitch, yaw, roll, and combinations thereof.

In another aspect, the method further comprises restricting angular movement of the vertical takeoff and landing vehicle toward and away from the vertically-oriented support element during takeoff and landing of the vertical takeoff and landing vehicle.

In another aspect, the restriction of the angular movement can be a horizontal restriction or a restriction at an angle other than planar (with planar defined as 0° or 180°).

In another aspect, the method comprises the use of a plurality of vertically-oriented support elements.

In another aspect, the base is proximate to ground level.

In another aspect, the vertically-oriented support element first end is attached to the base.

In another aspect, the enclosure is in direct communication with the at least one vertically-oriented support element.

In a further aspect, the method comprises the use of a frame comprising at least one vertically-oriented support element.

In another aspect, the vertically-oriented support element second end is located a distance from the first end, with the distance ranging from about 4 ft. to about 100 ft.

In another aspect, the first cooperating stabilizer element comprises at least one of: a male attachment portion and a female attachment portion.

In a further aspect, the second cooperating stabilizer element comprises at least one of: a male attachment portion and a female attachment portion.

In another aspect, the first cooperating stabilizer element comprises a standoff element, with the standoff element configured to extend outwardly from the vertically-oriented support element, and with the standoff element configured to engage the second cooperating stabilizer element.

In another aspect, the second cooperating stabilizer element comprises a standoff element, with the standoff element configured to engage the first cooperating stabilizer element.

In another aspect, the second cooperating stabilizer element is configured to extend outwardly from a vertical takeoff and landing vehicle structure.

In a further aspect, the vehicle standoff element is configured to extend outwardly from a vertical takeoff and landing vehicle rotor guard.

In another aspect, the vehicle standoff element is integral with the vertical takeoff and landing vehicle.

In another aspect, the vehicle standoff element is integral with the vertical takeoff and landing rotor guard.

In a further aspect, the vertical takeoff and landing vehicle is a rotorcraft.

In another aspect, the frame is configured to reside at a fixed location.

In a further aspect, the frame is moveable to a plurality of locations.

In another aspect, a method further comprises stabilizing the vertical takeoff and landing vehicle during at least one of takeoff and landing.

According to a further present aspect, an apparatus for stabilizing takeoff and landing of a vertical takeoff and landing vehicle is disclosed, with the apparatus including at least one vertically-oriented support element, with the at least one vertically-oriented support element including a vertically-oriented support element first end and a vertically-oriented support element second end. The vertically-oriented support element second end extends from the vertically-oriented support element first end to the vertically-oriented support element second end, with the vertically-oriented support element second end located at a selected distance away from the vertically-oriented support element first end, with the vertically-oriented support element further including at least one first cooperating stabilizer element, with the at least one first cooperating stabilizer element located proximate to the vertically-oriented support element second end, and wherein the at least one first cooperating stabilizer element includes at least one of: a male attachment portion and a female attachment portion. The apparatus further includes an enclosure, said enclosure having an enclosure inner surface, with the enclosure dimensioned to substantially surround the at least one vertically-oriented support element. The apparatus further includes an electric charging element, with the electric charging element in communication with a power supply, with the charging element including at least one charging element charging contact that can be a charging element surface, and with the charging element charging contact in communication with at least one of: a charging base, at least one vertically-oriented support element, and the enclosure inner surface.

In another aspect, the at least one first cooperating stabilizer element includes at least one of: a male attachment portion and a female attachment portion.

In another aspect, the vertically-oriented support element second end is located a distance from the vertically-oriented support element first end, said distance ranging from about 4 ft. to about 100 ft.

In another aspect, the vertically-oriented support element second end is located a distance from the vertically-oriented support element first end, said distance ranging from about 1 ft. to about 10 ft.

In a further aspect, the at least one first cooperating stabilizer element is configured to extend outwardly from the vertically-oriented support element.

In another aspect, the first cooperating stabilizer element includes a male attachment portion dimensioned to receive a second cooperating stabilizer element, with the second cooperating stabilizer element including a female attachment portion.

In another aspect, the first cooperating stabilizer element includes a female attachment portion dimensioned to receive a second cooperating stabilizer portion, with the second cooperating stabilizer element comprising a male attachment portion.

In another aspect, the female attachment portion includes a slot, with the slot located proximate to the vertically-oriented support element second end, and with the slot extending a selected distance from the vertically-oriented support element second end.

In another aspect, the female attachment portion includes a slot, with the slot located proximate to the vertically-oriented support element second end, and with the slot extending longitudinally along the length of the vertically-oriented support element.

In another aspect, the apparatus further includes a guide, with the guide in communication with the vertically-oriented support element second end, and with the guide further in communication with the at least one first cooperating stabilizer element.

In another aspect, the apparatus further includes a guide, with the guide in communication with the vertically-oriented support element second end, with the guide further in communication with the at least one first cooperating stabilizer element, and with the guide further comprising a guide inner surface.

In a further aspect, the apparatus further includes an enclosure including a frame located proximate to the enclosure, with the frame including a plurality of vertically-oriented support elements, with the plurality of vertically-oriented support elements spaced a distance from one another, and with the frame further including at least one circumferential frame support, with the at least one circumferential frame support in communication with one or more of the plurality of vertically-oriented support elements, and wherein the enclosure is dimensioned to substantially surround the plurality of vertically-oriented support elements and wherein the enclosure is dimensioned to substantially surround the frame.

In another aspect, at least one circumferential frame support includes a horizontally-oriented connector.

In another aspect, the frame is configured to reside at a fixed location.

In another aspect, the frame is moveable to a plurality of locations.

In a further aspect, the frame is configured to support at least one of the plurality of vertically-oriented support elements.

In another aspect, the apparatus further includes a base, with the base configured to support the frame.

In another aspect, the base is in communication with at least one of the plurality of vertically-oriented support elements.

In another aspect, the enclosure includes at least one moveable enclosure panel, with the at least one moveable enclosure panel positioned proximate to the vertically-oriented support element first end.

In another aspect, the enclosure includes at least one moveable enclosure panel, with the at least one moveable enclosure panel positioned proximate to at least one of: the base and the vertically-oriented support element first end, with at least one movable enclosure panel configured to have a range of motion between a closed position and an open position, and wherein the at least one panel can be, for example, a door.

In another aspect, the apparatus further includes a detector for detecting pressure within at least a localized region of the enclosure, a controller in communication with the detector, and a drive mechanism in communication with the controller, with the drive mechanism further in communication with the moveable enclosure panel.

In another aspect, the guide further includes a guide outer surface and a guide inner surface, with the guide inner surface further including at least one guide inner surface channel dimensioned to receive the second cooperating stabilizer element into the guide inner surface channel, said guide inner surface channel in communication with the first cooperating stabilizer element.

In another aspect, the apparatus further includes a horizontally-disposed platform, with the horizontally-disposed platform in communication with the at least one vertically-oriented support element, with the platform comprising a rigid floor.

In another aspect, the rigid floor comprises a mesh material, and with the mesh material comprising a mesh gauge selected to facilitate airflow through the rigid floor.

The apparatus further includes a drive mechanism in communication with the horizontally-disposed platform, and the drive mechanism is configured to raise and lower the horizontally-disposed platform from a first position to a second position.

In another aspect, the horizontally-disposed platform is in communication with the vertically-oriented support element.

In another aspect, the horizontally-disposed platform is in communication with a plurality of the plurality of vertically-oriented support elements.

According to a further aspect, a vertical takeoff and landing vehicle is disclosed with the vehicle including a vertical takeoff and landing vehicle body, said vertical takeoff and landing vehicle body housing a motor, at least one rotor in communication with the motor, with the at least one rotor having a rotor length, and a rotor guard, with the rotor guard dimensioned to have a rotor guard diameter, sand with the rotor guard radius exceeding the rotor length. The vertical takeoff and landing vehicle further includes a vehicle standoff element in communication with at least one of: the vertical takeoff and landing vehicle body and the rotor guard.

In another aspect, the vertical takeoff and landing vehicle includes a vehicle standoff element including a male attachment portion.

In a further aspect, the vertical takeoff and landing vehicle includes a vehicle standoff element including a female attachment portion.

In another aspect, the rotor guard is a circumferential rotor guard.

In a further aspect, the vehicle standoff element extends outwardly from at least one of: the vertical takeoff and landing vehicle body and the rotor guard.

In another aspect, the vehicle standoff element is integral with the vertical takeoff and landing vehicle body.

In a further aspect, the vehicle standoff element is integral with the vertical takeoff and landing rotor guard.

In another aspect, the vertical takeoff and landing vehicle is a rotorcraft.

In another aspect, an apparatus is disclosed for assisting a vertical takeoff and landing vehicle takeoff, with the apparatus including at least one vertically-oriented support element, with the at least one vertically-oriented support elements having a vertically-oriented support element first end and a vertically-oriented support element second end, with the first end proximate to a base, with the vertically-oriented support element extending from the vertically-oriented support element first end to the vertically-oriented support element second end, with the vertically-oriented support element second end located at a selected distance away from the vertically-oriented support element first end, with the vertically-oriented support element comprising a first cooperating stabilizer element, and with the first cooperating stabilizer element located proximate to the vertically-oriented support element second end. The apparatus further includes an enclosure, with the enclosure dimensioned to substantially surround the at least one vertically-oriented support element, and with the enclosure comprising a conductive enclosure inner surface. The apparatus further includes an electric charging element, with the electric charging element in communication with a power supply, with the charging element including at least one charging element charging contact that can be a charging element surface, and with the charging element in communication with at least one of: a charging base, at least one vertically-oriented support element, and the conductive enclosure inner surface. The apparatus further includes a pressure detector, a controller in communication with the pressure detector, and a release mechanism in communication with the controller, with the release mechanism configured to release a vertical takeoff and landing vehicle from a substantially stationary position within the enclosure.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
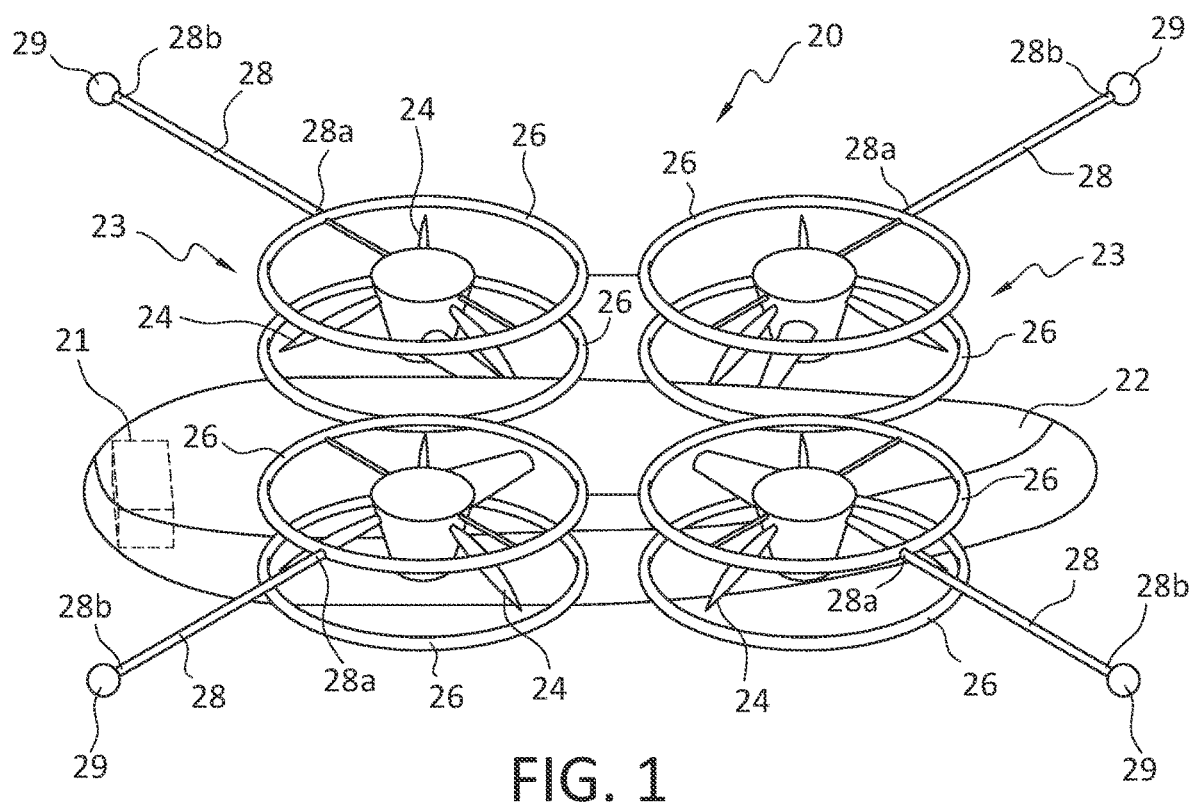
Figure 2:
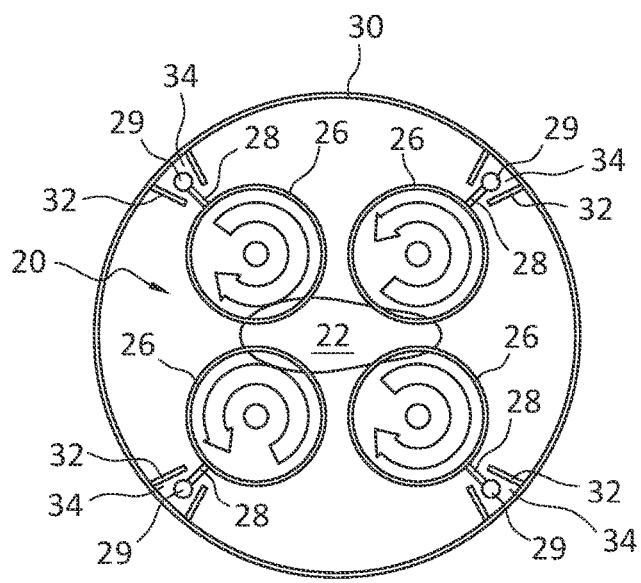
Figure 4A:
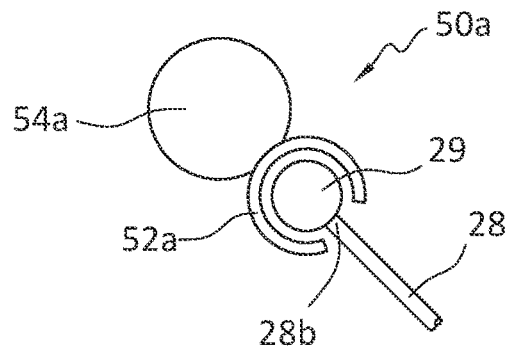
Figure 4B:
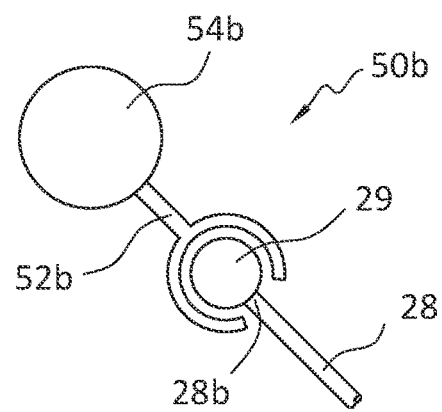
Figure 4C:
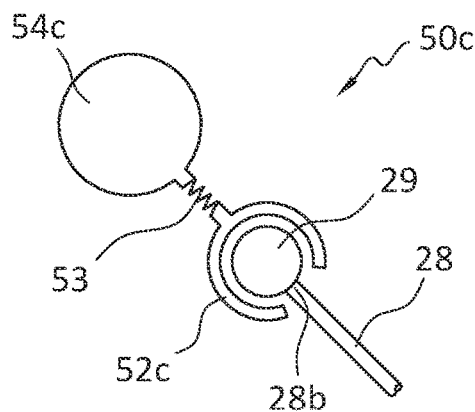
Figure 4D:
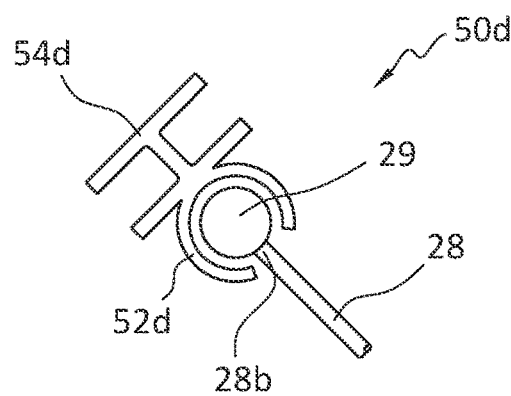
Figure 4E:
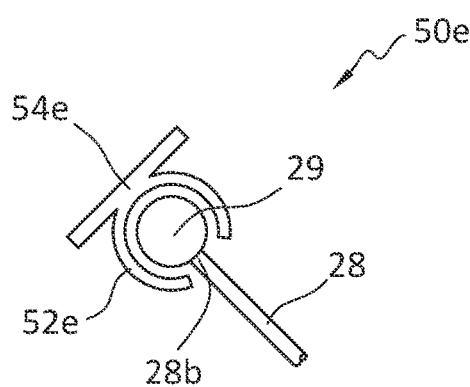
Figure 4F:
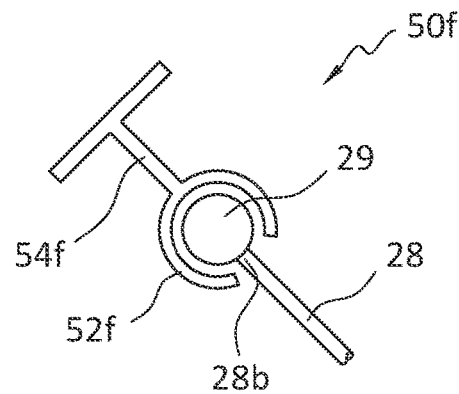
Figure 5A:
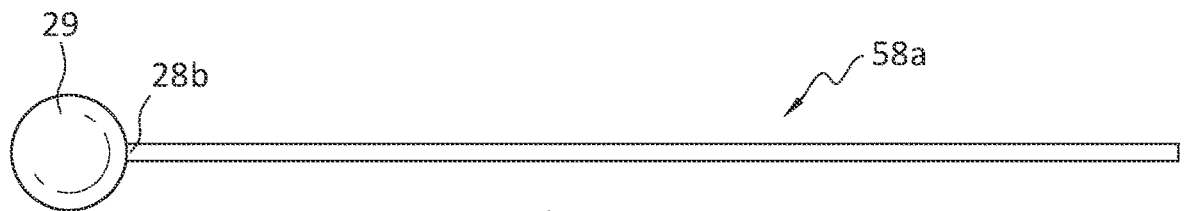
Figure 5B:
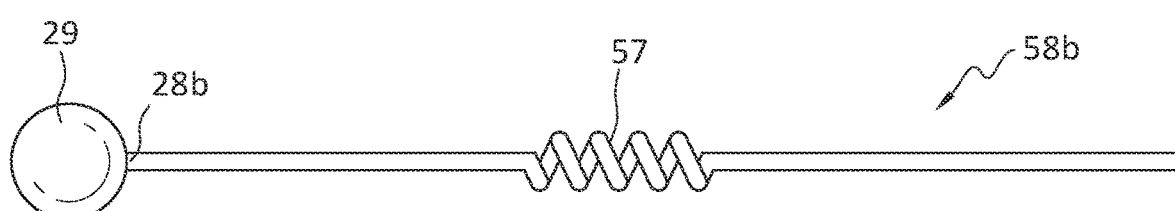
Figure 5C:
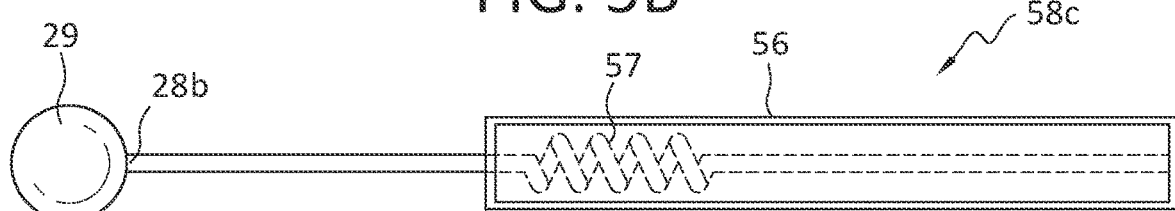
Figure 5D:
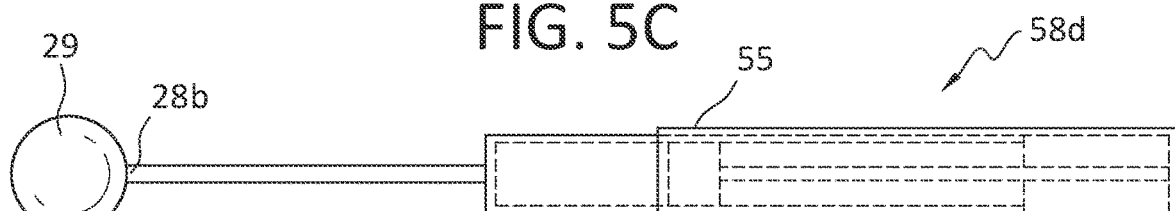
Figure 5E:
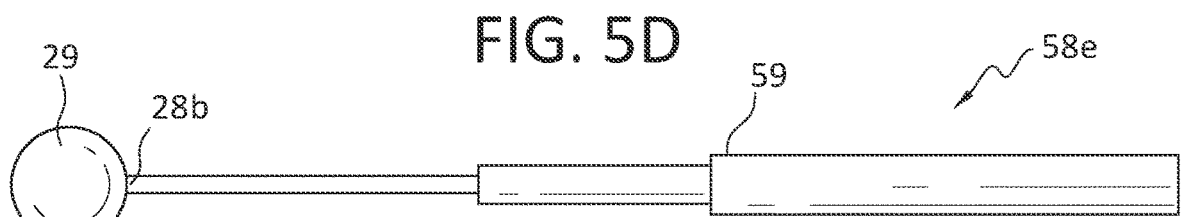
Figure 5F:
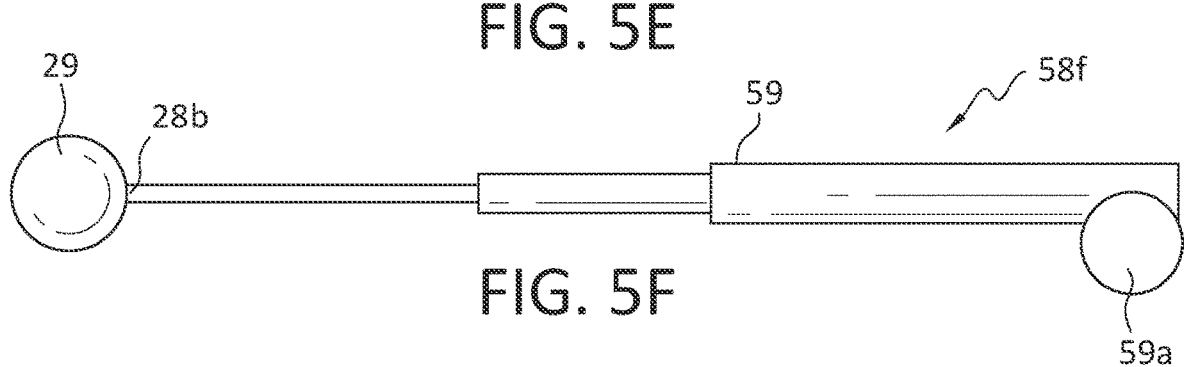
Figure 6A:
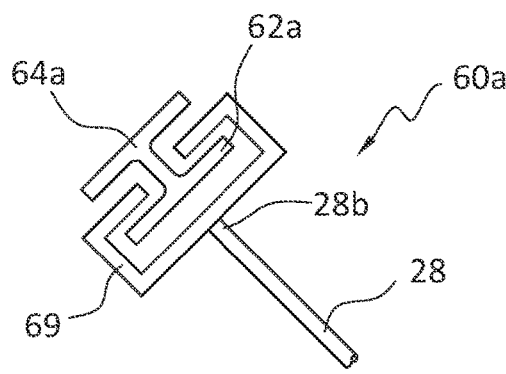
Figure 6B:
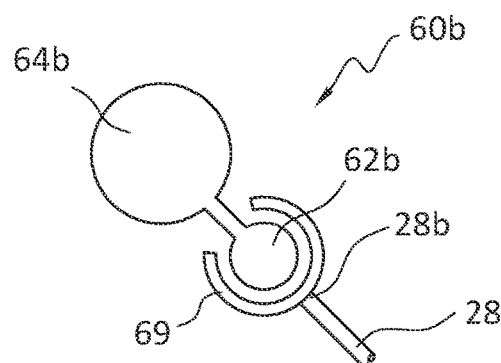
Figure 6C:
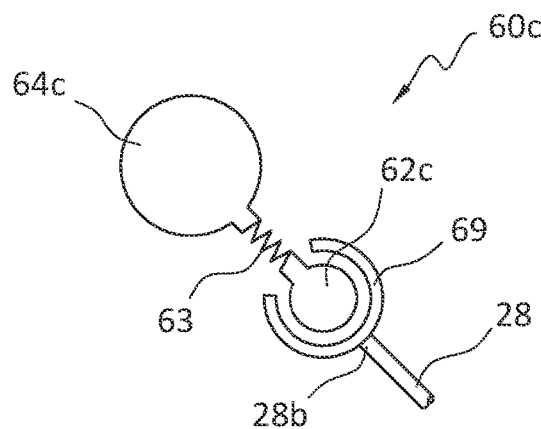
Figure 6D:
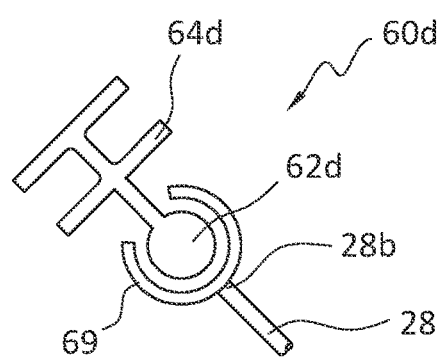
Figure 6E:
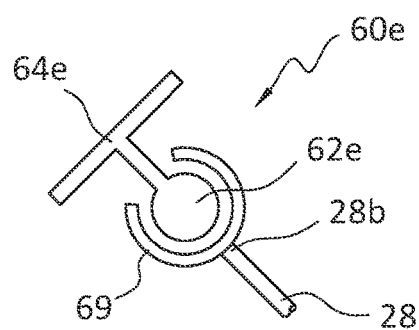
Figure 7A:
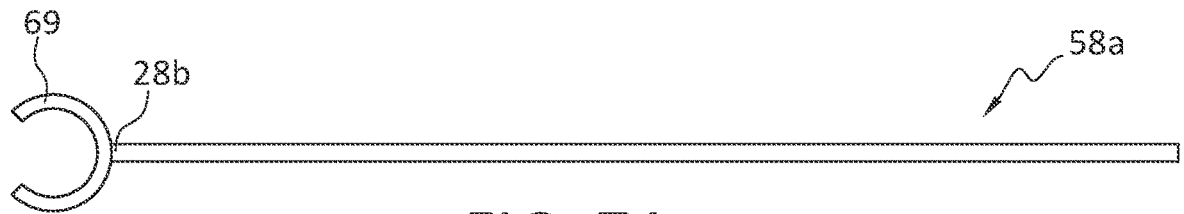
Figure 7B:
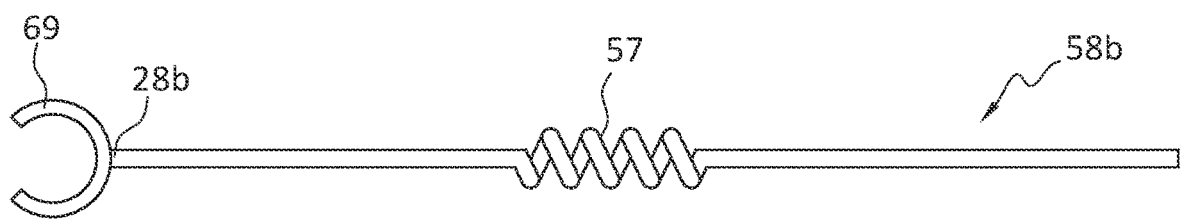
Figure 7C:
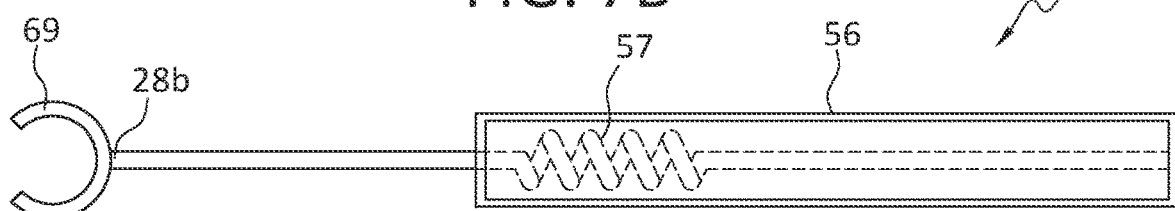
Figure 7D:
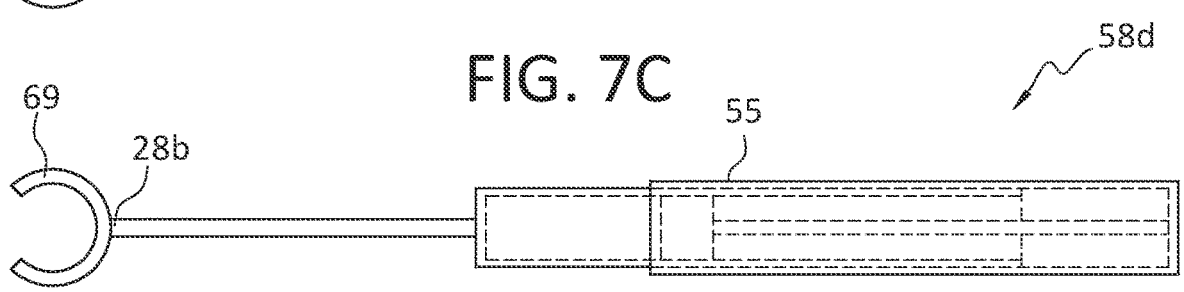
Figure 7E:
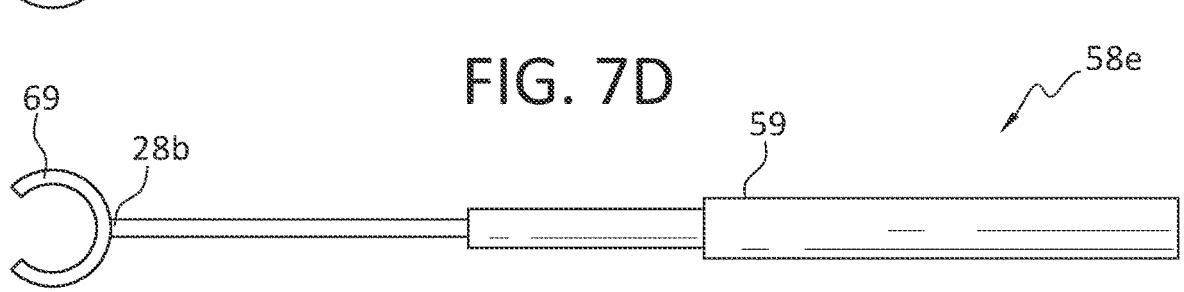
Figure 7F:
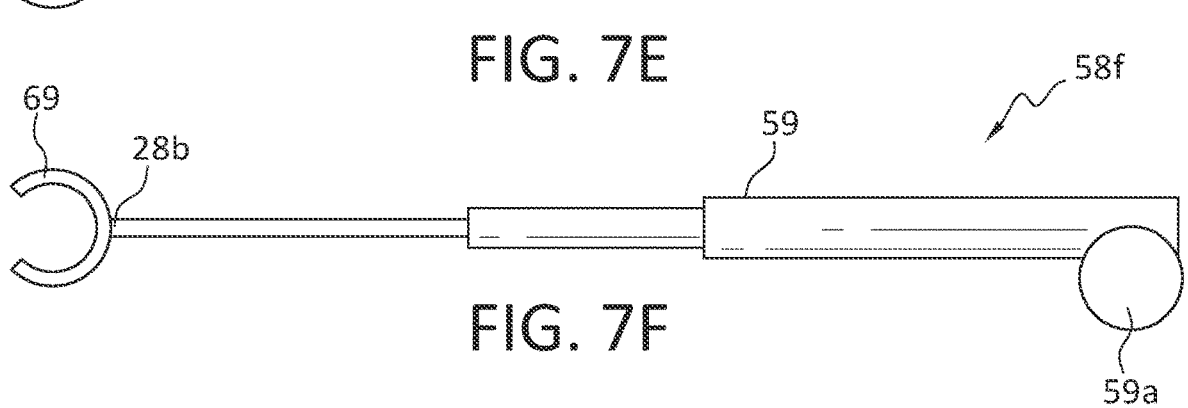
Figure 8A:
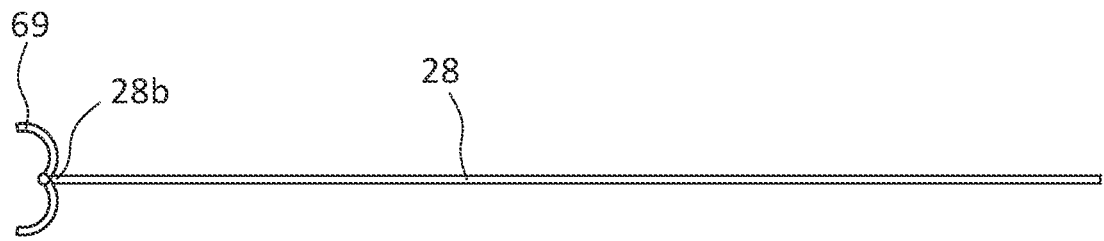
Figure 8B:
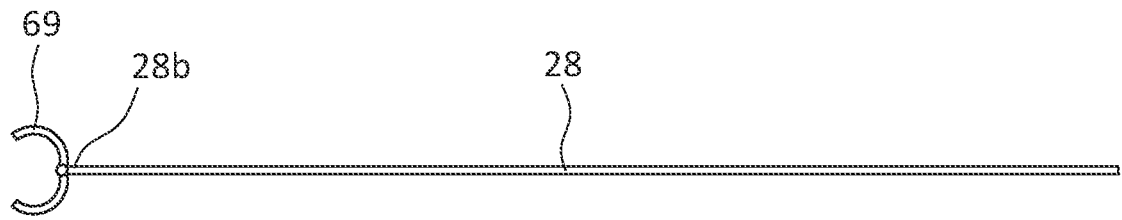
Figure 8C:
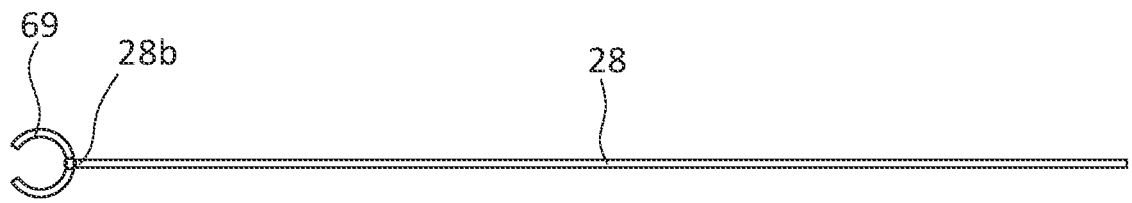
Figure 9A:
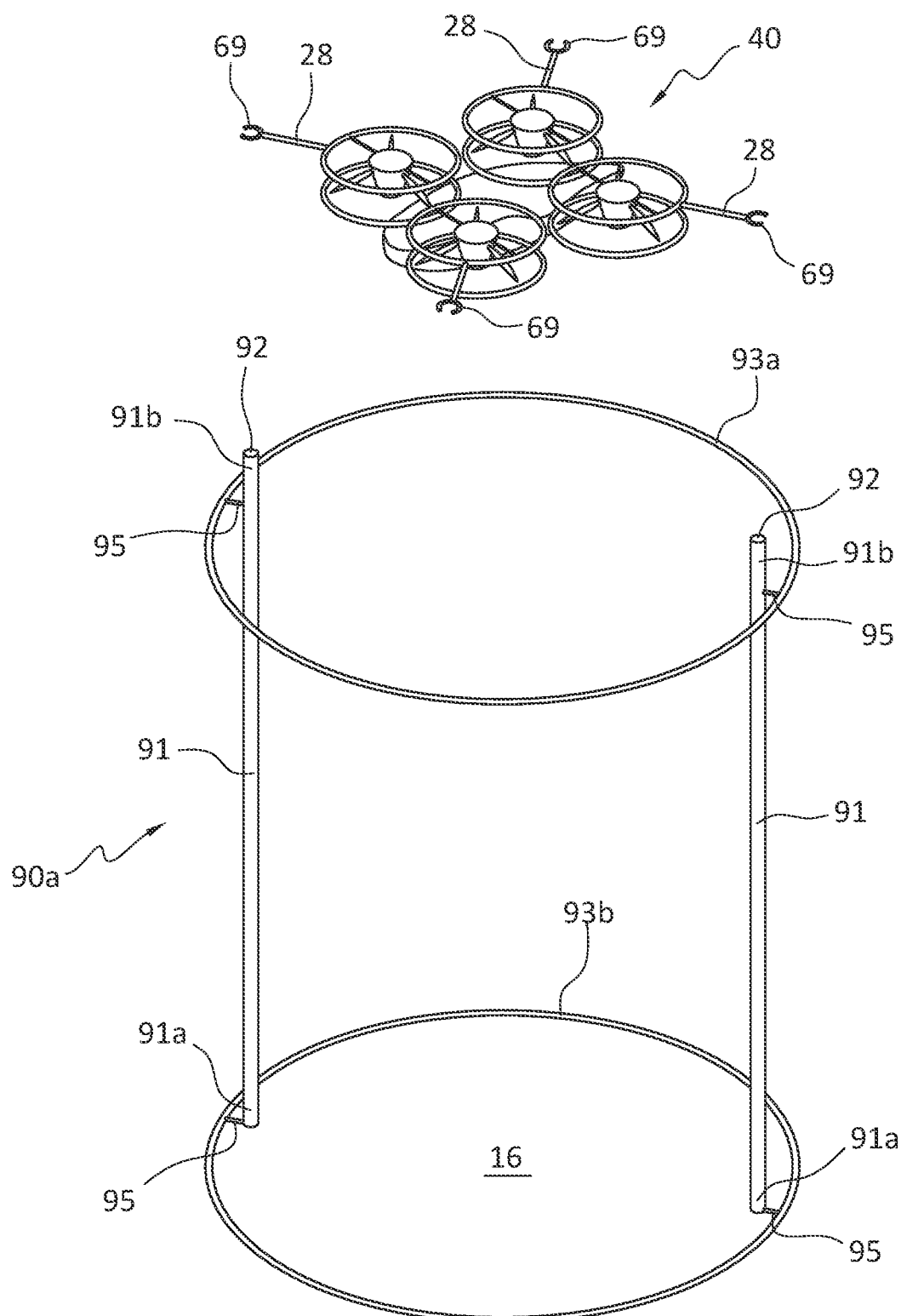
Figure 10A:
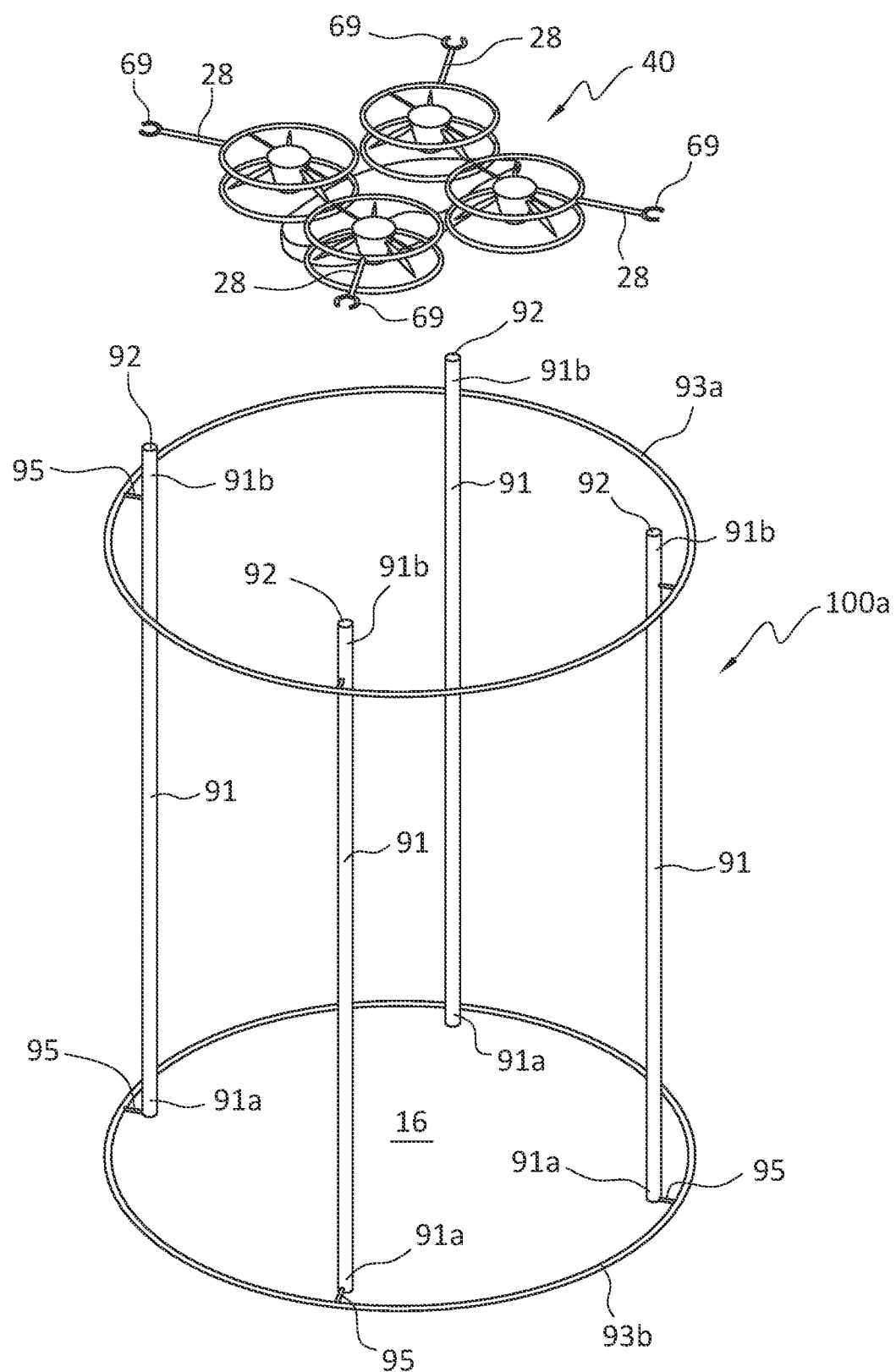
Figure 10B:
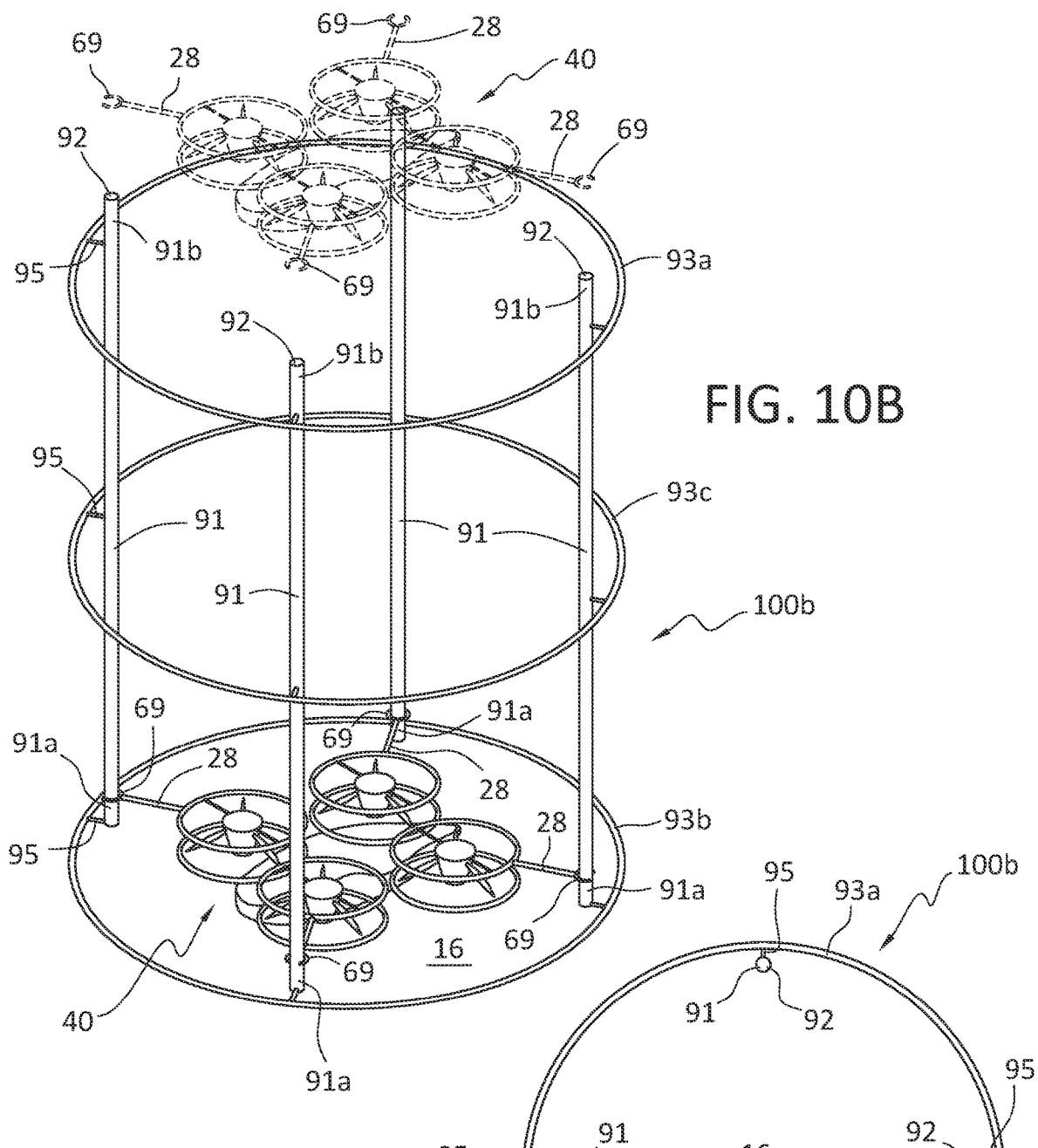
Figure 10C:
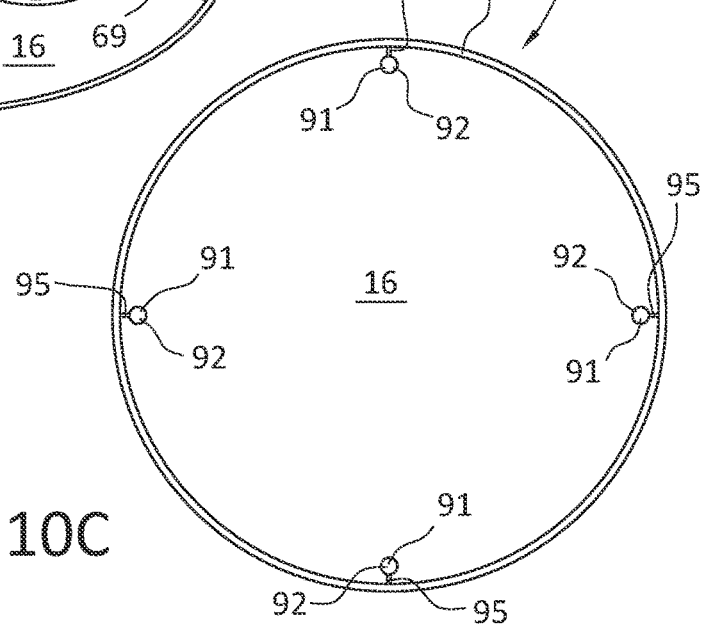
Figure 12A:
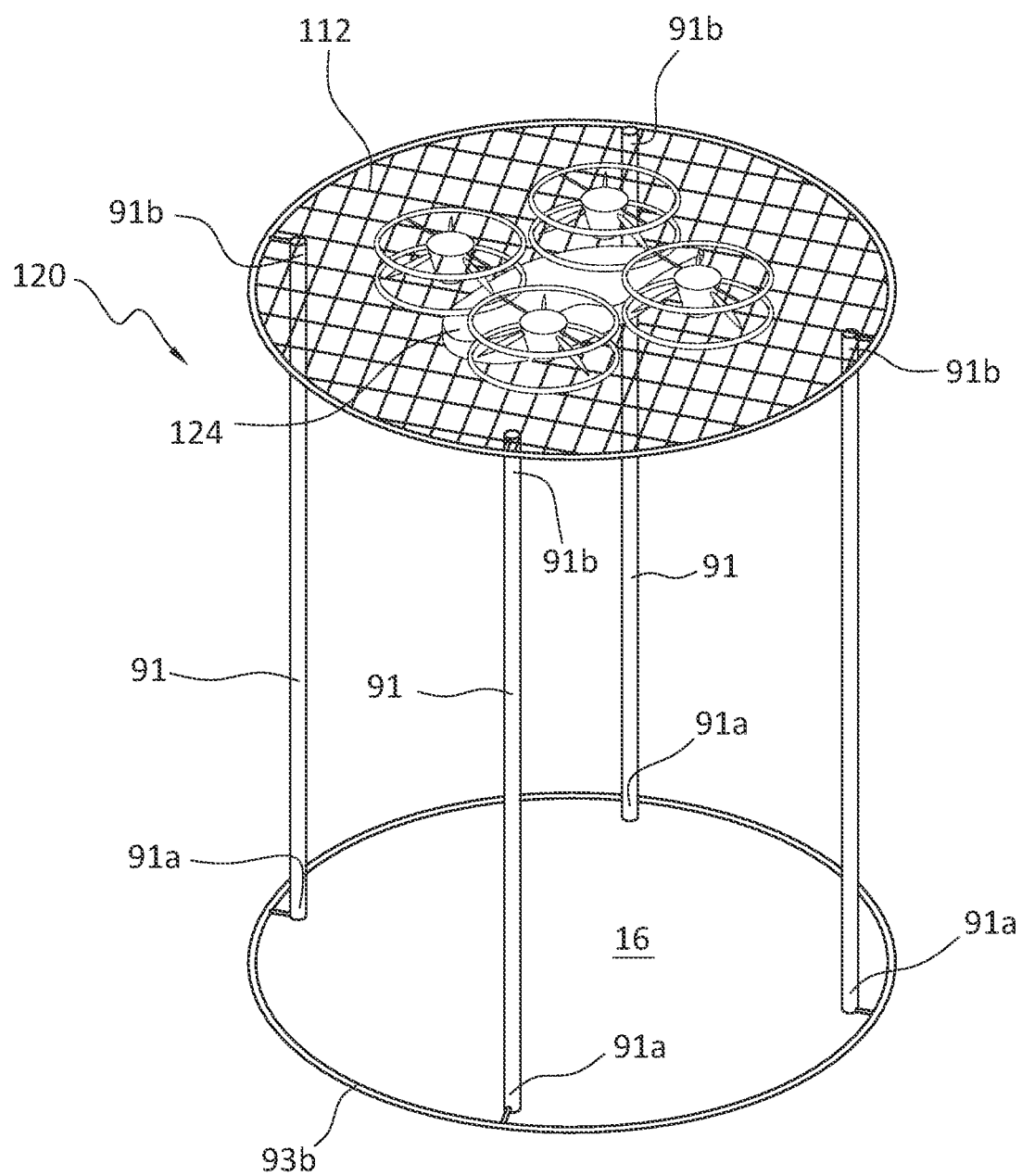
Figure 12B:
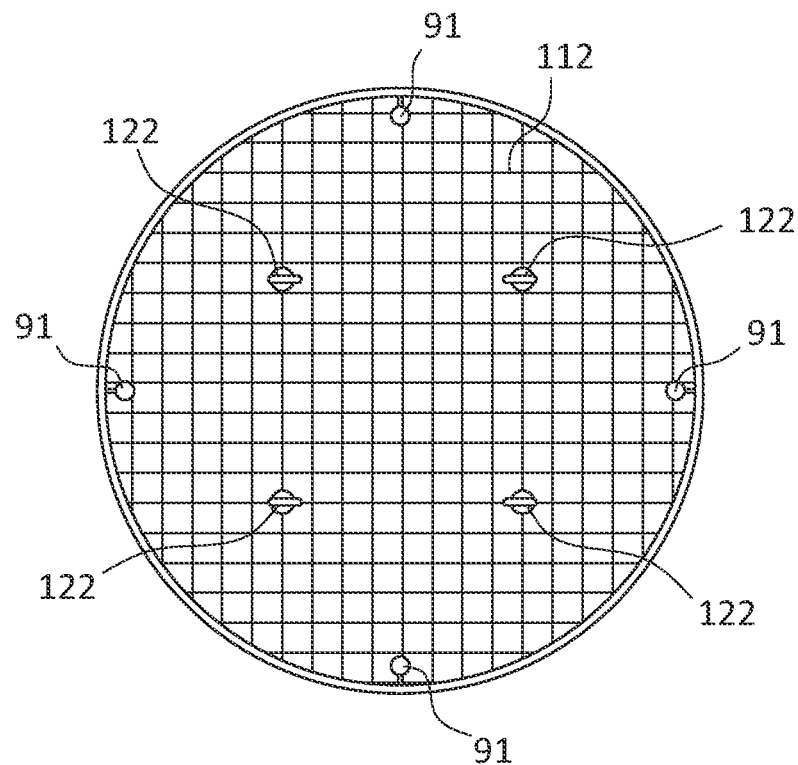
Figure 12C:
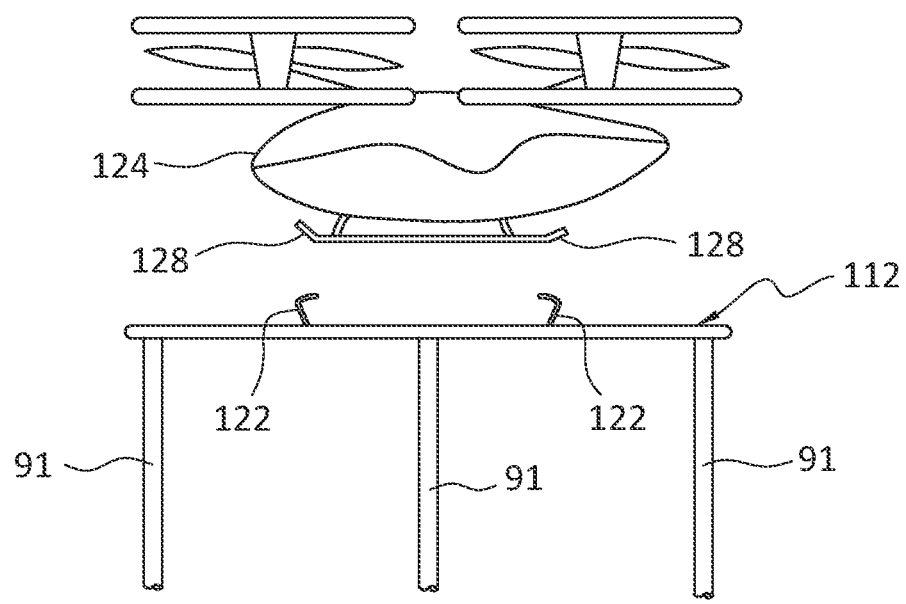
Figure 13:
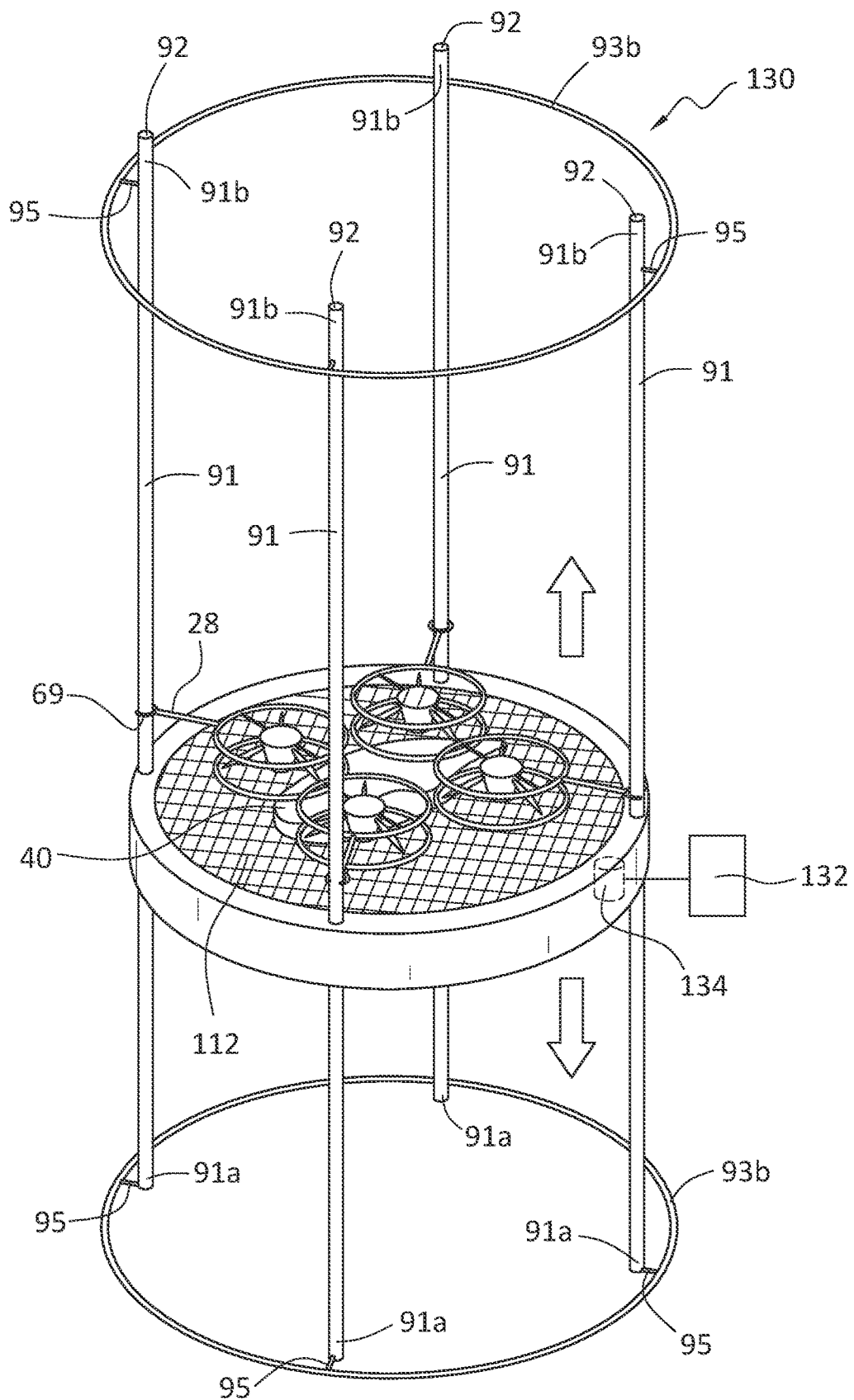
Figure 14A:
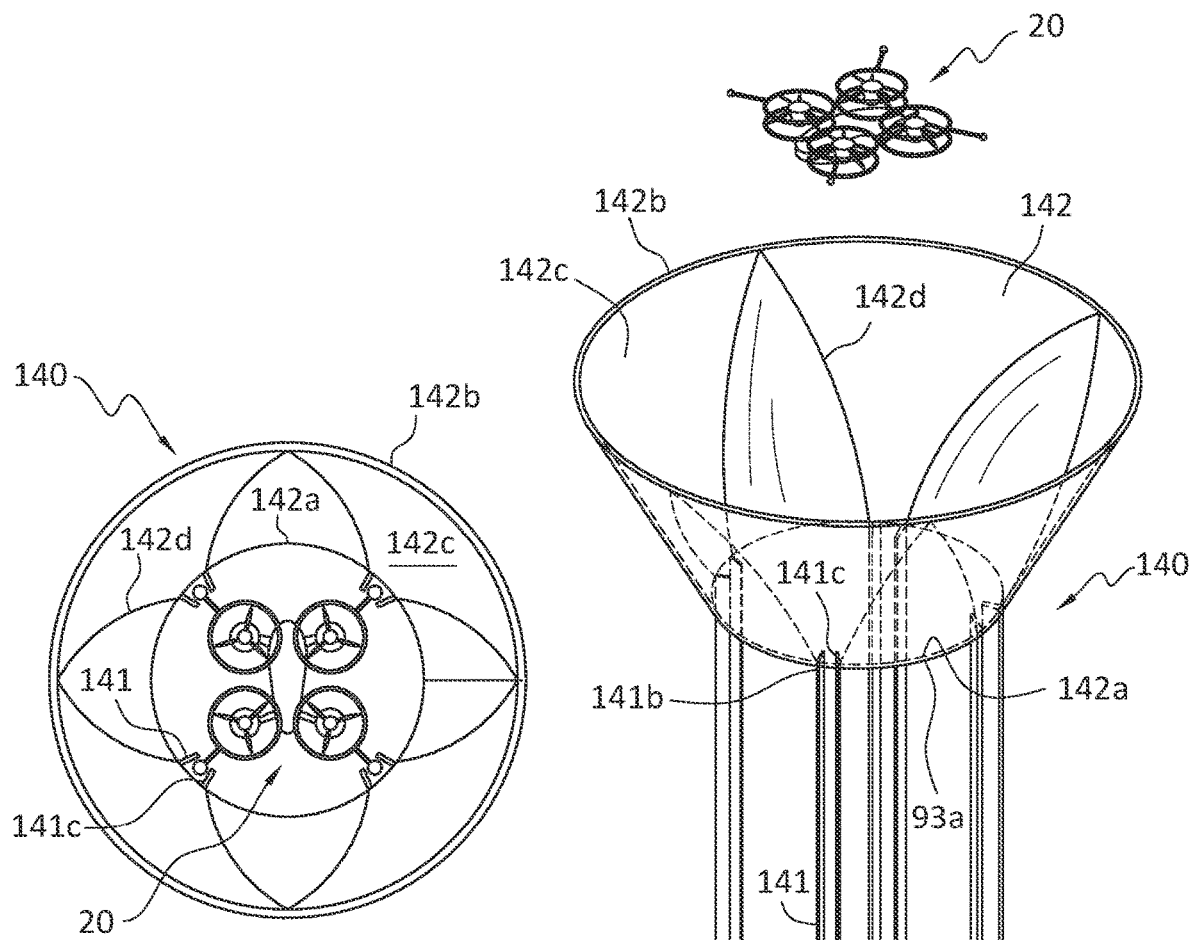
Figure 14B:
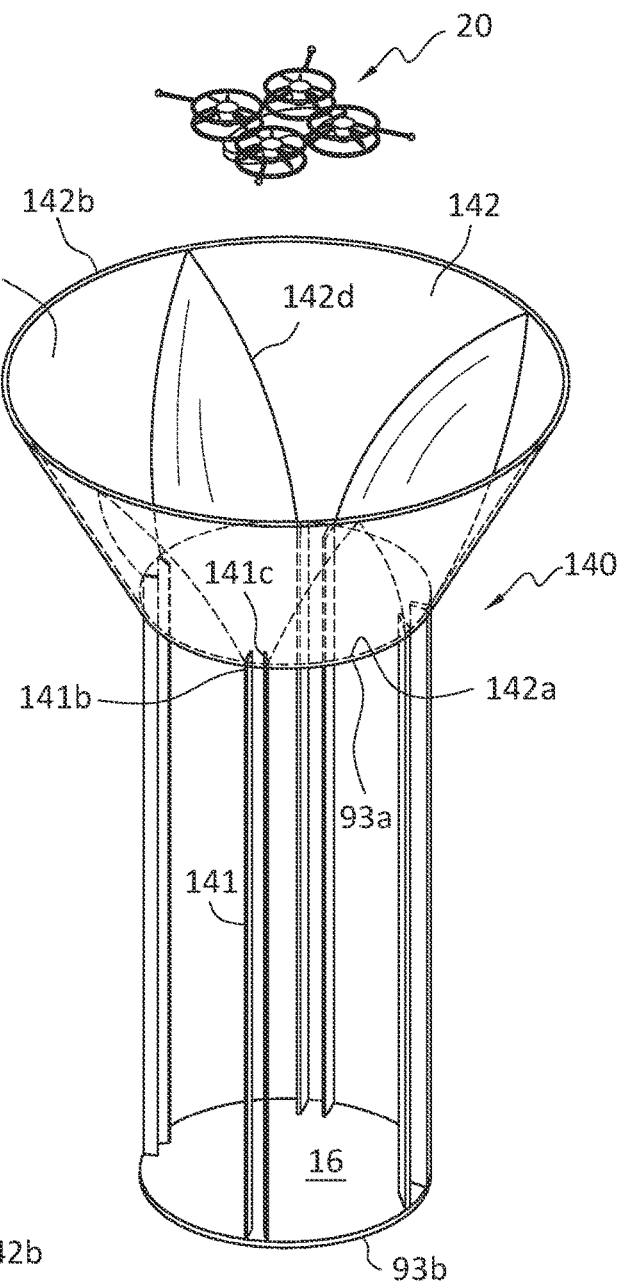
Figure 14C:
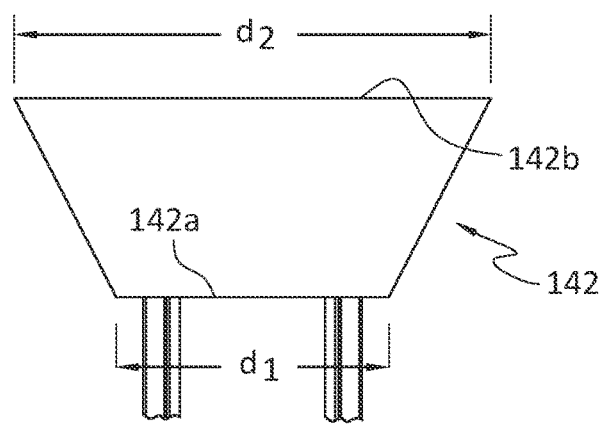
Figure 15A:
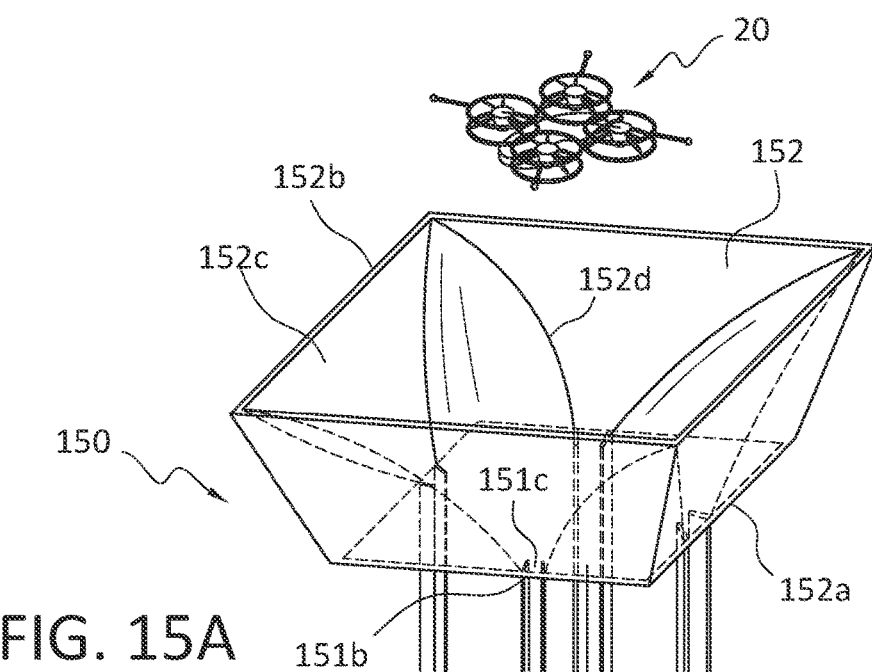
Figure 15B:
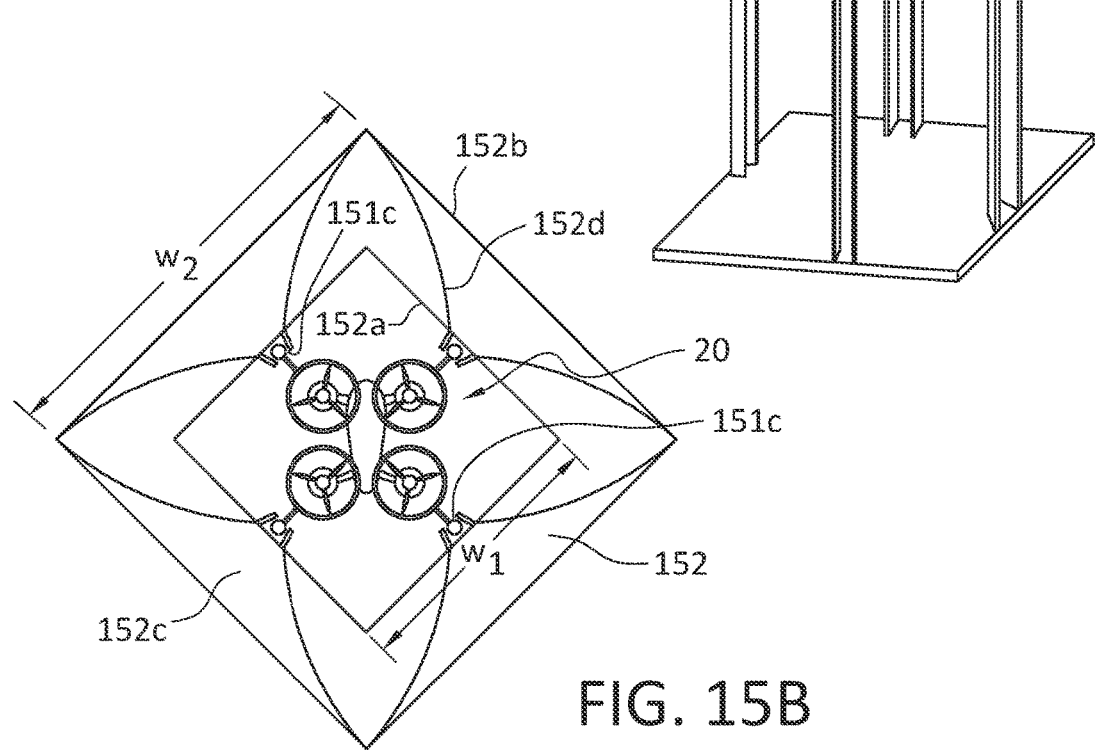
Figure 16A:
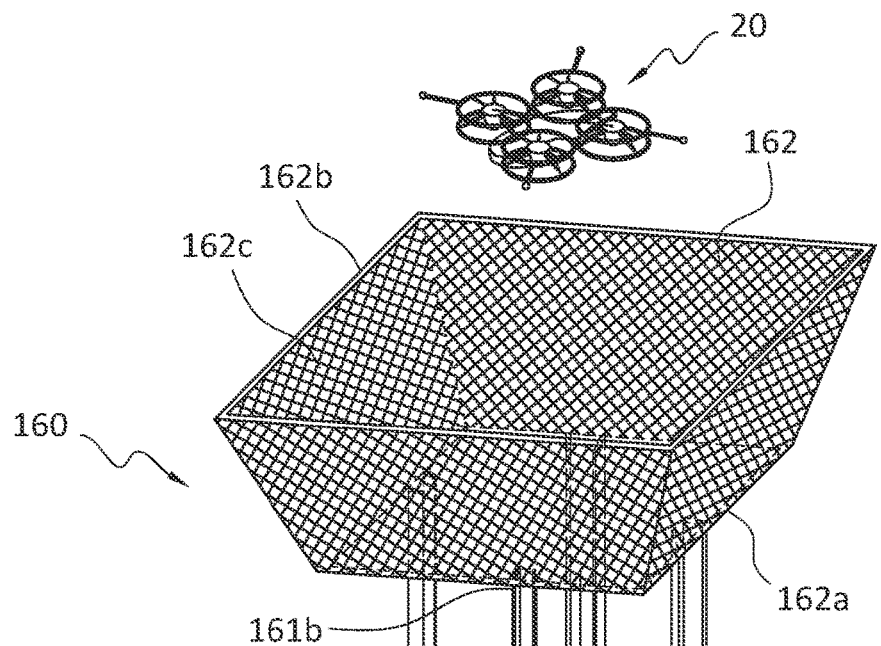
Figure 16B:
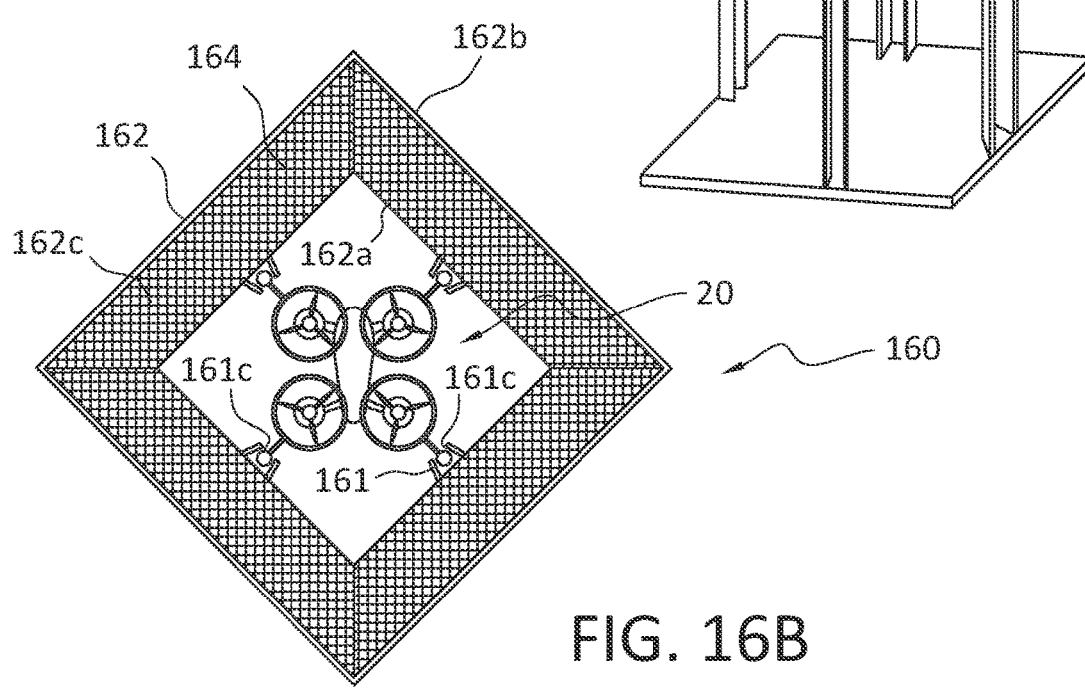
Figure 19:
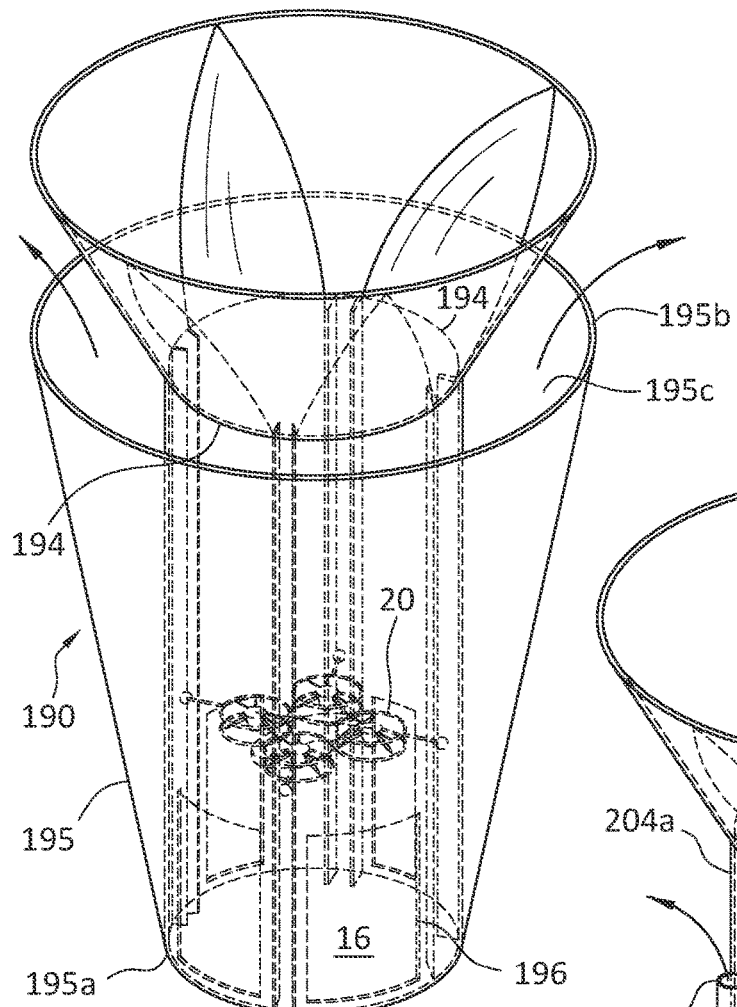
Figure 20:
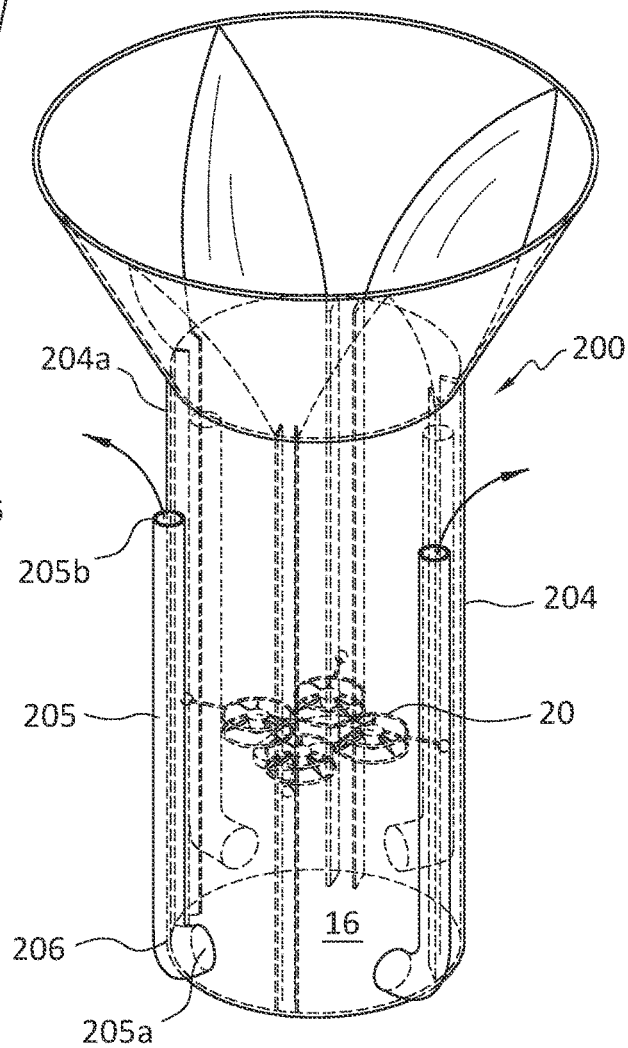
Figure 23:
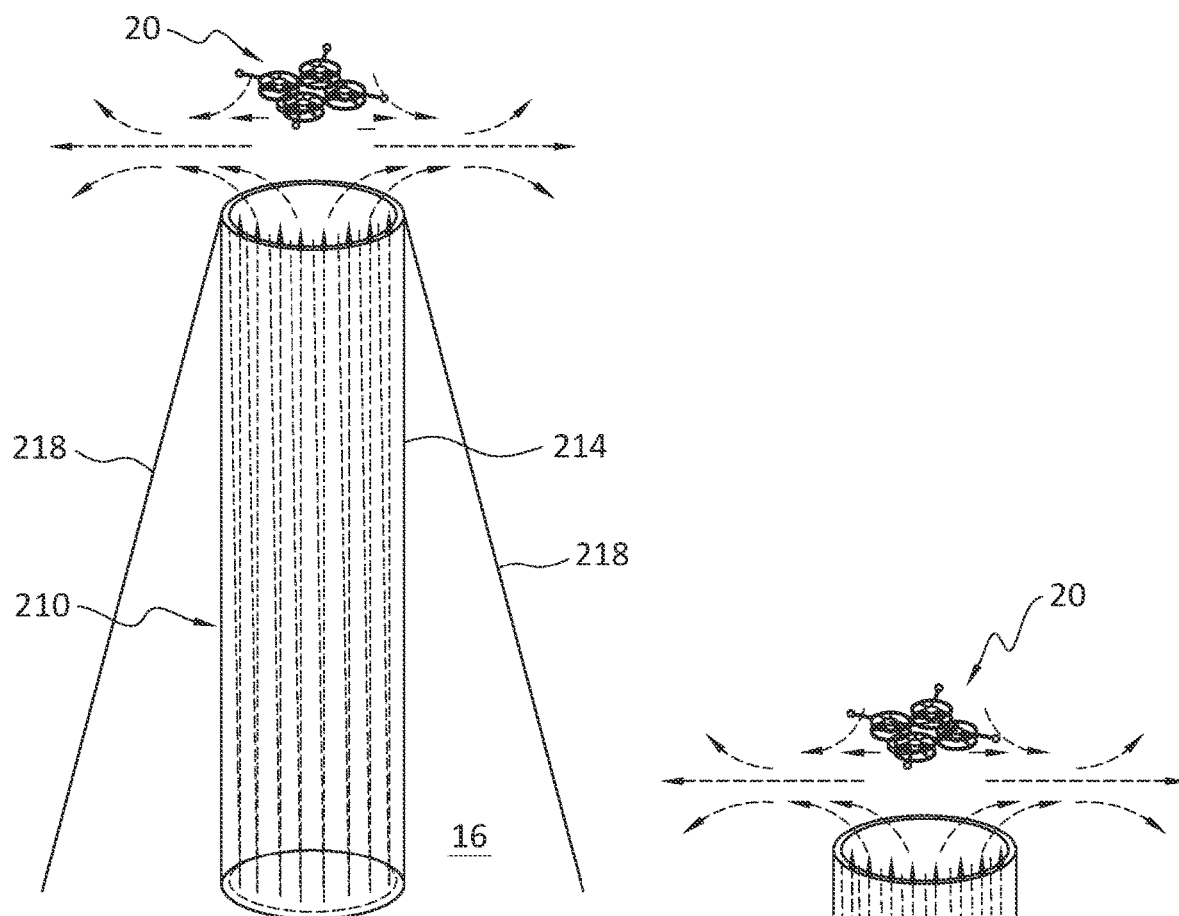
Figure 24:
Figure 25A:
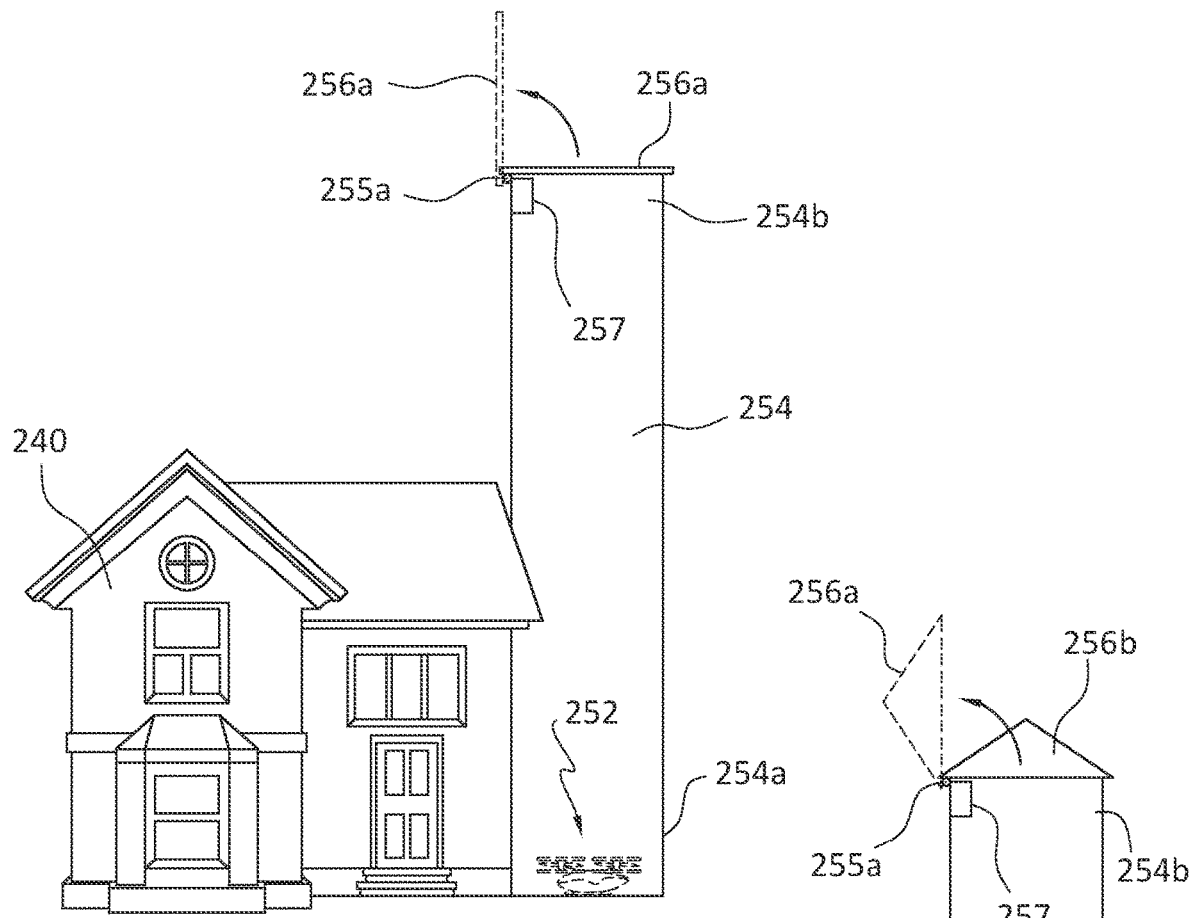
Figure 25B:
Figure 26A:
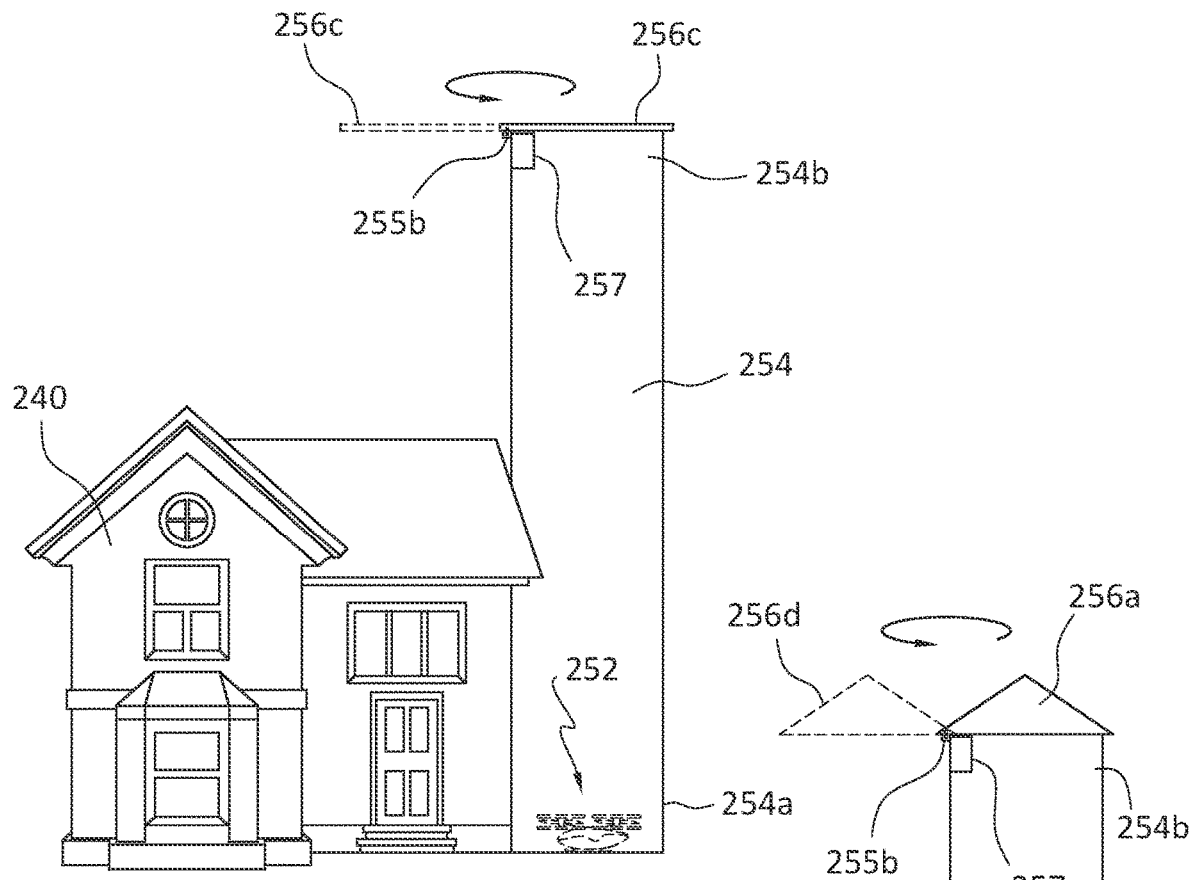
Figure 26B:
Figure 27A:
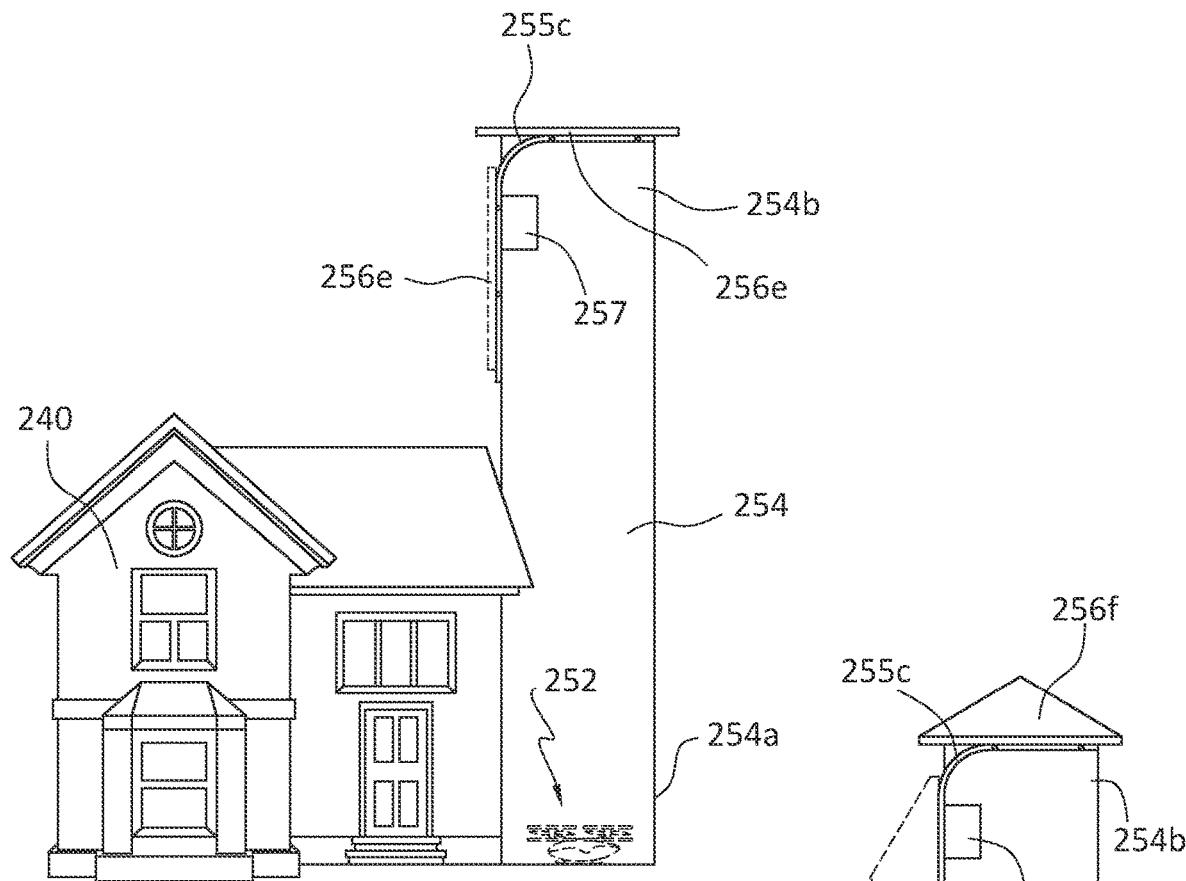
Figure 27B:
Figure 28:
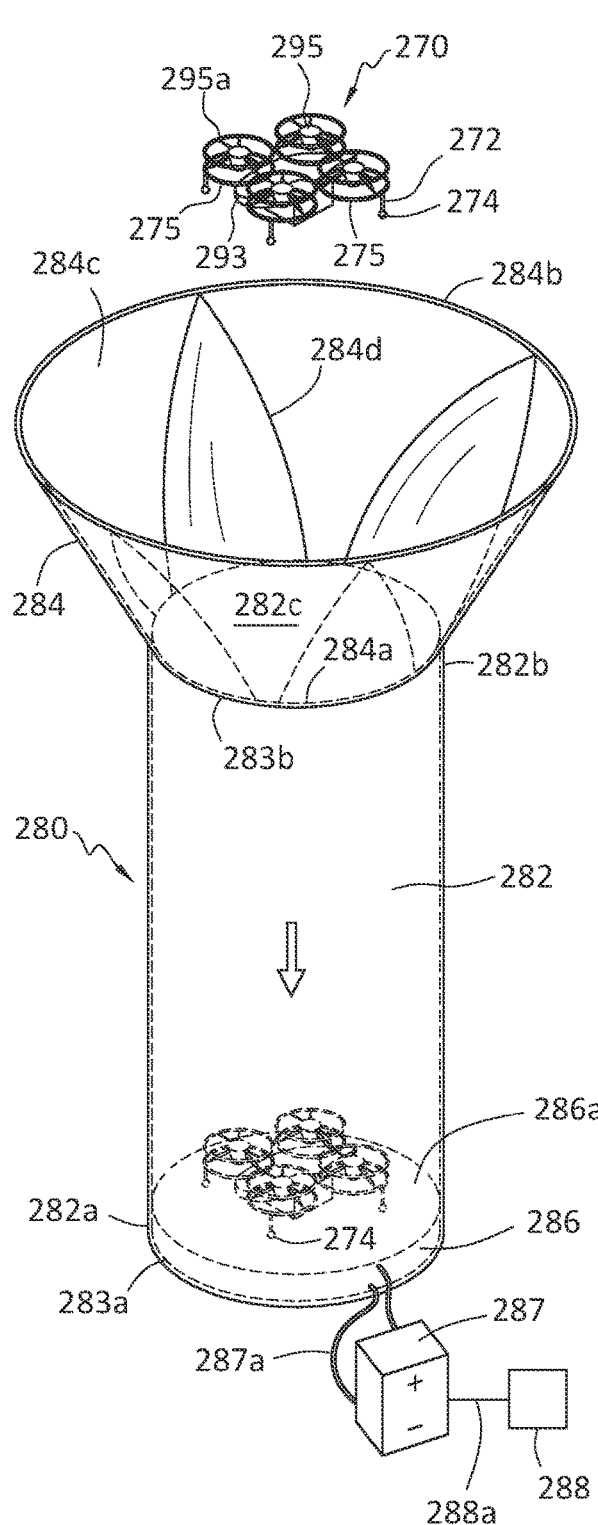
Figure 29:
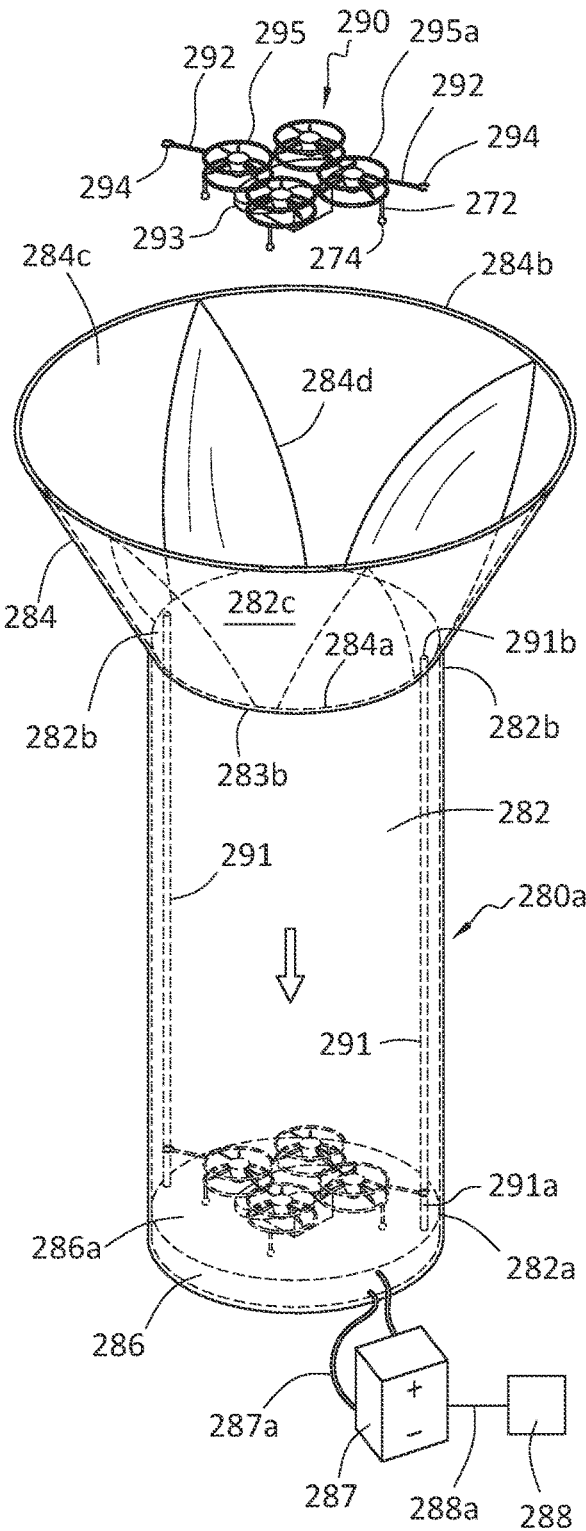
Figure 30:
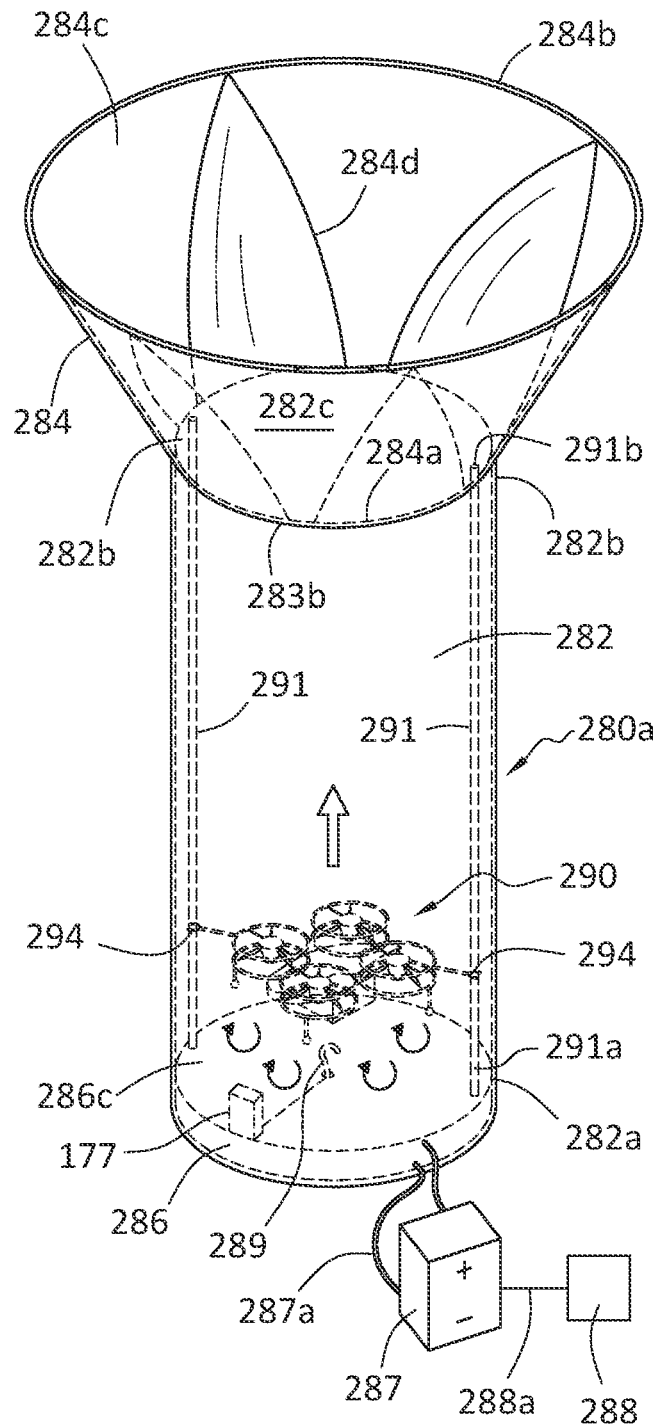
Figure 31:
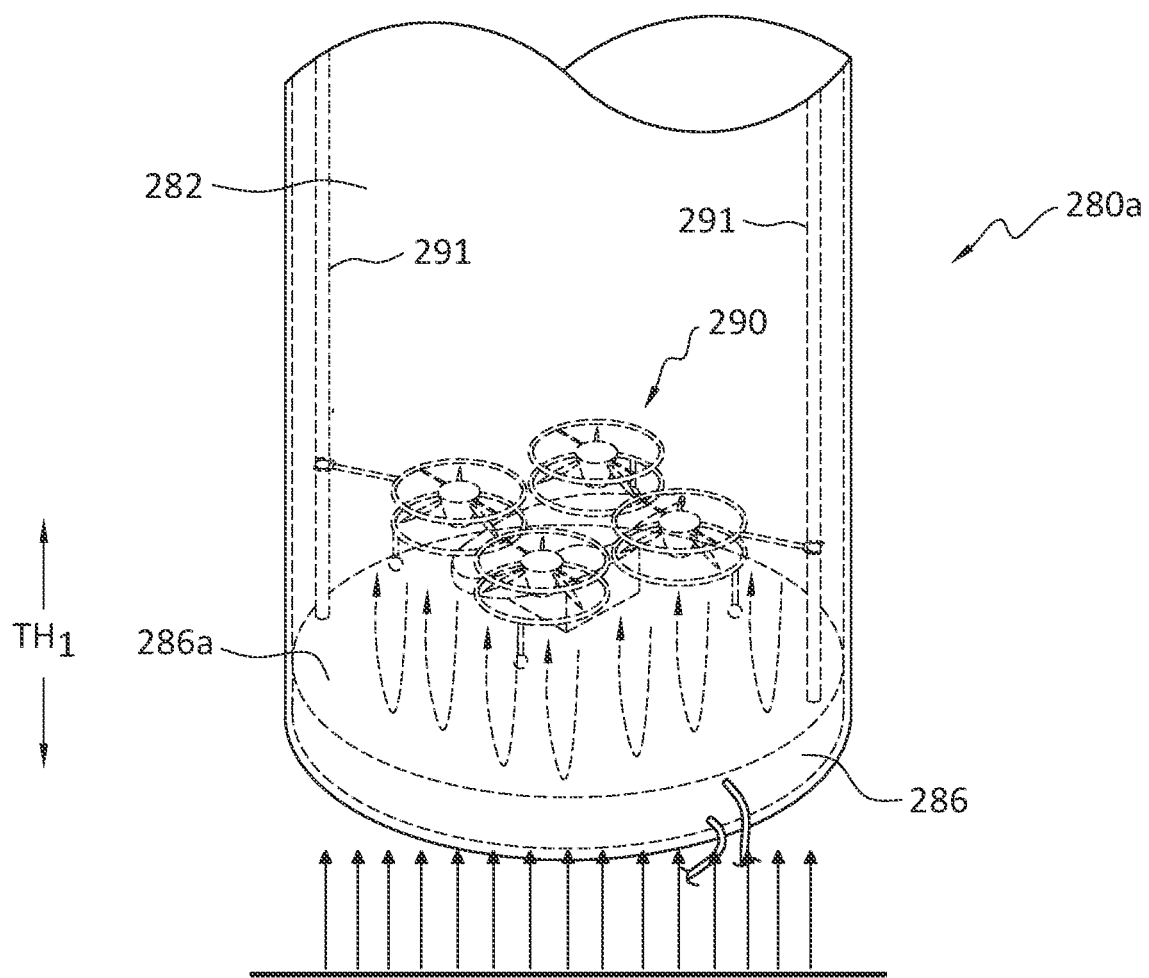
Figure 32:
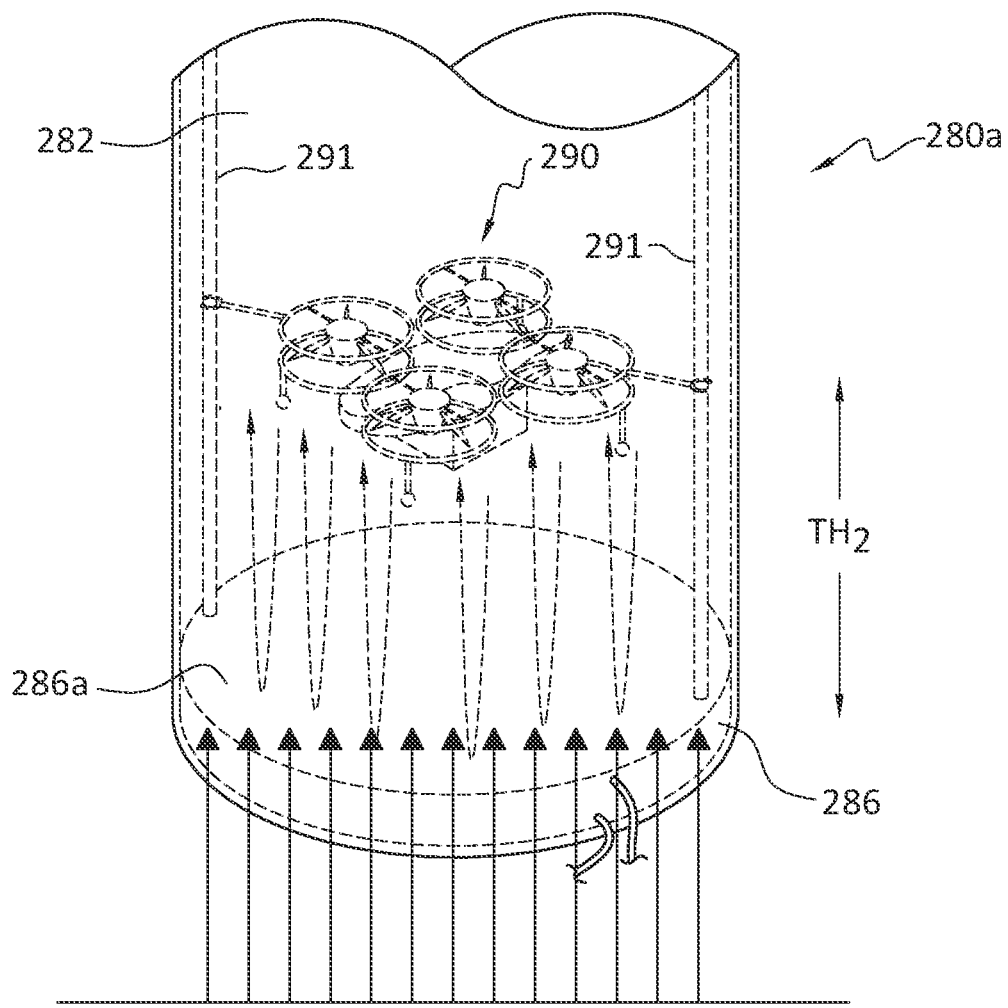
Figure 33:
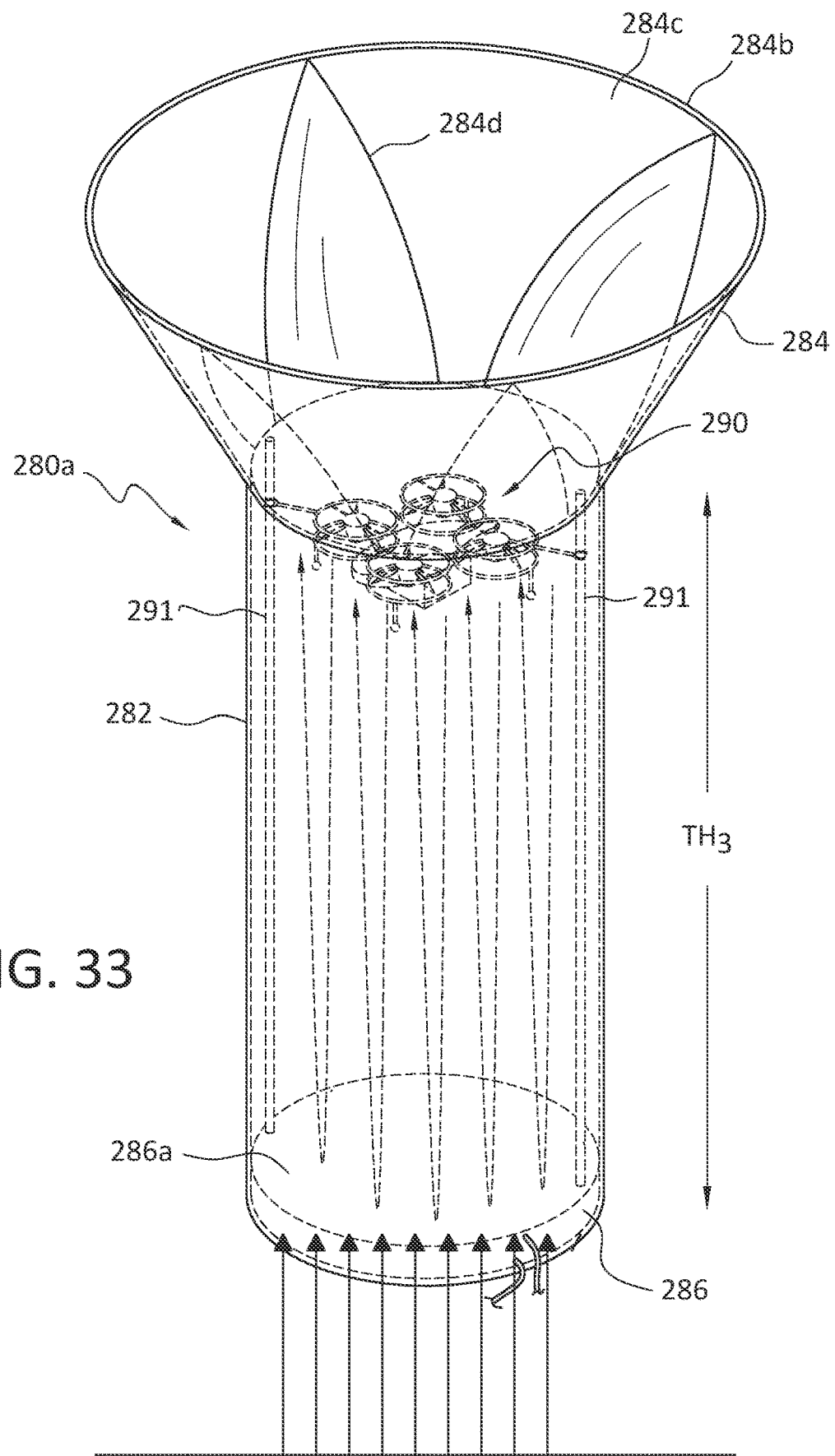
Figure 35:
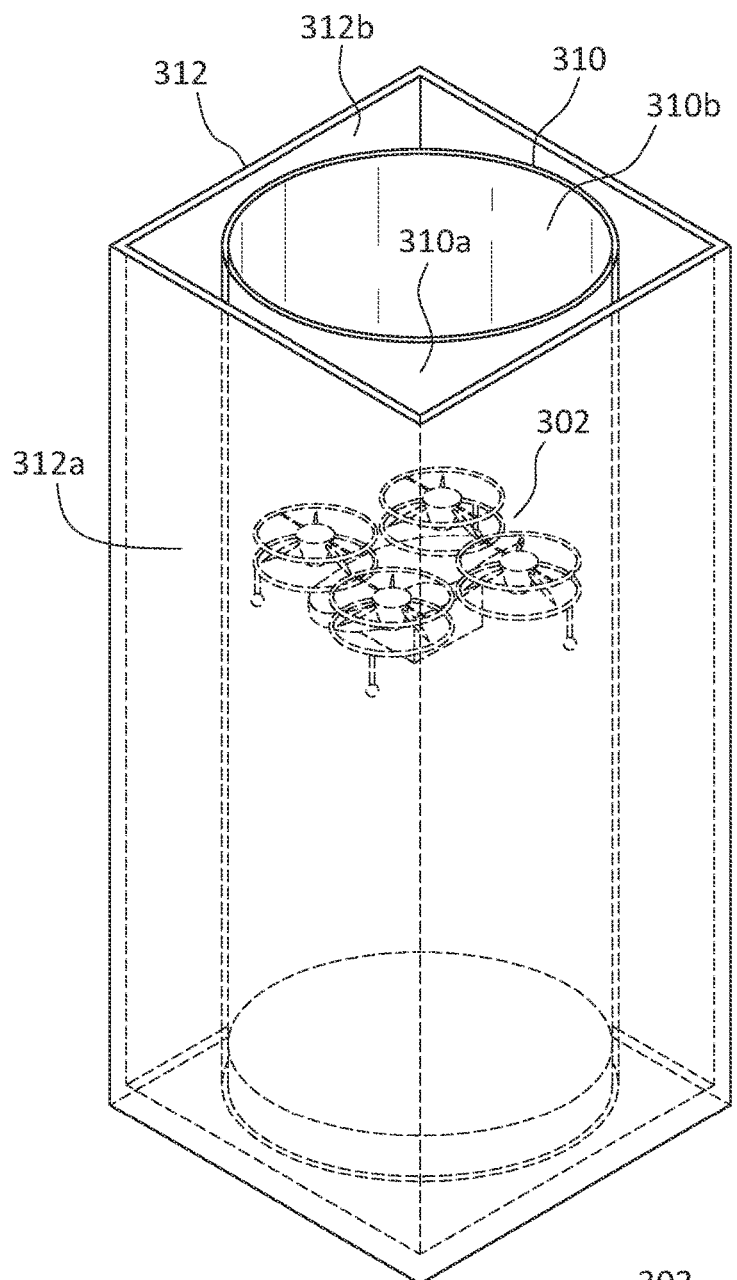
Figure 36:
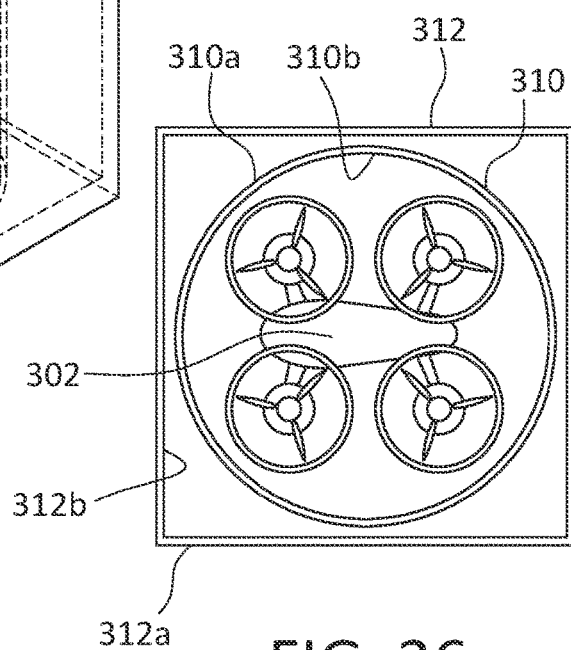
Figure 37A:
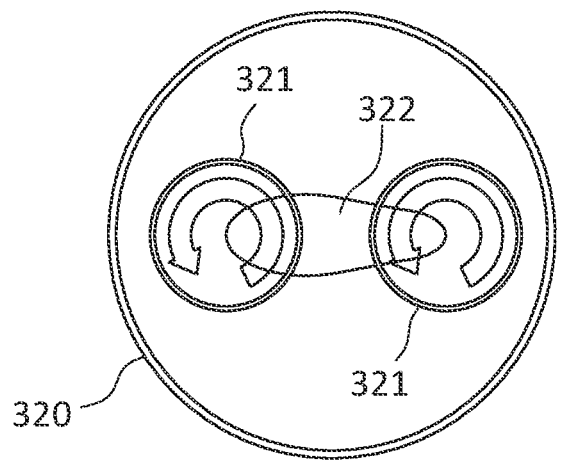
Figure 37B:
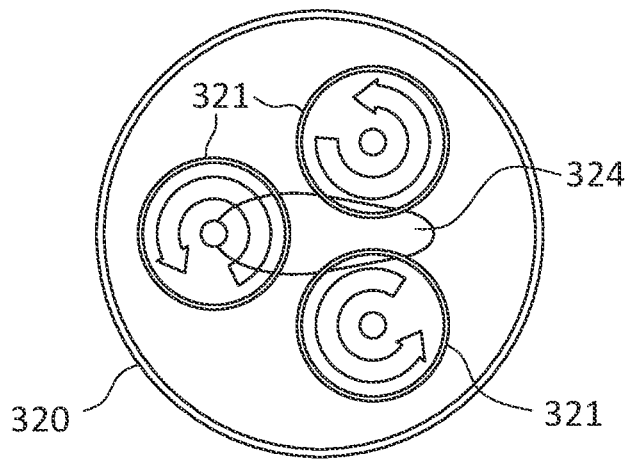
Figure 37C:
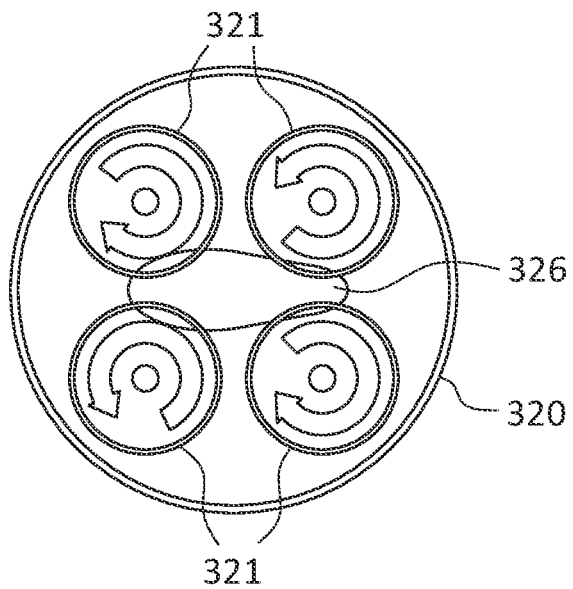
Figure 38A:
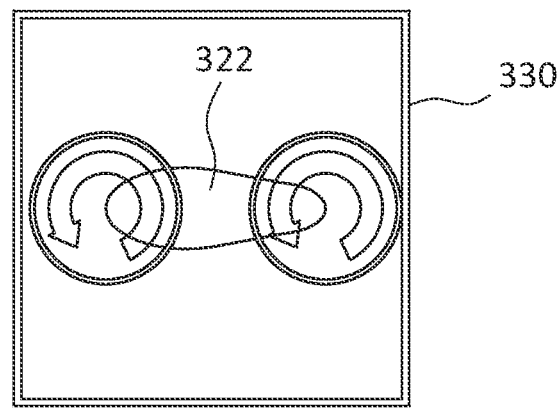
Figure 38B:
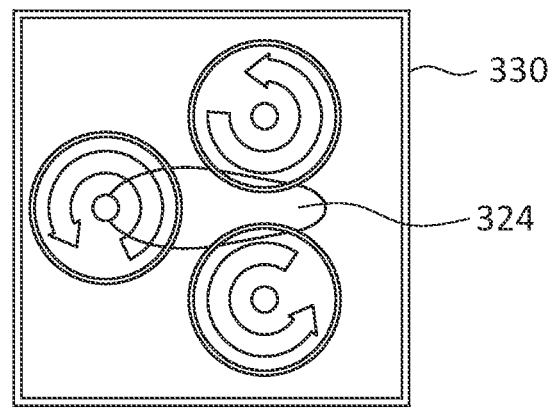
Figure 38C:
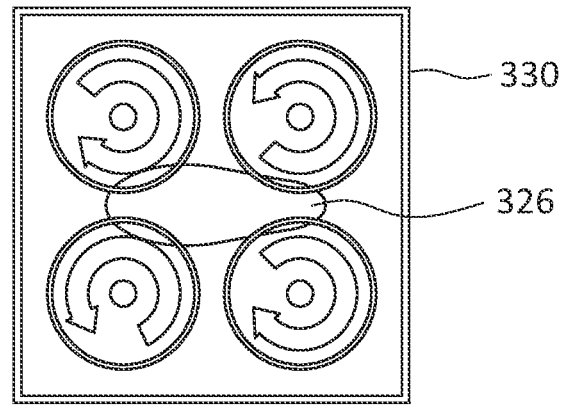
Figure 39A:
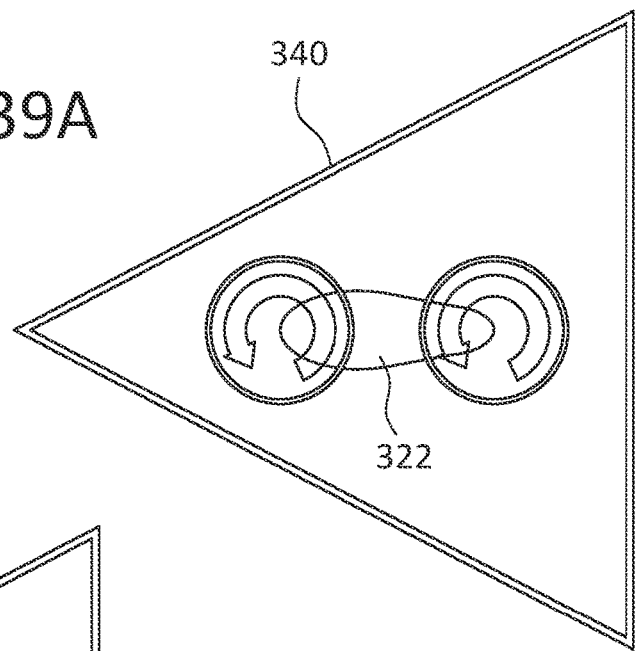
Figure 39B:
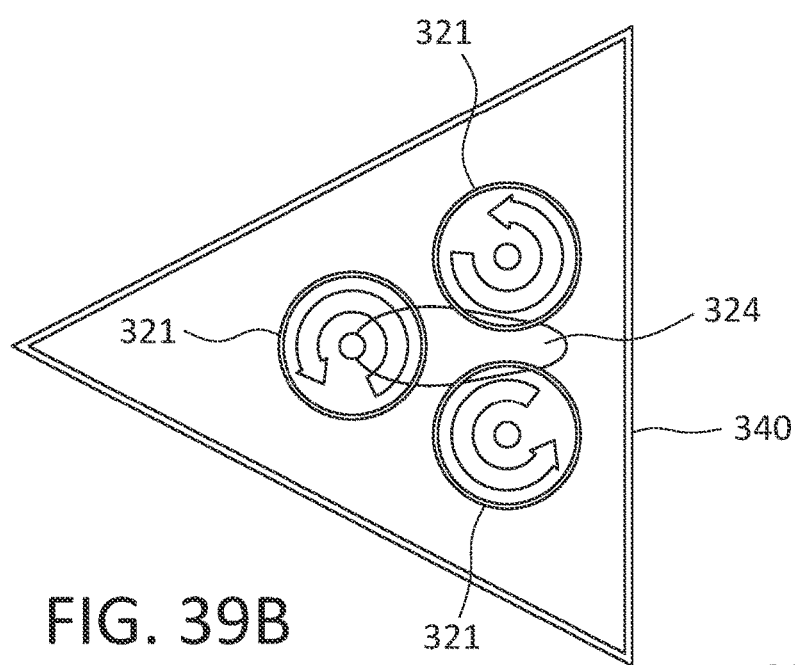
Figure 39C:
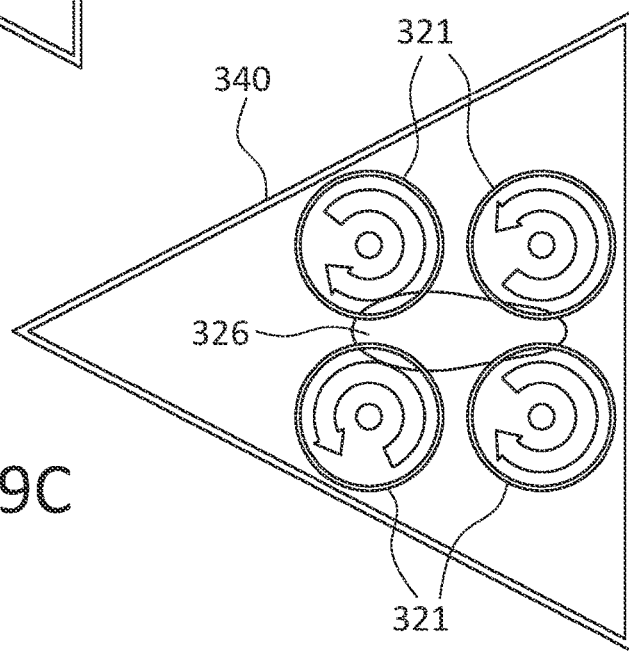
Figure 40A:
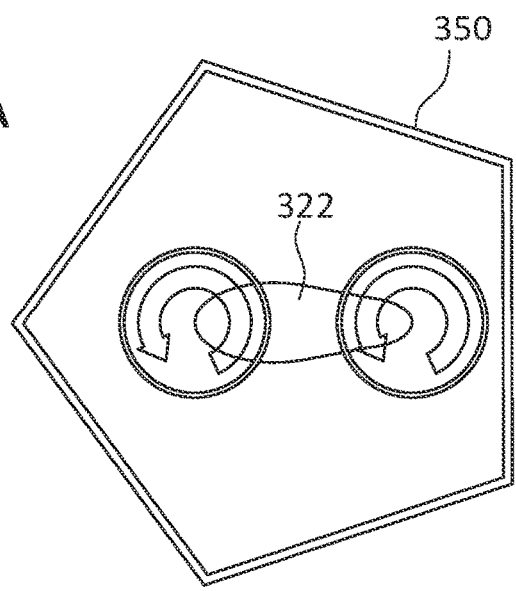
Figure 40B:
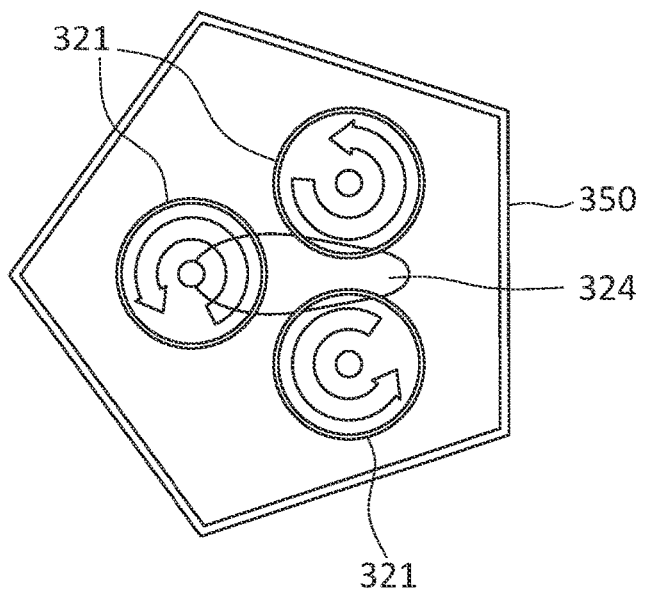
Figure 40C:
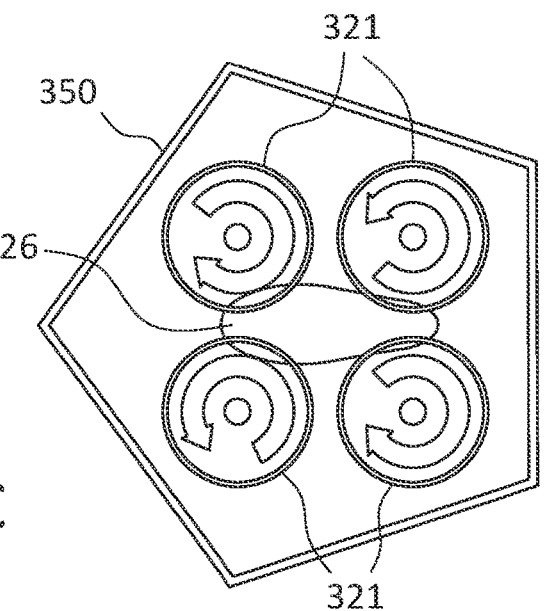
Figure 42A:
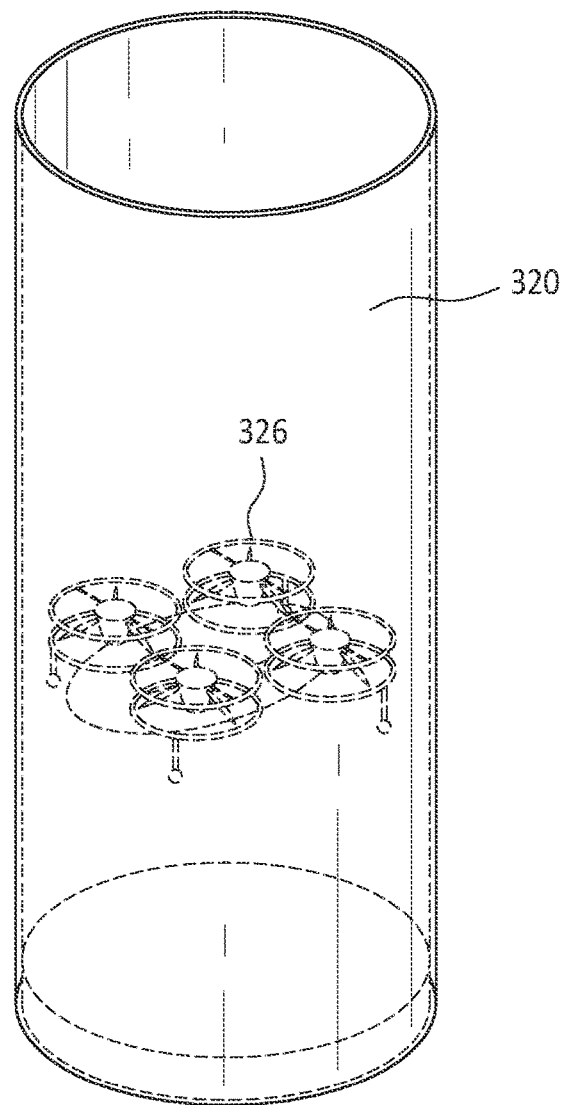
Figure 42B:
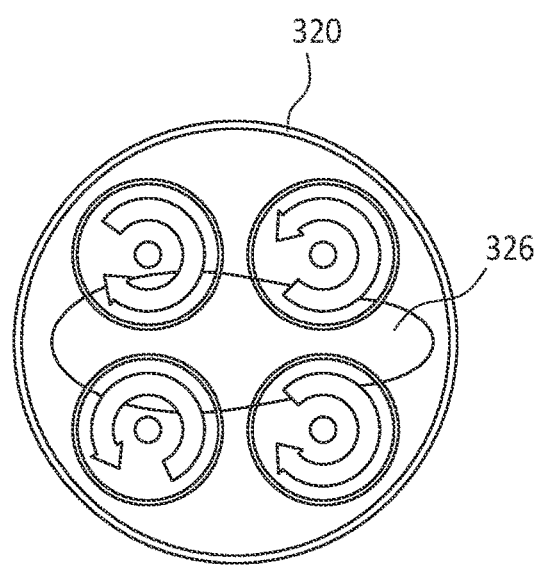
Figure 43A:
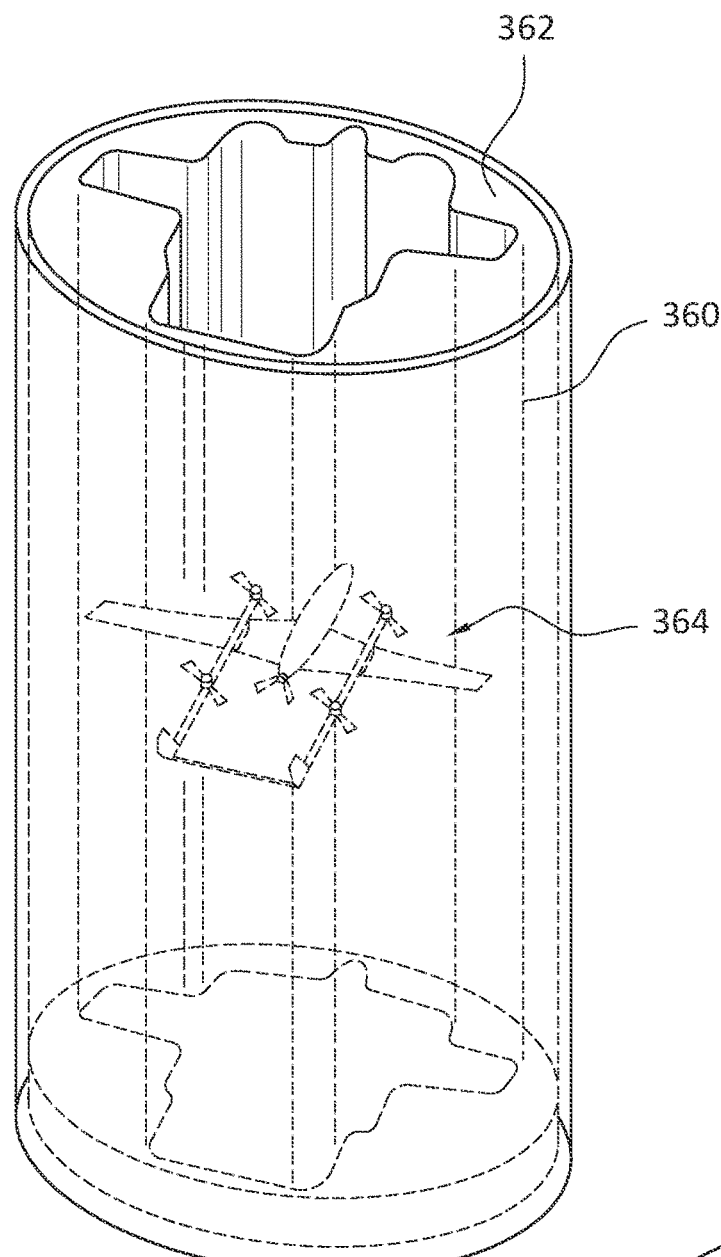
Figure 43B:
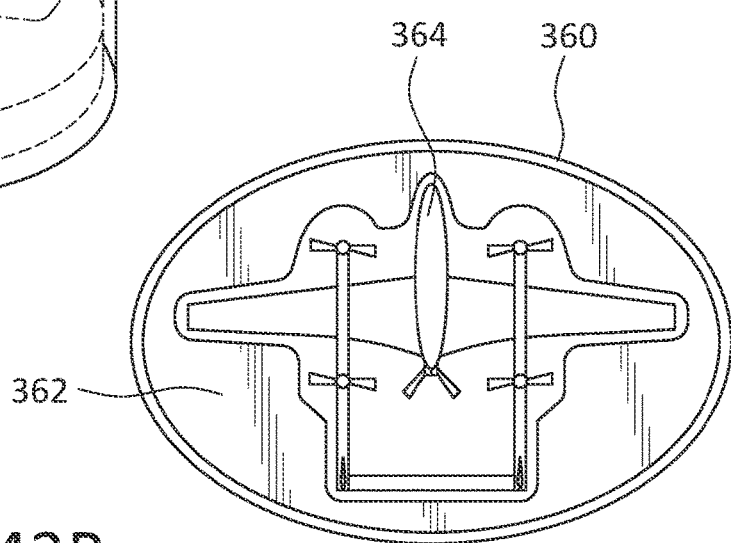
Figure 44:
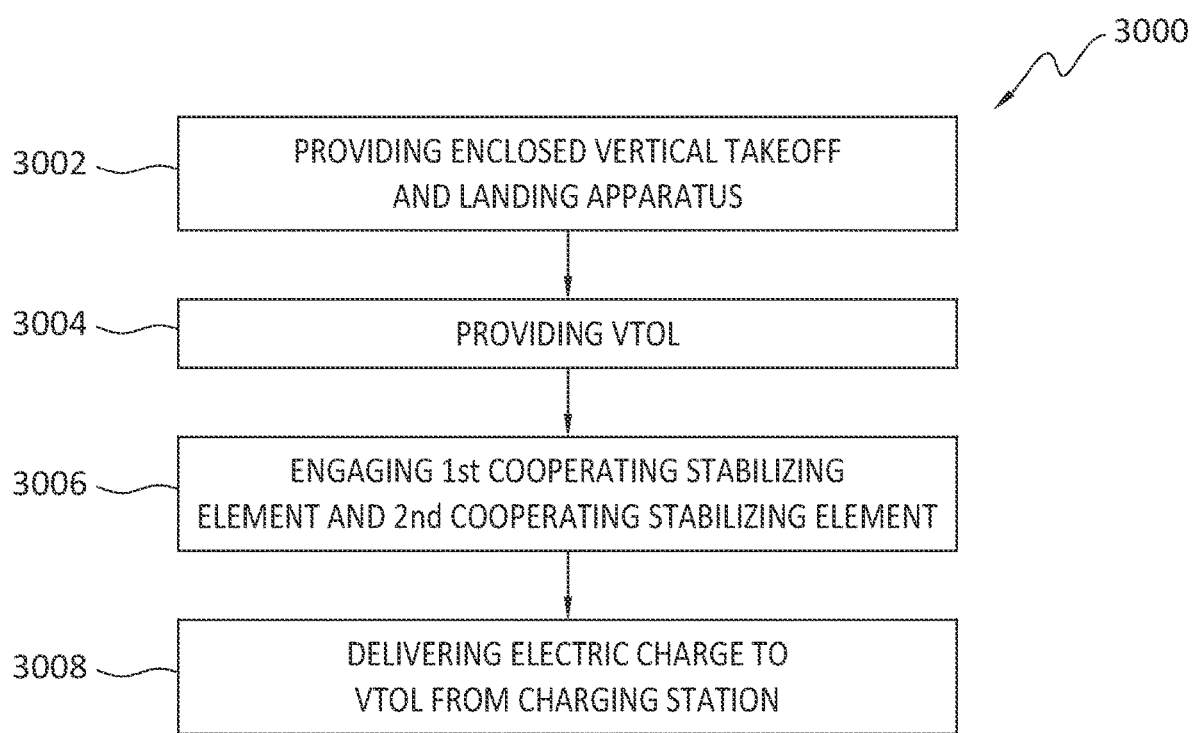
Figure 45:
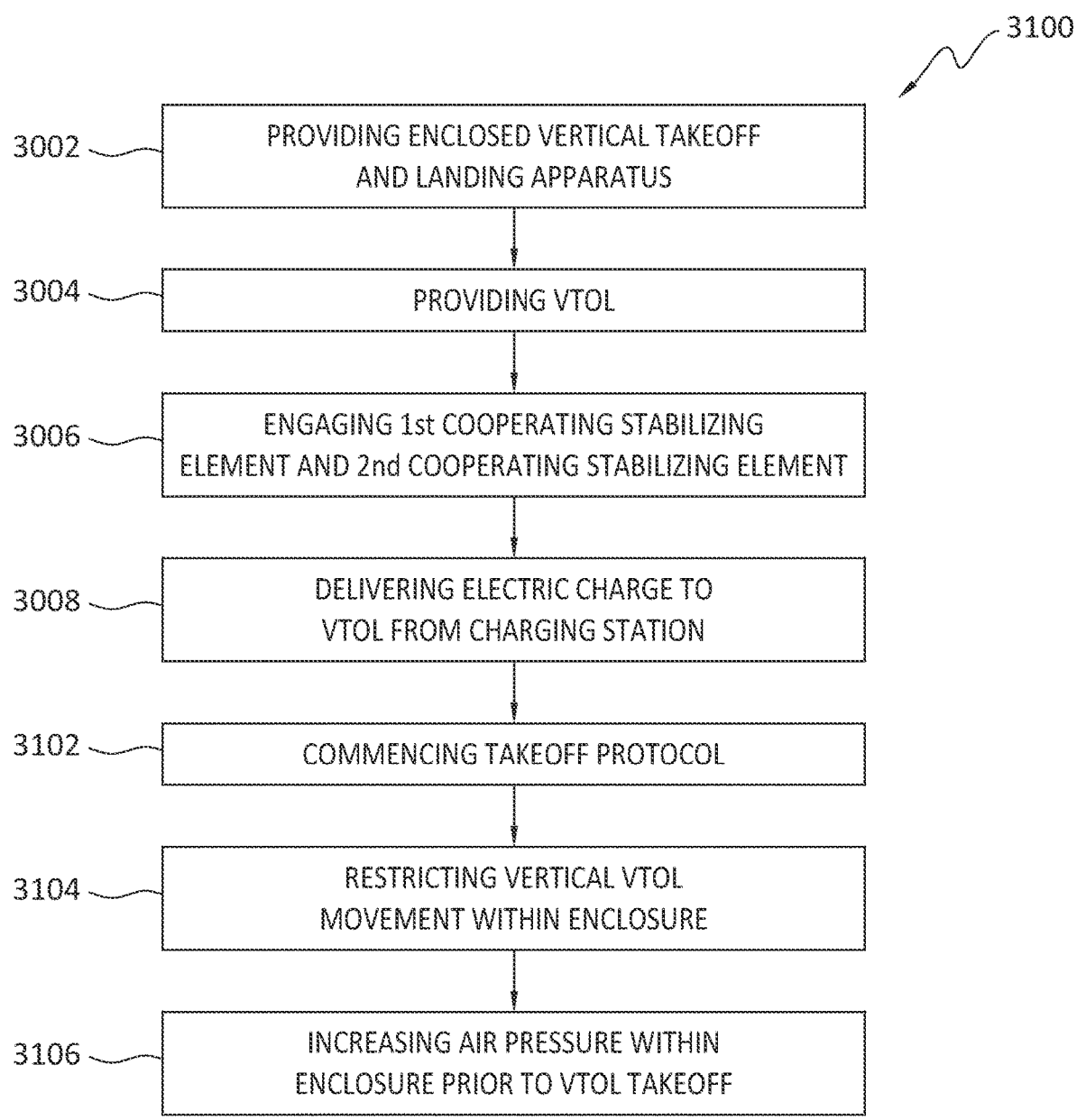
Figure 46:
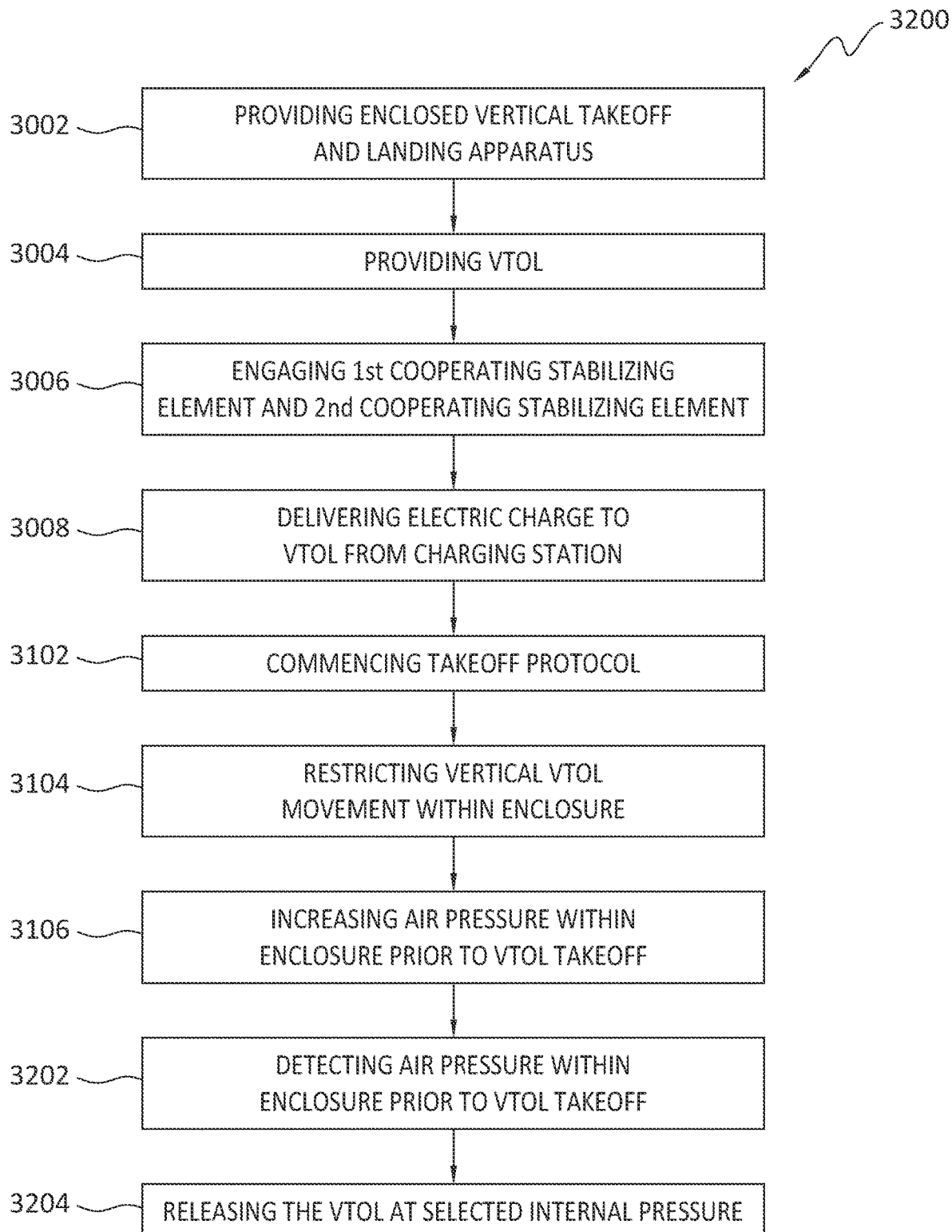
Figure 47:
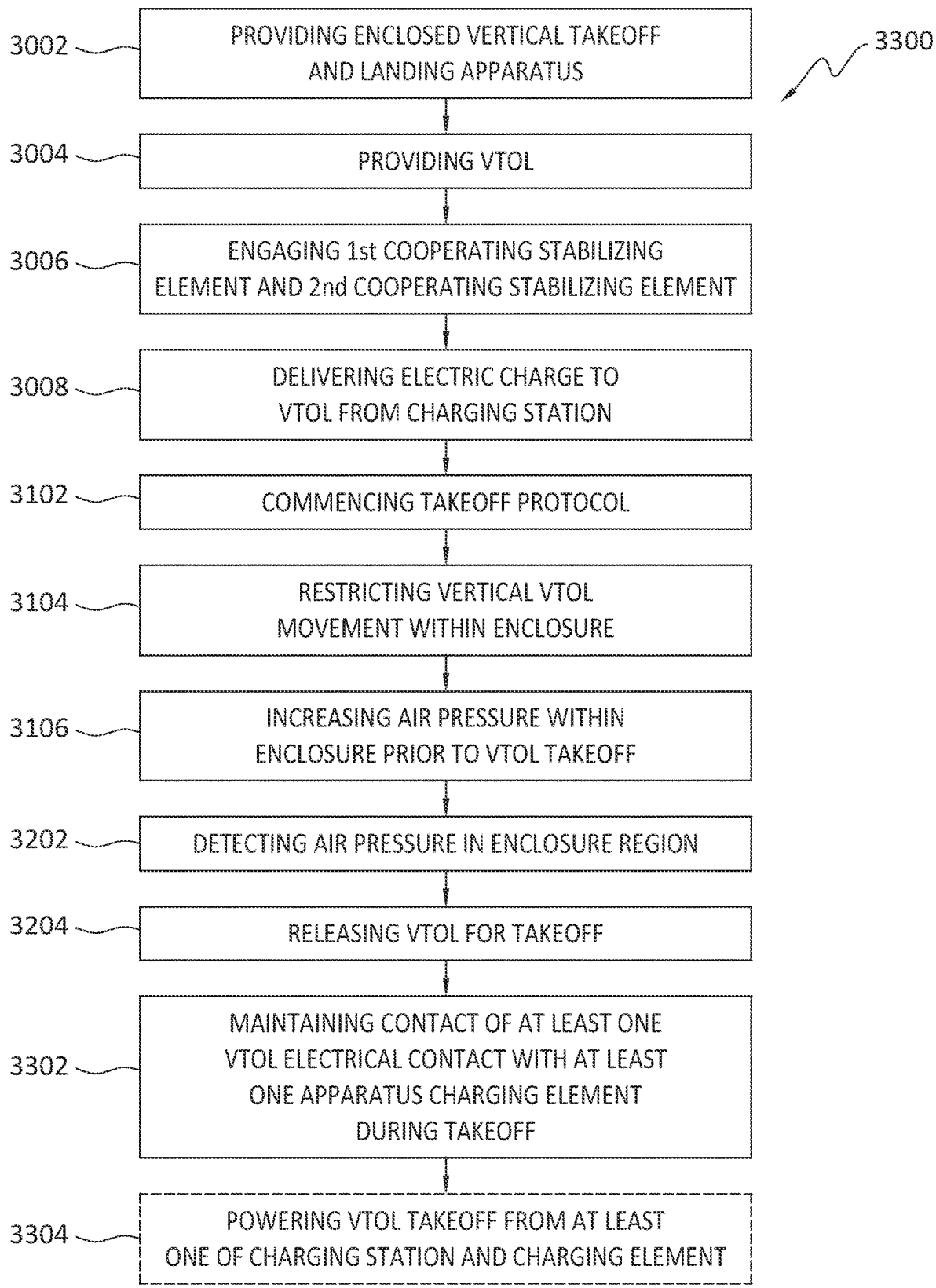

Having thus described variations of the disclosure in general terms, reference will now be made to the accompanying drawings, which are not necessarily drawn to scale, and wherein:

FIG. 1 is a perspective view of a vertical takeoff and landing vehicle (VTOL) according to present aspects;

FIG. 2 is an overhead view of a VTOL engaging a presently disclosed apparatus, according to present aspects;

FIG. 3A is an illustration of a VTOL engaging a presently disclosed apparatus, according to present aspects;

FIG. 3B is an illustration of a VTOL engaging a presently disclosed apparatus, during takeoff, with FIG. 3B further illustrating the VTOL disengaging from presently disclosed apparatus during a takeoff and according to present aspects;

FIG. 4A shows a mating arrangement of first (female) and second (male) cooperating stabilizer elements in an engaged configuration, and according to present aspects;

FIG. 4B shows a mating arrangement of further first (female) and second (male) cooperating stabilizer elements in an engaged configuration, and according to present aspects;

FIG. 4C shows a mating arrangement of further first (female) and second (male) cooperating stabilizer elements in an engaged configuration, and according to present aspects;

FIG. 4D shows a mating arrangement of further first (female) and second (male) cooperating stabilizer elements in an engaged configuration, and according to present aspects;

FIG. 4E shows a mating arrangement of further first (female) and second (male) cooperating stabilizer elements in an engaged configuration, and according to present aspects;

FIG. 4F shows a mating arrangement of further first (female) and second (male) cooperating stabilizer elements in an engaged configuration, and according to present aspects;

FIG. 5A shows a perspective view that can be a side view or an overhead view of a standoff comprising a male cooperating stabilizer element according to present aspects;

FIG. 5B shows a perspective view that can be a side view or an overhead view of a standoff comprising a male cooperating stabilizer element according to present aspects;

FIG. 5C shows a perspective view that can be a side view or an overhead view of a standoff comprising a male cooperating stabilizer element according to present aspects;

FIG. 5D shows a perspective view that can be a side view or an overhead view of a standoff comprising a male cooperating stabilizer element according to present aspects;

FIG. 5E shows a perspective view that can be a side view or an overhead view of a standoff comprising a male cooperating stabilizer element according to present aspects;

FIG. 5F shows a perspective view that can be a side view or an overhead view of a standoff comprising a male cooperating stabilizer element according to present aspects;

FIG. 6A shows a mating arrangement of first (male) and second (female) cooperating stabilizer elements in an engaged configuration, and according to present aspects;

FIG. 6B shows a mating arrangement of further first (male) and second (female) cooperating stabilizer elements in an engaged configuration, and according to present aspects;

FIG. 6C shows a mating arrangement of further first (male) and second (female) cooperating stabilizer elements in an engaged configuration, and according to present aspects;

FIG. 6D shows a mating arrangement of further first (male) and second (female) cooperating stabilizer elements in an engaged configuration, and according to present aspects;

FIG. 6E shows a mating arrangement of further first (male) and second (female) cooperating stabilizer elements in an engaged configuration, and according to present aspects;

FIG. 7A shows a top view of a standoff comprising a female cooperating stabilizer element according to present aspects;

FIG. 7B shows a top view of a standoff comprising a female cooperating stabilizer element according to present aspects;

FIG. 7C shows a top view of a standoff comprising a female cooperating stabilizer element according to present aspects;

FIG. 7D shows a top view of a standoff comprising a female cooperating stabilizer element according to present aspects;

FIG. 7E shows a top view of a standoff comprising a female cooperating stabilizer element according to present aspects;

FIG. 7F shows a top view of a standoff comprising a female cooperating stabilizer element according to present aspects;

FIG. 8A shows a top view of a standoff comprising a female cooperating stabilizer element according to present aspects;

FIG. 8B shows a top view of a standoff comprising a female cooperating stabilizer element according to present aspects;

FIG. 8C shows a top view of a standoff comprising a female cooperating stabilizer element according to present aspects;

FIG. 9A shows a landing VTOL approaching a presently disclosed apparatus according to present aspects;

FIG. 9B shows a landing VTOL engaging a presently disclosed apparatus according to present aspects;

FIG. 9C shows an overhead view of an apparatus shown in FIGS. 9A and 9B;

according to present aspects;

FIG. 10A shows a landing VTOL approaching a presently disclosed apparatus according to present aspects;

FIG. 10B shows a landing VTOL engaging a presently disclosed apparatus according to present aspects;

FIG. 10C shows an overhead view of an apparatus shown in FIGS. 10A and 10B, according to present aspects;

FIG. 11A shows an apparatus according to present aspects;

FIG. 11B shows an overhead view of an apparatus shown in FIG. 11A, according to present aspects;

FIG. 12A shows an alternate apparatus according to present aspects;

FIG. 12B shows an overhead view of an apparatus shown in FIG. 12A, according to present aspects;

FIG. 12C shows a side view of an apparatus shown in FIG. 12A, according to present aspects;

FIG. 13 shows an apparatus according to present aspects;

FIG. 14A shows an apparatus according to present aspects;

FIG. 14B shows an overhead view of an apparatus shown in FIG. 14A, according to present aspects;

FIG. 14C shows a side view of an apparatus shown in FIGS. 14A and 14B, according to present aspects;

FIG. 15A shows an apparatus according to present aspects;

FIG. 15B shows an overhead view of an apparatus shown in FIG. 15A, according to present aspects;

FIG. 16A shows an apparatus according to present aspects;

FIG. 16B shows an overhead view of an apparatus shown in FIG. 16A, according to present aspects;

FIG. 17A shows a VTOL takeoff and landing stabilizing apparatus with guide, according to present aspects;

FIG. 17B shows a VTOL takeoff and landing stabilizing apparatus with guide, according to present aspects;

FIG. 17C shows a box diagram of a control box, according to present aspects;

FIG. 18A shows a VTOL takeoff and landing stabilizing apparatus with a plurality of guides, according to present aspects;

FIG. 18B shows a VTOL takeoff and landing stabilizing apparatus with guide, according to present aspects;

FIG. 18C shows an enlarged view of a slotted guide of a VTOL takeoff and landing stabilizing apparatus with guide, according to present aspects;

FIG. 19 shows a VTOL takeoff and landing stabilizing apparatus, according to present aspects;

FIG. 20 shows a VTOL takeoff and landing stabilizing apparatus, according to present aspects;

FIG. 21 shows a VTOL takeoff and landing stabilizing apparatus, according to present aspects;

FIG. 22 shows a VTOL takeoff and landing stabilizing apparatus, according to present aspects;

FIG. 23 shows a VTOL takeoff and landing stabilizing apparatus, according to present aspects;

FIG. 24 shows a VTOL takeoff and landing stabilizing apparatus proximate to a dwelling, according to present aspects;

FIG. 25A shows a VTOL takeoff and landing stabilizing apparatus proximate to a dwelling, according to present aspects;

FIG. 25B shows a VTOL takeoff and landing stabilizing apparatus proximate to a dwelling, according to present aspects;

FIG. 26A shows a VTOL takeoff and landing stabilizing apparatus proximate to a dwelling, according to present aspects;

FIG. 26B shows a VTOL takeoff and landing stabilizing apparatus proximate to a dwelling, according to present aspects;

FIG. 27A shows a VTOL takeoff and landing stabilizing apparatus proximate to a dwelling, according to present aspects;

FIG. 27B shows a VTOL takeoff and landing stabilizing apparatus proximate to a dwelling, according to present aspects;

FIG. 28 shows a VTOL takeoff and landing stabilizing apparatus, according to present aspects;

FIG. 29 shows a VTOL takeoff and landing stabilizing apparatus, according to present aspects;

FIG. 30 shows a VTOL takeoff and landing stabilizing apparatus, according to present aspects;

FIG. 31 shows a VTOL takeoff and landing stabilizing apparatus, according to present aspects;

FIG. 32 shows a VTOL takeoff and landing stabilizing apparatus, according to present aspects;

FIG. 33 shows a VTOL takeoff and landing stabilizing apparatus, according to present aspects;

FIG. 34A shows a VTOL takeoff and landing stabilizing apparatus, according to present aspects;

FIG. 34B shows an overhead view of the VTOL takeoff and landing stabilizing apparatus of FIG. 34A, according to present aspects;

FIG. 35 shows a VTOL takeoff and landing stabilizing apparatus, according to present aspects;

FIG. 36 shows an over heads view of the VTOL takeoff and landing stabilizing apparatus of FIG. 35, according to present aspects;

FIG. 37A shows an overhead view of a VTOL takeoff and landing stabilizing apparatus, according to present aspects;

FIG. 37B shows an overhead view of a VTOL takeoff and landing stabilizing apparatus, according to present aspects;

FIG. 37C shows an overhead view of a VTOL takeoff and landing stabilizing apparatus, according to present aspects;

FIG. 38A shows an overhead view of a VTOL takeoff and landing stabilizing apparatus, according to present aspects;

FIG. 38B shows an overhead view of a VTOL takeoff and landing stabilizing apparatus, according to present aspects;

FIG. 38C shows an overhead view of a VTOL takeoff and landing stabilizing apparatus, according to present aspects;

FIG. 39A shows an overhead view of a VTOL takeoff and landing stabilizing apparatus, according to present aspects;

FIG. 39B shows an overhead view of a VTOL takeoff and landing stabilizing apparatus, according to present aspects;

FIG. 39C shows an overhead view of a VTOL takeoff and landing stabilizing apparatus, according to present aspects;

FIG. 40A shows an overhead view of a VTOL takeoff and landing stabilizing apparatus, according to present aspects;

FIG. 40B shows an overhead view of a VTOL takeoff and landing stabilizing apparatus, according to present aspects;

FIG. 40C shows an overhead view of a VTOL takeoff and landing stabilizing apparatus, according to present aspects;

FIG. 41A shows a VTOL takeoff and landing stabilizing apparatus, according to present aspects;

FIG. 41B shows an overhead view of the VTOL takeoff and landing stabilizing apparatus of FIG. 41A, according to present aspects;

FIG. 42A shows a VTOL takeoff and landing stabilizing apparatus, according to present aspects;

FIG. 42B shows an overhead view of the VTOL takeoff and landing stabilizing apparatus of FIG. 42A, according to present aspects;

FIG. 43A shows a VTOL takeoff and landing stabilizing apparatus, according to present aspects;

FIG. 43B shows an overhead view of the VTOL takeoff and landing stabilizing apparatus of FIG. 43A, according to present aspects;

FIG. 44 is a flowchart outlining a present method, according to present aspects;

FIG. 45 is a flowchart outlining a present method, according to present aspects;

FIG. 46 is a flowchart outlining a present method, according to present aspects; and FIG. 47 is a flowchart outlining a present method, according to present aspects.

DETAILED DESCRIPTION

Present aspects overcome significant drawbacks confronting the use of vertical takeoff and landing vehicles (VTOLs) for the point-to-point delivery and transport of payloads (e.g., packages, equipment, etc.) and personnel, including significant issues that occur during the takeoff and landing of VTOLs such as, for example, noise, excessive turbulence caused by rotor generated ground effect air pressure, vehicle instability, safety concerns, ground structure damage, VTOL damage, etc.

For example, when typical VTOLs land and takeoff, directional airflow generated by a VTOL during takeoff and landing can generate air turbulence including air turbulence referred to as "ground effect" that can de-stabilize and otherwise interfere with, and otherwise increase the difficulty of a VTOL's takeoff and landing protocol. For example, as a VTOL is engaged in a landing (e.g., a descent from an airborne position to the ground or other solid structure, landing pad, etc., that may be located above or below ground level), airflow pressure can be generated by the operating rotors in a directional airflow from rotors that can be initially "downward" from the VTOL, and then "outward" and away from the VTOL. At distances above ground level, the airflow from the rotors dissipates, at least to an extent, with minimal or no deflected return airflow from the rotors directed back toward, or otherwise impacting the VTOL.

As the VTOL continues a descent and approaches the ground, the initial airflow pressure generated from the rotors impacts the ground and is deflected back as deflected airflow pressure in, at least an upward direction from the ground back to the VTOL. In a typical VTOL landing the airflow directional deflections progressively increase as the VTOL nears a landing location (e.g., ground, landing pad, etc.). The maximum airflow directional deflection can typically occur at the point in time that the VTOL "lands" and the VTOL impacts a landing location, and the airflow directional deflections can destabilize the VTOL, cause vibrations, buffeting, turbulence, etc. That is, air turbulence increases as directional airflow not only deflects from the ground vertically back to the VTOL (e.g., in an upward direction), but directional airflow also is deflected in non-vertical directions that can interrupt or "cut through" the downward airflow from the rotors, and that can contribute to VTOL instability and otherwise contribute to an increasing lateral force and an increasing vertical force (e.g., an increase in forces associated with and forces that can otherwise contribute to, for example, pitch, roll, and yaw, etc.) on the VTOL during landing (and takeoff). Such forces can frustrate and otherwise render an unpredictable and turbulent VTOL landing, rather than a desired smooth and turbulence-free VTOL landing devoid of such omnipresent variable and potentially destabilizing vertical and lateral forces imposed on the VTOL. The combined effects of airflow deflection caused by rotor generated airflow impacting and being deflected from a landing surface (e.g., ground, landing pad, etc.) and the resulting air turbulence and force converted from a downward direction to a lateral direction is collectively referred to herein as "ground effect".

Such undesirable forces impacting on a VTOL, for example, during VTOL takeoff and/or landing, can hinder the takeoff and/or landing and imperil ground structures, damage the VTOL, injure ground personnel, etc., as airflow directional deflections reach a maximum effect and that can further destabilize the VTOL, causing vibrations, buffeting, turbulence, etc.

According to present aspects, the actuated rotational vehicle fixtures that provide the mechanical forces necessary for vertical lift of the VTOLs, can be vertical propulsion units including, for example, jets, propellers, and rotors, with the vertical propulsion units equivalently and interchangeably referred to herein as "rotors". That is, the term "rotors" as used herein includes both propellers, vertical propulsion units, jets, and rotors.

According to present aspects, apparatuses, systems, and methods significantly ameliorate or substantially eliminate the existing issues attending VTOLs, including during VTOL takeoff and landing. FIG. 1 shows a VTOL 20 according to present aspects including a vehicle body 22, a battery 21 (that can be a rechargeable battery), with at least one rotor assembly 23 (shown in FIG. 1 as four rotor assemblies) in communication with the vehicle body 22. The rotor assembly 23 comprises a rotor 24 with a rotor guard 26 oriented circumferentially to protect the rotor, with the rotor guard having a radius exceeding the length of the rotor such that the rotor, in operation, does not impact the rotor guard. When a VTOL employs a propeller, the rotor guard can be termed a propeller guard, and the diameter of the circumferential propeller guard exceeds the length of the propeller. FIG. 1 further shows a VTOL standoff 28 having a standoff first end 28a attached to or integral with and outwardly extending from a rotor guard 26. Each VTOL standoff 28 further comprises a standoff second end 28b terminating in a second cooperating stabilizer element 29.

Second cooperating stabilizer element 29 of VTOL standoff 28 is configured to attach to a first cooperating stabilizer element 34 of a vertically-oriented support element 32 in an apparatus 30, as shown in FIG. 2. According to further present aspects, the term "vertically-oriented support element" is defined as a support element comprising an angle measured at the vertically-oriented support element first end with respect to a plane established by a substantially horizontal base or with respect to a plane established substantially perpendicular to the vertically-oriented support element first end, and with the angle ranging from about 10° to about 90°, preferably with the angle ranging from about 30° to about 90°, band more preferably with the angle ranging from about 70° to about 90°.

FIG. 2 shows an overhead view (e.g., a "top" view) of the VTOL 20 shown in FIG. 1 in a process that includes landing and coming into contact with apparatus 30 such that the second cooperating stabilizer element 29 of each standoff 28 extending from VTOL 20 has engaged first cooperating stabilizer element 34 of each of the four vertically-oriented support elements 32 of apparatus 30. As shown in FIG. 2, the second cooperating stabilizer element 29 of the standoff 28 of the VTOL 20 is shown as a "male" fixture that engages or is inserted into the "female" or receiving first cooperating stabilizer element 34 of the vertically-oriented support element 32. The remainder of the elements of the VTOL 20 shown in FIG. 2 are numbered in similar fashion to that as provided in FIG. 1.

According to present aspects, a VTOL can include standoffs 28 that incorporate a second incorporating element 29 that can be a male fixture configured to engage and become inserted into a second cooperating feature on a vertically-oriented support element that can include, or itself be, a female fixture (that can be configured and dimensioned to engage with the male fixture of the first cooperating stabilizer element 29 of the standoff 28 located on the VTOL). One arrangement of this type is illustrated in FIGS. 1 and 2.

In further present aspects, for example, as shown in FIGS. 3A and 3B, a VTOL can include standoffs 28 that incorporate a second cooperating element 49 that can be a female fixture configured to receive and become engaged with a first cooperating feature on a vertically-oriented support element 42 that can include a male fixture, or that can, itself be a male fixture (e.g., that can be configured and dimensioned to engage with the female fixture of the second cooperating stabilizer element 49 of the standoff 28 located on the VTOL).

FIG. 3A shows a simplified VTOL takeoff and landing stabilizing apparatus 41a, according to present aspects (and referred to equivalently herein as a "VTOL takeoff and landing apparatus" or a "VTOL apparatus"), for facilitating takeoff (e.g., launching) and landing a VTOL 40, with the VTOL 40 including a vehicle body 22 with at least one of rotor assemblies 23 (shown in FIG. 3A as four rotor assemblies) in communication with the vehicle body 22. Aside from the difference in the second cooperating stabilizer element located at the second end of the standoffs, the VTOL 40 shown in FIGS. 3A and 3B incorporates the enumerated parts shown for VTOL 20 in FIGS. 1 and 2. As shown in FIGS. 1 and 2, VTOL standoff 28 includes a standoff first end 28a attached to or integral with and outwardly extending from each rotor guard 26. Each VTOL standoff 28 further comprises a standoff second end 28b terminating in a second cooperating stabilizer element 29.

As shown in FIGS. 3A and 3B second cooperating stabilizer element 49 of VTOL standoff 28 is configured to attach to a vertically-oriented support element 42 in an apparatus 41a, as shown in FIG. 3A, with the vertically-oriented support element 42 having a vertically-oriented support element first end 42a, and a vertically-oriented support element second end 42b. Vertically-oriented support element 42 appears in FIG. 3A as a single element that can be, for example, a pole anchored to or otherwise in communication with a base (not shown) that can be, for example, the ground or a fixture in contact with the ground 16 at, or proximate to, ground level.

The term vertically-oriented support element does not necessarily dictate that the pole is purely vertical. In some aspects, the pole or vertically-oriented support element is at least a 45 degree angle from the base or ground where the VTOL could land or take off at an angle. In some aspects, the pole or vertically-oriented support element is almost horizontal (e.g., about 1 degree From horizontal) and emanates from the side of a building, where the VTOL could land or take off sideways from the building. In some aspects, the vertically-oriented support element is curved or in other ways non-linear. Accordingly, the term "vertically-oriented support element" should be construed to comprise a pole or extension to which the VTOL can attach or detach from almost any angle.

FIG. 3B shows a VTOL takeoff and landing stabilizing apparatus 41b, according to present aspects, for facilitating takeoff (e.g., launching) and landing a VTOL 40, with the VTOL 40 including a vehicle body 22 with a plurality of rotor assemblies 23 (shown in FIG. 3A as four rotor assemblies) in communication with the vehicle body 22. One of the two second cooperating stabilizer elements 49 of one of the two VTOL standoffs 28 are configured to attach to a vertically-oriented support element 42 in an apparatus 41b, as shown in FIG. 3B, with the vertically-oriented support element having a vertically-oriented support element first end 42a, and a vertically-oriented support element second end 42b. Vertically-oriented support elements 42 appears in FIG. 3B as two elements that can be, for example, two poles anchored to or otherwise in communication with a base (not shown) that can be, for example, the ground or a fixture in contact with the ground 16 at, or proximate to, e.g., ground level.

As exemplified in FIG. 3A and/or FIG. 3B, during a VTOL landing procedure, as a VTOL 40 approaches apparatus 41a, 41b the second cooperating stabilizer element 49 of the VTOL standoff 28 engages the top of the vertically-oriented support element 42 of, for example, apparatus 41a, 41b. The VTOL can then descend, and while ground effect is experienced during the descent of the VTOL to ground level, the turbulent energy 43 from the ground effect (represented by the arrows in FIGS. 3A and 3B) is transferred from the VTOL to the vertically-oriented support element such that the VTOL descent is significantly stabilized as the ground effect on the VTOL is significantly minimized or eliminated. Although not shown in FIGS. 3A, 3B, the vertically-oriented support elements 42 of apparatus 41a, 41b can be anchored into the ground 16, or can be attached or otherwise in fixed communication with a base that is in communication with the ground, or a structure that can be, for example, proximate to the ground.

Note that the term "vertically-oriented support element" does not necessarily dictate that the poles or vertically-oriented support elements are purely vertical. In some aspects the poles or vertically-oriented support elements are at least a 45 degree angle from the base or ground wherein the VTOL could land into them or take off from them at an angle. In some aspects the poles or vertically-oriented support elements are almost horizontal (e.g., about 1 degree From horizontal) and emanate from the side of a building, where the VTOL could land or take off sideways or nearly horizontally from the building. In some aspects, the vertically-oriented support elements are be curved or in other ways non-straight, although they would generally be in parallel. Accordingly, the term "vertically-oriented support element" should be construed to comprise poles or extensions, or members to which the VTOL can attach or detach from almost any angle to support and/or stabilize the VTOL.

According to present aspects, the standoffs integral with or attached to the VTOLs can comprise the "male" or "female" second cooperating stabilizer element at the terminus of the second end of the standoff, with the selection made according to the selected features incorporated into, attached to or integral with the vertically-oriented support element of the present apparatuses. That is, the first cooperating stabilizer element on the vertically-oriented support element and the second cooperating stabilizer element of the VTOL standoff are selected to "mate" or interlock.

FIGS. 4A-4F are representative and enlarged overhead or "top" views of assemblies 50a, 50b, 50c, 50d, 50e, and 50f of engaged first and second cooperating stabilizer elements, with the varying first cooperating stabilizer elements 52a, 52,b, 52c, 52d, 52e, 52f (shown in FIGS. 4A, 4B, 4C, 4D, 4E, 4F respectively) integral with or attached to, or otherwise in communication with, the vertically-oriented support element 54a, 54b, 54c, 54d, 54e, 54f of a VTOL takeoff and landing stabilizing apparatus and shown as being a type of "female" fixture. FIGS. 4A-4F further show an engaged second cooperating stabilizer element of VTOL standoff 28 in communication with or integral with a second cooperating stabilizer element 29 shown as a "male" fixture dimensioned to engage the "female" first cooperating stabilizer element 52a, 52,b, 52c, 52d, 52e, 52f of the associated and corresponding vertically-oriented support element 54a, 54b, 54c, 54d, 54e, 54f. The geometries shown of the fixtures and elements in FIGS. 4A-4F are representative and are non-exhaustive, with additional geometries (including, e.g., cross-sectional geometries, mating geometries, etc.) for the vertically-oriented support element and the first and second cooperating features contemplated by the present aspects.

More specifically, FIG. 4A shows an assembly 50a with the VTOL standoff 28 in communication with or integral with a second cooperating stabilizer element 29 shown as a "male" fixture dimensioned to engage the "female" first cooperating stabilizer element 52a of the associated vertically-oriented support element 54a. FIG. 4B shows an assembly 50b with the VTOL standoff 28 in communication with or integral with a second cooperating stabilizer element 29 shown as a "male" fixture dimensioned to engage the "female" first cooperating stabilizer element 52b of the associated vertically-oriented support element 54b. FIG. 4C shows an assembly 50c with the VTOL standoff 28 in communication with or integral with a second cooperating stabilizer element 29 shown as a "male" fixture dimensioned to engage the "female" first cooperating stabilizer element 52c of the associated vertically-oriented support element 54c, with a spring element 53 positioned between and in communication with the "female" first cooperating stabilizer element 52c and the associated vertically-oriented support element 54c. The spring element 53 represent an element able to flex, absorb and/or dissipate vibrational or other forces that can attend ground effect turbulence, etc. The spring element can be, for example, an internal compression spring, a shock absorber, a telescoping extender, etc., and combinations thereof.

FIG. 4D shows an assembly 50d with the VTOL standoff 28 in communication with or integral with a second cooperating stabilizer element 29 shown as a "male" fixture dimensioned to engage the "female" first cooperating stabilizer element 52d of the associated vertically-oriented support element 54d, with the vertically-oriented support element 54d shown as comprising "I" beam configuration. FIG. 4E shows an assembly 50e with the VTOL standoff 28 in communication with or integral with a second cooperating stabilizer element 29 shown as a "male" fixture dimensioned to engage the "female" first cooperating stabilizer element 52e of the associated vertically-oriented support element 54e. FIG. 4F shows an assembly 50f with the VTOL standoff 28 in communication with or integral with a second cooperating stabilizer element 29 shown as a "male" fixture dimensioned to engage the "female" first cooperating stabilizer element 52f of the associated vertically-oriented support element 54f. The terms "standoff" and "standoff element" are used equivalently and interchangeably herein. Further the terms "standoff first end" and "standoff element first end" are used equivalently and interchangeably herein. In addition, the terms "standoff second end" and "standoff element second end" are used equivalently and interchangeably herein. When the standoff element protrudes from or is otherwise associated as part of a VTOL structure, the standoff element can be equivalently referred to as a "vehicle standoff element", "vehicle standoff", or "VTOL standoff".

As shown in FIGS. 4A-4F, the second cooperating stabilizer element 29 can extend longitudinally along the length of the associated vertically-oriented support element 54a, 54b, 54c, 54d, 54e, 54f. Upon engagement of the second cooperating stabilizer element 29 with the first cooperating stabilizer element 52a, 52b, 52c, 52d, 52e, 52f, that is in communication with or integral with the vertically-oriented support element 54a, 54b, 54c, 54d, 54e, 54f, as the VTOL continues a descent in a landing operating, the slot-like function of the first cooperating stabilizer element 52a, 52b, 52c, 52d, 52e, 52f can serve to act as a guide to assist the downward process during landing of the VTOL along the length of the vertically-oriented support element 54a, 54b, 54c, 54d, 54e, 54f down to the ground level. Further, FIGS. 4A, 4B, 4C, 4D, and 4F show the vertically-oriented support element 54a, 54b, 54c, 54d, 54e, 54f (e.g., pole) in direct or integral contact with the first cooperating stabilizer element 52a, 52b, 52c, 52d, 52e, 52f.

FIGS. 5A-5F are illustrations of enlarged side, top, or bottom views of standoffs that can be integrated into or can be otherwise in communication with a structure of the VTOL, and that can extend outwardly from a VTOL structure such as, for example, (and as shown in the FIGS.) a rotor guard, etc. The FIGS. are exemplary and are not exhaustive relative to the shapes and configurations of the standoffs. For example, while the standoffs shown in FIGS. 5A, 5B, 5C, 5D, 5E, and 5F are substantially linear, e.g., following a single axis along their length, the standoffs, according to present aspects, can angularly deviate from a linear orientation. Alternatively, second cooperating stabilizer element 29 can comprise a solid object of a different shape. Alternatively, second cooperating stabilizer element 29 can comprise a circular object that rotates or rolls (e.g., like a wheel, roller, or bearing) inside the female first cooperating stabilizer element of the vertically-oriented element. In addition, the second cooperating stabilizer element 29 and/or inner surfaces of the first cooperating stabilizer element 52a, 52b, 52c, 52d, 52e, 52f can comprise a low friction coefficient material or material coating, such as, for example polytetrafluoroethylene (PTFE) to facilitate relative movement of the second cooperating stabilizer element 29 along and within the length of the first cooperating stabilizer element 52a, 52b, 52c, 52d, 52e, 52f.

FIG. 5A shows VTOL standoff 58a comprising a standoff second end 28b terminating in a second cooperating stabilizer element 29 having a "male" configuration for engagement with a female first cooperating stabilizer element on a vertically-oriented element of the type shown, for example, in FIGS. 4A-4F. FIG. 5B shows VTOL standoff 58b comprising a standoff second end 28b terminating in a second cooperating stabilizer element 29 having a "male" configuration for engagement with a female first cooperating stabilizer element, with VTOL standoff 58b comprising a standoff second end 28b terminating in a second cooperating stabilizer element 29 having a "male" configuration for engagement with a female first cooperating stabilizer element, with VTOL standoff 58b further comprising a spring element 57 that can dissipate vibrational and other forces including for example, impact, contact, etc., that can occur during VTOL landing and takeoff, according to present aspects. By dissipating or "absorbing" forces during VTOL takeoff and landing, the addition of the spring element 57 can contribute to the performance of the present apparatuses, systems, and methods by further stabilizing a VTOL during takeoff and landing, etc.

FIG. 5C shows VTOL standoff 58*c* comprising a standoff second end 28*b* terminating in a second cooperating stabilizer element 29 having a "male" configuration for engagement with a female first cooperating stabilizer element, with VTOL standoff 58*c* further comprising a spring element 57 disposed within a spring housing 56.

FIG. 5D shows VTOL standoff 58*d* comprising a standoff second end 28*b* terminating in a second cooperating stabilizer element 29 having a "male" configuration for engagement with a female first cooperating stabilizer element, with VTOL standoff 58*d* further comprising a shock absorber 55 that can dissipate vibrational and other forces including for example, impact, contact, etc., that can occur during VTOL landing and takeoff, according to present aspects.

FIG. 5E shows VTOL standoff 58*e* comprising a standoff second end 28*b* terminating in a second cooperating stabilizer element 29 having a "male" configuration for engagement with a female first cooperating stabilizer element, with VTOL standoff 58*e* further comprising a telescoping section 59 that can be adjusted to alter the length of the standoff to tailor a VTOL for use with present landing and takeoff apparatuses having varying dimensions and/or varying distances between vertically-oriented support elements (e.g., to which the VTOL standoffs will engage during takeoff and landing, etc.).

FIG. 5F shows VTOL standoff 58*f* comprising a standoff second end 28*b* terminating in a second cooperating stabilizer element 29 having a "male" configuration for engagement with a female first cooperating stabilizer element, with VTOL standoff 58*f* further comprising a telescoping section 59 that is in communication with a telescoping section motor 59*a* that can be actuated (e.g., remotely, in real time, while the VTOL is in flight, etc.) to alter the length or otherwise adjust the standoff to further tailor and enhance the versatility and compatibility of a VTOL for use with present landing and takeoff apparatuses having varying dimensions and/or varying distances between vertically-oriented support elements (e.g., to which the VTOL standoffs will engage during takeoff and landing, etc.).

FIGS. 6A-6E are representative overhead enlarged views of assemblies 60*a*, 60*b*, 60*c*, 60*d*, and 60*e* of engaged first and second cooperating stabilizer elements, with the varying first cooperating stabilizer elements 62*a*, 62,b, 62*c*, 62*d*, 62*e* (shown in FIGS. 6A, 6B, 6C, 6D, 6E, respectively) integral with or attached to, or otherwise in communication with, the vertically-oriented support element 64*a*, 64*b*, 64*c*, 64*d*, 64*e* of a VTOL takeoff and landing stabilizing apparatus. The first cooperating stabilizer elements 62*a*, 62,b, 62*c*, 62*d*, 62*e* are shown as being a type of "male" fixture. FIGS. 6A-6F further show an engaged second cooperating stabilizer element of VTOL standoff 28 in communication with or integral with a second cooperating stabilizer element 69 shown as a "female" fixture dimensioned to engage the "male" first cooperating stabilizer element 62*a*, 62,b, 62*c*, 62*d*, 62*e* of the associated and corresponding vertically-oriented support element 64*a*, 64*b*, 64*c*, 64*d*, 64*e*, 64*f*. The geometries shown of the fixtures and elements in FIGS. 6A-6F are representative and are non-exhaustive, with additional geometries (including, e.g., cross-sectional geometries, mating geometries, etc.) for the vertically-oriented support element and the first and second cooperating features contemplated by the present aspects. Note that further enhancements (not shown) may be added to increase the ability of the cooperating stabilizer elements to roll or slide within each other, such as ball bearings, wheels, rollers, lubricants, etc.

More specifically, FIG. 6A shows an assembly 60*a* with the VTOL standoff 28 in communication with or integral with a second cooperating stabilizer element 29 shown as a "female" fixture dimensioned to engage the "male" first cooperating stabilizer element 62*a* of the associated vertically-oriented support element 64*a*. FIG. 6B shows an assembly 60*b* with the VTOL standoff 28 in communication with or integral with a second cooperating stabilizer element 29 shown as a "female" fixture dimensioned to engage the "male" first cooperating stabilizer element 62*b* of the associated vertically-oriented support element 64*b*. FIG. 6C shows an assembly 60*c* with the VTOL standoff 28 in communication with or integral with a second cooperating stabilizer element 29 shown as a "female" fixture dimensioned to engage the "male" first cooperating stabilizer element 62*c* of the associated vertically-oriented support element 64*c*, with a spring element 63 positioned between and in communication with the "male" first cooperating stabilizer element 62*c* and the associated vertically-oriented support element 64*c*. The sprint element 63 represents an element able to absorb or dissipate vibrational or other forces that can attend ground effect turbulence, etc. The spring element can be, for example, an internal compression spring, a shock absorber, a telescoping extender, etc., and combinations thereof.

FIG. 6D shows an assembly 60*d* with the VTOL standoff 28 in communication with or integral with a second cooperating stabilizer element 29 shown as a "female" fixture dimensioned to engage the "male" first cooperating stabilizer element 62*d* of the associated vertically-oriented support element 64*d*, with the vertically-oriented support element 64*d* shown as comprising "I" beam configuration. FIG. 6E shows an assembly 60*e* with the VTOL standoff 28 in communication with or integral with a second cooperating stabilizer element 29 shown as a "female" fixture dimensioned to engage the "male" first cooperating stabilizer element 62*e* of the associated vertically-oriented support element 64*e*.

According to present aspects, with respect to the assemblies shown in FIGS. 6A-6E, the first cooperating stabilizer element can extend outwardly from and be integral with the vertically-oriented support element. Upon engagement of the first cooperating stabilizer element of the vertically-oriented support element with the second cooperating stabilizer element of the VTOL standoff, in operation and according to present aspects, as the VTOL continues a descent in a landing operating, the slot-like function of the second cooperating stabilizer element can serve to act as a guide to assist the downward process during landing of the VTOL along the length of the vertically-oriented support element down to the ground level.

As made clear herein, the geometry of the first cooperating stabilizer element of the vertically-oriented support element and second cooperating stabilizer element of the VTOL standoff can comprise either "male" or "female" configurations such that the first and second cooperating stabilizer elements can engage together to form a connected orientation and impart stabilizing characteristics to the VTOL during ascent (e.g., takeoff) from and descent (e.g., landing) onto the presently disclosed support apparatuses.

According to present aspects, FIGS. 7A-7F illustrate enlarged views of VTOL standoffs 58*a*, 58*b*, 58*c*, 58*d*, 58*e*, 58*f* similar to those depicted in FIGS. 5A-5F, but with the second cooperating stabilizer element 69 located at the terminus of the standoff second end 28b of the standoffs shown now comprising a "female" second cooperating stabilizer element configuration (rather than the "male" configuration of the second cooperating stabilizer element 29 as shown in FIGS. 5A-5F).

Similar to FIGS. 5A-5F, the VTOL standoffs 28 are configured to dissipate vibrational and other forces including for example, impact, contact, etc., that can occur during VTOL landing and takeoff, according to present aspects.

According to present aspects, the first and second cooperating stabilizer elements can comprise actuators and mechanisms to achieve a degree of movement in the cooperating stabilizer elements to facilitate engagement of the first and second cooperating stabilizer elements, including movement in real-time and in response to a signal (e.g., movement of the cooperating stabilizer element having the "female" configuration to facility entry and engagement of the cooperating stabilizer element having the "male" configuration). For example, FIGS. 8A-8C, show a progression of a second cooperating stabilizer element of a standoff during, for example, a landing operation of a VTOL.

As shown in FIG. 8A, a standoff 28 has a second cooperating stabilizer element 69 located proximate to the standoff second end 28b, with the second cooperating stabilizer element 69 shown as being actuated to an "open" orientation, (e.g., in anticipation of the VTOL approaching the first cooperating stabilizer element of a vertically-oriented support element during a landing maneuver). In FIG. 8B, the second cooperating stabilizer element 69 of standoff 28 is shown as having moved to a "partially closed" orientation (compared to the "open" orientation shown in FIG. 8A).

FIG. 8C shows the second cooperating stabilizer element 69 of VTOL standoff 28 in a "closed" orientation. According to present aspects, as a VTOL approaches the takeoff and landing stabilizing apparatuses presented herein, signals (e.g. signals sent to the VTOL including signals sent remotely to the VTOL, signals sent from the VTOL itself, etc. to actuation devices, etc.) are sent to and received by the VTOL to actuate the second cooperating stabilizer element of the standoff to open or expand a second cooperating stabilizer element "female" fixture to facilitate engagement of the second cooperating stabilizer element to a first cooperating stabilizer element on the vertically-oriented support element of the landing (and takeoff) apparatus presented herein. According to present aspects, the second cooperating stabilizer element 69 shown in FIGS. 8A-8C can be in the form of adjustable grasping tips further comprising motors on the tips or the tips can be in communication with mechanical attachments and linkages located on or within the standoff structure that can include, for example, solenoids to perform "grasping", and that can be responsible for operating the tips to open and/or close to varying and selected degrees. In further aspects, motors, mechanical linkages, wires, etc. can be located in the VTOL, with the VTOL-located motors in communication with the grasping tips, etc.

FIGS. 9A-9C illustrate, according to present aspects, a VTOL engaged in a landing operation, with the VTOL descending and coming into proximity with a VTOL landing and takeoff stabilizing apparatus. As shown in FIG. 9A, as a VTOL 40 approaches a VTOL landing and takeoff stabilizing apparatus 90a, the VTOL is oriented during landing such that two of the VTOL standoffs 28 on the VTOL 40 are moved into a position proximate to first cooperating stabilizer elements 92 located at the second ends 91b of the two vertically-oriented support elements 91 to place a second cooperating stabilizer element 69 of a VTOL standoff 28 in position to engage the first cooperating stabilizer element 92 located at the second end 91b of a vertically-oriented support element 91. FIG. 9A further shows a circumferential frame support 93a engaging the two vertically-oriented support elements 91 proximate to the two vertically-oriented support element second ends 91b, and further shows a circumferential frame support 93b engaging the two vertically-oriented support elements 91 proximate to the two vertically-oriented support element first ends 91a. While the engagement can be a direct engagement, as shown in FIGS. 9A-9C the circumferential frames 93a, 93b are shown engaging a frame standaway attachment 95 that in turn engages or is otherwise in communication with the two vertically-oriented support element first ends 91a and vertically-oriented support element second ends 91b. Note that circumferential frame support 93a and 93b as shown are circular, however any shape of frame support that maintains the form and/or shape of the vertical takeoff and landing stabilizing apparatus is acceptable. Alternatively, the VTOL takeoff and landing stabilizing apparatus is attached directly to the ground or some other structure.

The VTOL takeoff and landing stabilizing apparatus 90b shown in FIG. 9B is similar to the VTOL landing apparatus 90a (shown in FIG. 9A), with apparatus 90b showing an additional circumferential frame support 93c located approximately midway between circumferential frame supports 93a and 93b, apparatus 90b is shown at least for the purpose of connoting that any number of circumferential frame supports can be included and present in the presently contemplated apparatuses. FIG. 9B further shows reinforcements 94 in contact with the circumferential frame supports 93a, 93b, 93c and the vertically-oriented support elements 91. The VTOL shown in FIG. 9B in "broken lines" represents a VTOL that is in the process of landing, with the VTOL located on the ground 16 having completed a landing is shown and drawn in solid lines.

According to present aspects, the frame supports can contact the vertically-oriented support elements and provide support to the vertically-oriented support elements. The present frame supports, when in place in the present VTOL takeoff and landing stabilizing apparatuses together with the vertically-oriented support elements can together provide a "frame" of the apparatus. The frame supports can be deployed in the apparatus as horizontal supports that directly connect to the vertically-oriented support elements. The frame supports are said to be circumferential frame supports when the geometric orientation of the frame supports have a substantially circular geometry, as the frame supports "bound" or "surround" a theoretical perimeter formed by a line drawn to include the area created within the region created by the vertically-oriented support elements, with the inside perimeter representing a value that can accommodate the outer perimeter of VTOLs configured to takeoff from and land into the present VTOL takeoff and landing stabilizing apparatuses. Although shown as circular, present aspects include other geometries for the frame supports that are not circular. For example, when four vertically-oriented support elements are present, the frame supports can be circular or can be, for example, rectangular in shape. If the four vertically-oriented support elements are equidistant from one another, the frame supports can be square. According to present aspects, the term "circumferential" frame supports include frame support geometries that may not be circular geometries. However, in all instances, as presented herein, the selected perimeters formed by the "circumferential frame supports" are selected and dimensioned to accommodate landing entry into, and takeoff from the VTOL takeoff and landing stabilizing apparatuses according to the dimensions of the VTOL. That is, present aspects contemplate a cross-sectional apparatus perimeter that is greater than an outer perimeter of the VTOLs that takeoff and land from a present apparatus.

FIG. 9C is an overhead view of the VTOL takeoff and landing stabilizing apparatus 90b shown in FIG. 9B with numbered features as indicated in FIG. 9B. According to present aspects, the apparatuses 90a, 90b shown in FIGS. 9A-9C facilitate the landing and takeoff of VTOLs by increasing the stability of a VTOL during takeoff and landing, and by significantly ameliorating and/or eliminating ground effect turbulence, turbulent rotation of the VTOL by ground effect, and such present apparatuses facilitate the dissipation of recirculating vortices otherwise caused by ground effect, with turbulent energy and effects transferred from the VTOL to the apparatuses of the types shown in FIGS. 9A-9C.

According to further present aspects, FIGS. 10A-10C depict a VTOL engaged in a landing operation similar to that shown in FIGS. 9A-9C, with the VTOL 40 descending and coming into proximity with a VTOL landing and takeoff stabilizing apparatus 100a, 100b having four vertically-oriented support elements 91. As shown in FIG. 10A, a VTOL 40 approaches a VTOL landing and takeoff stabilizing apparatus 100a, and the VTOL 40 is oriented during landing such that four of the VTOL standoffs 28 on the VTOL 40 are moved into an aligned position proximate to first cooperating stabilizer elements 92 located at the second ends 92b of the four vertically-oriented support elements 91 and in a relative position between the VTOL 40 and the apparatus 100a to place a second cooperating stabilizer element 69 of a VTOL standoff 28 in position to engage the first cooperating stabilizer element 92 located at the second end 91b of a vertically-oriented support element 91. FIG. 10A further shows a circumferential frame support 93a engaging the four vertically-oriented support elements 91 proximate to the four vertically-oriented support element second ends 91b, and further shows a circumferential frame support 93b engaging the four vertically-oriented support elements 91 proximate to the four vertically-oriented support element first ends 91a.

FIG. 10B shows a landing apparatus 100b, similar to the VTOL landing apparatus 100a (shown in FIG. 10A), with apparatus 90b showing an additional circumferential frame support 93c located approximately midway between circumferential frame supports 93a and 93b, and apparatus 100b is shown at least for the purpose of connoting that any number of circumferential frame supports can be included and present in the presently contemplated apparatuses. While FIG. 10B does not show further reinforcements in contact with the circumferential frame supports 93a, 93b, 93c and the vertically-oriented support elements 91, the inclusion of additional supports of the type shown in FIGS. 9A-9C are contemplated for apparatuses 100a, 100b. The VTOL shown in FIG. 10B in "broken lines" represents a VTOL that is in the process of landing, with the VTOL located on the ground 16 having completed a landing is shown and drawn in solid lines.

FIG. 10C is an overhead view of the VTOL takeoff and landing stabilizing apparatus 100b shown in FIG. 10B with numbered features as indicated in FIG. 10B. According to present aspects, the apparatuses 100a, 100b shown in FIGS. 10A-10C facilitate the landing and takeoff of VTOLs by increasing the stability of a VTOL during takeoff and landing, and by significantly ameliorating and/or eliminating ground effect turbulence, turbulent rotation of the VTOL by ground effect, and such present apparatuses facilitate the dissipation of recirculating vortices otherwise caused by ground effect, with turbulent energy and effects transferred from the VTOL to the apparatuses of the types shown in FIGS. 10A-10C. While FIGS. 10A-10C show four vertically-oriented support elements, present aspects contemplate including a selected number of vertically-oriented support elements other than four.

In further present aspects, methods, systems, and apparatuses employing the presently disclosed VTOL takeoff and landing stabilizing apparatuses can include a platform to further enhance the stability imparted to a VTOL engaged in a landing or takeoff operation. According to present aspects, the platform can comprise a grate made from a material that can be a rigid or taut material, including a mesh material that can be a rigid mesh material, and having an average mesh gauge, such that the grate comprises a mesh material selected to be robust enough to support the weight of a VTOL that come in contact with the grate, and that is supported by the grate.

FIG. 11A shows a VTOL 40 having completed a landing operation, onto apparatus 110, with the VTOL in position on a platform 112. According to present aspects, platform 112 is made from a rigid and/or taut material. According to another aspect, the platform is constructed to form a platform suitable to support the weight of the VTOL 40, with the rigid material configured into a grid or mesh such that airflow from the VTOL 40, at least during landing, passes through the platform at a rate and to a degree that substantially no ground effect is directed from the platform toward the VTOL 40, and the platform does not otherwise negatively impact the stability afforded the VTOL by the apparatus 112, at least during landing. Present aspects contemplate a platform 112 that can be made from metals, plastics, resin-based composite materials, ceramics, cloth, and combinations thereof. The platform can be made from a conductive material, or can be coated or impregnated with a conductive material or a conductive material coating, etc.

As shown in FIG. 11A, VTOL 40 comprises a plurality of VTOL standoffs 28 (shown in FIG. 11A as four VTOL standoffs 28) and with a second cooperating stabilizer element 29, 69 located proximate to the terminus of vertically-oriented support element 91 second end 91b. As further shown in FIG. 11A the four second cooperating stabilizer elements 69 associated with the four VTOL standoffs 28 have engaged the four first cooperating stabilizer elements 92 that are in communication with the four vertically-oriented support elements 91. FIG. 11A further shows a circumferential frame support 93b engaging the four vertically-oriented support elements 91 proximate to the four vertically-oriented support element first ends 91a and further proximate to the ground 16. Note that circumferential frame support 93b is shown as circular, however any shape of frame support that maintains the form and/or shape of the vertical takeoff and landing stabilizing apparatus is acceptable.

FIG. 11B is an overhead view of the VTOL takeoff and landing stabilizing apparatus 110 shown in FIG. 11A with numbered features as also indicated in FIG. 11A and as described herein. According to present aspects, the apparatus 110 shown in FIGS. 11A, 11B facilitate the landing and takeoff of VTOLs by increasing the stability of a VTOL during takeoff and landing, and by significantly ameliorating and/or eliminating ground effect turbulence, turbulent rotation of the VTOL caused by ground effect, and such present apparatuses facilitate the dissipation of recirculating vortices otherwise caused by ground effect, with turbulent energy and effects transferred from the VTOL to the apparatuses of the types shown in FIGS. 11A and 11B. While FIGS. 11A and 11B show four vertically-oriented support elements, present aspects contemplate including a selected number of vertically-oriented support elements other than four.

According to further alternate present aspects, FIGS. 12A, 12B, and 12C show alternate arrangement for a VTOL takeoff and landing stabilizing apparatus 120 that allows for an absence of first cooperating stabilizer elements on the vertically-oriented support element first end, and further allows for assisting and facilitating the takeoff and landing of VTOLs that do not comprise standoffs extending from the VTOL, such as, for example, standoffs extending from a rotor guard.

FIG. 12A shows a VTOL 124 resting on apparatus 120 comprising elements similar to those shown in FIGS. 11A-11C and described herein, with the exception that apparatus 120 comprises a platform 112, that can be a grid/mesh platform, with the platform 112 further comprising at least one retainer 122 in communication with the platform 112, with the retainer 122 configured to releasably engage a structure of a VTOL (e.g., a VTOL landing strut, landing skid, wheel, etc.) during a VTOL landing, resting, and/or a takeoff operation. FIG. 12A further shows a VTOL in contact with platform 112. FIG. 12A also shows vertically-oriented support elements 91 having vertically-oriented support element second ends 91b that can be substantially flush with, and that may not extend beyond the upper surface of the platform. In addition, FIG. 12A shows a VTOL 124 that does not comprise standoffs extending from any rotor guard and otherwise configured to engage any structure of apparatus 120.

FIG. 12B is a top view of the apparatus 120 shown in FIG. 12A, wherein the VTOL 124 (also shown in a side view in FIG. 12C) is positioned proximate to the platform 112, with platform 112 comprising a retainer 122 configured to engage landing skid 128 of VTOL 120. Although not shown in FIG. 12B, in this alternate aspect, retainers can also, or in an alternative, extend from a VTOL structure (e.g. landing skid, etc.) and be configured to securely and releasably engage the grid mesh of platform 112. Further, motors, actuators, electronics, signaling transmitter and receivers, mechanical mechanisms, etc. to impart a degree of movement for one or more retainers 122 can be associated and/or in communication with apparatus 120, and, if one or more retainers (not shown) are integral with the VTOL, motors, actuators, electronics, signaling transmitter and receivers, mechanical mechanisms, etc., can be located on the VTOL to control movement of retainers, including movement configured to releasable engage such retainers on the VTOL with a platform of the type shown in FIGS. 12A, 12B.

FIG. 12C is a side view of the apparatus 120 shown in FIG. 12A, wherein the VTOL 124 (also shown in a side view) is positioned proximate to the platform 112, with platform 112 comprising a retainer 122 configured to engage landing skid 128 of VTOL 124. Although not shown in FIG. 12C, in this alternate aspect, retainers can also or in the alternative extend from a VTOL structure (e.g. landing skid, etc.) and be configured to securely and releasably engage the grid mesh of platform 112. Further, motors, actuators, electronics, signaling transmitter and receivers, mechanical mechanisms, etc., to impart a degree of movement for one or more retainers 122 can be associated and/or in communication with apparatus 120, and, if one or more retainers (not shown) are integral with the VTOL, motors, actuators, electronics, signaling transmitter and receivers, mechanical mechanisms, etc., can be located on the VTOL to control movement of retainers, including movement configured to releasably engage such retainers on the VTOL with a platform of the type shown in FIGS. 12A, 12B, and 12C.

According to further present aspects, a platform of the type shown in FIGS. 11A, 11B, 11C and/or FIGS. 12A, 12B, and 12C can further comprise mechanical mechanisms to actuate movement of a platform of the types described herein. As shown in FIG. 13, a VTOL takeoff and landing stabilizing apparatus 130 can combine aspects of the apparatuses shown at least in FIGS. 11A-11C, 12A, 12B, 12C and can further include a platform configured to move or migrate through various selected vertical positions and locations longitudinally along the length of the vertically-oriented support elements of the disclosed VTOL takeoff and landing stabilizing apparatuses described herein. As shown in FIG. 13, VTOL 40 comprising VTOL standoffs 28 terminating in a second cooperating stabilizer element 69 is shown in prior to a takeoff operation or is shown at the completion of a landing operation such that each of the VTOL's second cooperating stabilizer element 69 is engaged with a vertically-oriented support element 91. VTOL 40 is shown resting on platform 112 with destabilizing ground effect on the VTOL (generated by the VTOL rotors during takeoff and/or landing) significantly ameliorated or substantially eliminated by transferring energy and forces from, for example, ground effect, at least in part, to the stabilizing apparatus 130.

According to one exemplary takeoff operation, according to present aspects, power (e.g., electrical power) from power source 132 can be turned on and directed to a drive mechanism 134, with the drive mechanism 134 can (as shown in FIG. 13) located in direct communication, or otherwise integral with, platform 112. According to alternate present aspects, at least portions of the drive mechanism can be located remotely from, but in communication with, drive elements located in communication with platform 112. When the drive mechanism is activated, the platform 112 can be moved (e.g., lowered, raised, etc.) to a desired height, including ground level. The drive mechanism can be located remotely from but in communication with platform 112 with the drive mechanism configured to ascend or descend the platform 112 to varying selected heights along the length of the apparatus 130. The VTOL 40 can be positioned on platform 112 with second cooperating stabilizer elements 69 on VTOL standoffs 28 engaged (e.g., one each) to a vertically-oriented support element 91. If takeoff from a height other than ground level is desired, the platform can be directed to a selected height along the length of the apparatus 130 up to and including a height such that the platform is proximate to the maximum height of the apparatus with the platform driven to a height occupied proximate to the vertically-oriented support element second ends 91b. The VTOL can then be activated for takeoff, with significantly enhanced VTOL takeoff stability as the undesirable takeoff ground effects are significantly ameliorated and/or significantly eliminated.

According to an exemplary VTOL landing protocol, and according to present aspects, as a VTOL is directed to apparatus 130, power (e.g., electrical power) from power source 132 can be turned on and directed to a drive mechanism 134 to elevate platform 112 to a selected height within apparatus 130 to receive the landing VTOL in a stabilized landing with ameliorated or eliminated ground effect. In a fashion similar to landing protocols described herein, the VTOL is guided to align second cooperating stabilizer elements 69 on the VTOL standoffs 28 with first cooperating stabilizer elements 92 located integral with or proximate to the vertically-oriented support elements 91 of apparatus 130. When the controlled and stabilized landing is completed, the VTOL 40 will safely rest on platform 112, at which point, in the landing protocol, the drive mechanism 134 in platform 112 can be activated manually or automatically to cause the platform to descend from, for example, a selected platform landing height, to a selected platform 112 height that can include, for example, ground level.

According to further aspects, present apparatuses disclosed herein can further include guides that can be attached to, in communication with, or otherwise located proximate to the second ends 91b of the vertically-oriented support elements of the present apparatuses. FIGS. 14A, 14B, 14C, 15A, 15B, 16A, 16B show exemplary variations for guides according to present aspects, that can be configured to further stabilize VTOL takeoff and landing and incorporated into the apparatuses, systems, and methods disclosed herein. The guides can be incorporated into any of the presently disclosed VTOL takeoff and landing stabilizing apparatuses, systems, and methods.

As shown in FIG. 14A, VTOL takeoff and landing stabilizing apparatus 140 comprises many of the features presented in the present apparatuses, including, for example, the apparatus 100a shown in FIG. 10A. As shown in FIG. 14A, guide 142 "tops" apparatus 140, with guide first end 142a contacting or otherwise located proximate to the vertically-oriented support element second end 141c, and with guide first end 142a having a guide first end diameter (d1) (see FIG. 14C) that can be substantially equivalent to the diameter of the circumferential frame support 93a. Guide 142 further comprises a guide second end 142b having a guide second end diameter (d2) (see FIG. 14C), with the guide second end diameter (d2) being greater than the guide first end diameter (d1). See side view of guide 140 at FIG. 14C, showing guide second end diameter (d2), being greater than the guide first end diameter (d1).

FIG. 14B is an overhead view of VTOL takeoff and landing stabilizing apparatus 140 showing guide first end 142a and guide second end 142b, with VTOL 20 "nested" within guide 140, with VTOL 20 engaged in a landing or a takeoff protocol. The parts shown in FIGS. 14A and 14B are as labelled for apparatus 100a in FIG. 10A, but the guide 142 shown in FIGS. 14A-14C is understood as being adaptable to the many apparatuses disclosed herein. When the VTOL takeoff and landing stabilizing apparatuses comprise a circumferential frame support, such as circumferential frame support 93a that is substantially circular, the guide 142, as shown in FIG. 14A can comprise guide first end 142a and guide second end 142b that, geometrically, are also substantially circular. In this aspect, and as shown in FIGS. 14A-14C, the guide can have an overall geometry that is frustoconical. According to further aspects, the guide geometry may "match" a geometry near the opening of the VTOL takeoff and landing stabilizing apparatus that is located adjacent to the guide first end 142a. As shown in FIGS. 14A, 14B, 14C, the general geometry of the guide 142 is circular, and the general geometry of the apparatus 140 is tubular and also cross-sectionally generally circular. A guide inner surface 142c of guide 142 can incorporate raised elements or elements in relief that serve as "grooves" or guide inner surface channels 142d (e.g., guide inner surface channels configured to form a directional track, etc.) that are shown in FIGS. 14A, 14B, 14C, with the guide shown to be conical and "funnel-like" in shape.

The guide inner surface channels 142d can be in communication with, and can be in general alignment with, the first cooperating stabilizer elements, and the grooves can facilitate the directing of the VTOL from a position within the guide to the first cooperating stabilizer elements by feeding at least one of the VTOL second cooperating stabilizer elements from the guide inner surface channel 142d to the first cooperating stabilizer element in communication with the vertically-oriented support element of the VTOL takeoff and landing stabilizing apparatus.

As shown in FIGS. 14A, 14B, 14C, the first cooperating stabilizer element can comprise grooves or raised features configured to form a "directional track" or "directional channel" in the guide inner surface, such that the directional track can be dimensioned to accommodate the dimension of the second cooperating stabilizer element of the standoff. As the second cooperating stabilizer element of the VTOL standoff engages, or otherwise comes into contact with, the directional track in the guide inner surface, the second cooperating stabilizer element (and the VTOL that is attached to the second cooperating stabilizer element) is directed from the guide downward into the first cooperating stabilizer element that comprises the track or channel.

According to present aspects, when present apparatuses employ a guide of the types shown in FIGS. 14A, 14B, 14C, a landing protocol provided for VTOLs is further facilitated. In an exemplary landing protocol using the VTOL takeoff and landing stabilizing apparatus 140, a VTOL 20 can approach an area proximate to the top of the guide 142 and the VTOL can further be substantially centered in flight to hover over the guide. As the VTOL descends into the guide, the second cooperating stabilizer element 29 at the outer terminus of the VTOL standoff 28 can associate with and otherwise become at least partially inserted into, grooves configured to form a directional track or directional channel that "feeds" into internal tracks along the inner surface of the guide 142. The guide inner surface channel 142d formed by the grooves can be oriented along the guide inner surface 142c of guide 142 with the guide inner surface channel 142d functioning as a directional track in communication with, substantially aligned with, and otherwise feeding into the vertically-oriented support element channel 141c on the vertically-oriented support element 141. Once the VTOL's second cooperating stabilizer elements 29 are slotted into or otherwise oriented with the first cooperating stabilizer element, the VTOL can descend to ground level with the interfering ground effect that would otherwise occur being significantly ameliorated or substantially eliminated as the turbulent ground effect forces are transferred from the landing VTOL to the apparatus 140.

Further, the outer and/or inner geometry of the VTOL takeoff and landing stabilizing apparatus need not be substantially circular, substantially tubular, substantially cylindrical, etc., so long as the internal lengthwise dimension of the VTOL takeoff and landing stabilizing apparatus can dimensionally accommodate the outer dimension of a VTOL designed to takeoff from or land into a particular VTOL takeoff and landing stabilizing apparatus.

While FIGS. 15A, 15B, 16A, 16B depict further exemplary and non-exhaustive configurations for contemplated VTOL takeoff and landing stabilizing apparatuses, according to present aspects, the overall geometries (e.g. substantially rectangular or "square") of the apparatus longitudinal "body" or "chute" is shown as matching a geometry of the guide, and it is understood that, according to present aspects not shown, guide geometries can differ from apparatus body or "chute" geometries, so long as the internal lengthwise dimension of the VTOL takeoff and landing stabilizing apparatus can dimensionally accommodate the outer dimension of a VTOL designed to takeoff from or land into a particular VTOL takeoff and landing stabilizing apparatus.

According to further present aspects, FIGS. 15A and 15B show a VTOL takeoff and landing stabilizing apparatus 150 comprising a guide 152 that can "top" apparatus 150, with guide first end 152a contacting or otherwise located proximate to the vertically-oriented support element second end 151b, and with guide first end 152a having a guide first end width (w1) that can be substantially equivalent to the diameter of a circumferential frame support. Guide 152 further comprises a guide second end 152b having a guide second end width (w2), with the guide second end width (w2) being greater than the guide first end width (w1).

A guide inner surface 152c of guide 152 can incorporate raised elements or elements in relief that serve as "grooves" or guide inner surface channels 152d that are shown in FIGS. 15A, 15B. The guide inner surface channel 152d can be formed by the grooves, recesses, regions of raised relief, etc. that can be oriented along the guide inner surface 152c of guide 152 with the guide inner surface channel 152d in communication with, substantially aligned with, and otherwise feeding into the vertically-oriented support element channel 151c on the vertically-oriented support element 151.

FIG. 15B is an overhead view of VTOL takeoff and landing stabilizing apparatus 150 showing guide first end 152a and guide second end 152b, with VTOL 20 "nested" within guide 150, with VTOL 20 engaged in a landing or a takeoff protocol. The guide 152 shown in FIGS. 15A, 15B is understood as being adaptable to the many apparatuses disclosed herein.

According to further present aspects, FIGS. 16A and 16B show a VTOL takeoff and landing stabilizing apparatus 160 comprising a guide 162 that can "top" apparatus 160, with guide first end 162a contacting or otherwise located proximate to the vertically-oriented support element second end 161b, and with guide first end 162a having a guide first end dimension that can be substantially equivalent to a geometry that is collectively formed by the location of the plurality of the vertically-oriented support element second ends 161b, such that the guide first end 162a is supported by the vertically-oriented support element second ends 161b. Guide 162 further comprises a guide second end 162b having a guide second end width, with the guide second end width being greater than the guide first end width, and a guide inner surface 162c.

FIG. 16B is an overhead view of VTOL takeoff and landing stabilizing apparatus 160 as shown in FIG. 16A, and showing guide first end 162a and guide second end 162b, with VTOL 20 "nested" within guide 160, with VTOL 20 engaged in a landing or a takeoff protocol. The guide 162 shown in FIGS. 16A, 16B is understood as being adaptable to the many apparatuses disclosed herein.

FIGS. 16A, 16B further shows guide 162 as comprising a guide mesh material 164 that can be a rigid or taut mesh material. A guide mesh material can be selected such that, at least during VTOL takeoff and landing, as the VTOL enters the mesh guide, airflow from the VTOL rotors passes through the guide mesh at a rate and to a degree such that substantially no ground effect is directed from the guide surfaces back toward the VTOL 20, and the guide does not otherwise negatively impact the stability afforded the VTOL 20 by the guide 162, at least during VTOL takeoff and landing. According to further aspects, a highly perforated material can be used as the material for the guide 162.

Present aspects contemplate a guide 142, 152, 162 that can be made from metals, plastics, resin-based composite materials, ceramics, cloth, and combinations thereof. The guide can be made from a conductive material, or can be coated or impregnated with a conductive material or a conductive material coating, etc.

According to present aspects, VTOL takeoff and landing stabilizing apparatuses, systems, and methods can further facilitate aspects of VTOL takeoff and landing, including energy conservation and stabilization at takeoff and landing, and noise reduction at takeoff and landing. According to further present aspects, the enclosed apparatuses can include at least one housing that surrounds or that can substantially surround and otherwise enclose the vertically-oriented support element(s) and a frame support that can be a circumferential frame support, and the vertically-oriented support element(s) that together can form an apparatus frame.

For example, present aspects further contemplate apparatuses, systems, and methods for vertical takeoff and landing vehicles (VTOLs) that comprise an enclosed or a substantially enclosed apparatus (collectively and equivalently referred to herein as an "enclosed apparatus") from which such vehicles can takeoff and into which such vehicles can land, with the apparatuses affording significantly ameliorated or substantially eliminated ground effect on the vehicles, while increasing VTOL stability during takeoff and landing, and while conserving energy and reducing operational decibel levels during takeoff and landing. According to present aspects, the enclosed apparatuses can comprise the fixtures and components as specified herein, with such enclosed apparatuses additionally including at least one moveable panel that can open and close (e.g., that can move from an open to a closed position and from a closed to an open position, including partially open and partially closed positions, etc.). According to present aspects, the enclosed apparatuses, with moveable doors in the open position, can accommodate a vertical takeoff and landing vehicle into the enclosed apparatuses, that can also include the guides and elevator-type platforms described herein. With respect to the enclosure, the terms "panel" and "door" as used herein are equivalent and interchangeable terms. Further, the terms "moveable enclosure panel" and "moveable panel" are equivalent terms for purposes of the present application.

First focusing on a VTOL landing operation into a presently disclosed enclosed VTOL takeoff and landing stabilizing apparatus, the at least one moveable panel can be moved in manual or automated fashion, directly or remotely, for example, from a closed position to an open position. During a descent, the VTOL is positioned over and descends into the present apparatuses, including apparatuses that can include a guide. As shown in FIGS. 17A and 17B, a VTOL 20 of the type shown at least in FIGS. 2A, 2B, has descended into an enclosed VTOL takeoff and landing stabilizing apparatus 170.

The enclosed VTOL takeoff and landing stabilizing apparatus 170 is similar in framework and structure to that shown (as VTOL takeoff and landing stabilizing apparatus 140) in FIGS. 14A, 14B, with the notable addition, in enclosed VTOL takeoff and landing stabilizing apparatus 170, of enclosure 174 that substantially surrounds and otherwise encloses the VTOL takeoff and landing stabilizing apparatus 170 to form, (when the enclosure is substantially cylindrical, for example) a tubular body region.

As shown in FIGS. 17A and 17B, enclosed VTOL takeoff and landing stabilizing apparatus 170 includes at least one (shown in FIGS. 17A, 17B, as a plurality of four (4)) vertically-oriented support element 171, with the support element 171 further including a vertically-oriented support element first end 171a, vertically-oriented support element second end 171b, and vertically-oriented support element channel 171c.

Enclosed VTOL takeoff and landing stabilizing apparatus 170 further includes circumferential frame supports 173a, 173b in communication with the vertically-oriented support elements 171. FIGS. 17A, 17B further show guide 172, (shown as 142 in FIG. 14A) that can comprise guide inner surface 172c and guide inner surface channel 172d, and further comprise guide first end 172a and guide second end 172b that, geometrically, are also substantially circular. FIGS. 17A, and 17B show the enclosed VTOL takeoff and landing stabilizing apparatus 170 further comprising an outer housing configured to form enclosure 174 that surrounds the body of the enclosed VTOL takeoff and landing stabilizing apparatus 170, and a plurality of enclosure doors 176 (referred to equivalently herein as "moveable panels"). FIG. 17A shows four (4) enclosure doors 176 in the closed position, while FIG. 17B shows the four (4) enclosure doors 176 in the open position.

FIG. 17A shows VTOL 20 in a landing descent, with the VTOL already having oriented each of the four second cooperating (male) elements 29 on the four VTOL standoffs 28 (one each) into the vertically-oriented support element channel 171c, and with the VTOL 20 in a significantly enhanced, stabilized descent within the enclosed VTOL takeoff and landing stabilizing apparatus 170 as the VTOL descends within the VTOL takeoff and landing stabilizing apparatus 170. As ground effect from the VTOL's rotors generate a degree of air turbulence within the VTOL takeoff and landing stabilizing apparatus 170, and as the VTOL 20 descends to a point proximate to the ground 16, the impact of ground effect turbulence region within a distance proximate to the ground 16 can impact the stabilized VTOL 20 and the VTOL takeoff and landing stabilizing apparatus 170. Such ground effect turbulence within the enclosed VTOL takeoff and landing stabilizing apparatus 170, according to present aspects, can be controlled and significantly mitigated by the enclosed VTOL takeoff and landing stabilizing apparatus 170 triggering the opening of enclosure doors 176 to dissipate the ground effect turbulence.

As shown in FIG. 17B, enclosure doors 176 are now in the open position and the ground effect turbulence generated by the rotors of VTOL 20 is dissipated at least through the open enclosure doors 176 (as shown by the arrows), and the force otherwise commensurate with the generated ground effect turbulence is significantly reduced as forces, including the ground effect forces, are purged from the enclosed VTOL takeoff and landing stabilizing apparatus 170 via the open enclosure doors 176.

FIG. 17B shows a control box 177 representing the electrical and mechanical components for regulating the positioning of the enclosure doors 176, with at least one control box 177 including or otherwise in communication with a pressure detector 177a configured to sense pressure at regions within the VTOL takeoff and landing stabilizing apparatus 170. As shown in more detail in the box diagram shown in FIG. 17C, control box 177 can comprise a controller 177b, a power supply 177c, an actuator 177d in communication with at least one enclosure door, with the actuator 177d configured to receive a signal from the controller 177b and/or the pressure detector 177a, and with the actuator 177d configured to effect movement of an enclosure door upon command.

FIGS. 18A and 18B show an alternate arrangement for a VTOL takeoff and landing stabilizing apparatus 180, that differs from VTOL takeoff and landing stabilizing apparatus 170 in that each of the vertically-oriented support elements 181 comprise a plurality of individual guides 182 positioned adjacent to or atop the vertically-oriented support element second end 181b. In this aspect, during a descent and as a VTOL 20 approaches the VTOL takeoff and landing stabilizing apparatus 180, the VTOL 20 aligns the second cooperating stabilizer element 29 located on VTOL standoff 28 proximate to an individual guide 182 and the second cooperating stabilizer element 29 engages individual guide 182, with the individual guide 182 comprising individual guide slot 182a structurally configured to feed into a slot located with the vertically-oriented support element 181 associated with the individual guide 182 at the vertically-oriented support element second end 181b. Enclosure 184 is shown surrounding the body of VTOL takeoff and landing stabilizing apparatus 180.

FIG. 18B shows the VTOL takeoff and landing stabilizing apparatus 180 shown in FIG. 18A, with the VTOL 20, descending into the body of the VTOL takeoff and landing stabilizing apparatus 180. FIG. 18C shows an enlarged representative overhead view of the individual guide 182 receiving the second cooperating stabilizer element 29 of a VTOL standoff 28, with FIG. 18C further showing the vertically-oriented support element 181 in communication with guide 182 and enclosure 184.

FIGS. 19 and 20 show alternate present aspects and alternate configurations of VTOL takeoff and landing stabilizing apparatuses that comprise additional and/or alternate pressure release elements that can assist with the mitigation of ground effect air turbulence and otherwise dissipate increasing pressures within a VTOL takeoff and landing stabilizing apparatus during the landing of a VTOL, according to present aspects.

As shown in FIG. 19, an enclosed VTOL takeoff and landing stabilizing apparatus 190 comprises many of the components of an enclosed VTOL takeoff and landing stabilizing apparatus 170 as shown in FIG. 17A, with the addition of an external shield 195 that is located external to the enclosure and that can extend from an external shield first end 195a (e.g., proximate to the ground 16) to an external shield second end 195b. As a VTOL descends (e.g., during landing) or ascends (e.g., during takeoff) within the VTOL takeoff and landing stabilizing apparatus 190, the ground effect air turbulence is allowed to pass out of and is otherwise directed from the VTOL takeoff and landing stabilizing apparatus enclosure 194 via the enclosure openings 196 bounded by the enclosure 194. As an alternative to laterally-opening enclosure openings 176 as shown in FIGS. 17A and 17B, in FIG. 19, the enclosure openings 196 can open outwardly at the top while hinged at the bottom to comport with the shape of external shield 195. The higher (than ambient) pressure ground effect turbulent air that escapes from the enclosure openings 196 can then be directed against the external shield inner surface 195c and escape into the lower pressure atmosphere as indicated by the arrows shown in FIG. 19 and can be otherwise "released" into the air at a selected distance away from the ground that can be essentially equivalent to the height of the VTOL takeoff and landing stabilizing apparatus (e.g., a distance away from the ground ranging from about 4 ft. to about 100 ft., etc.).

FIG. 20 shows a further alternate aspect for ameliorating ground effect during VTOL landing and takeoff within a VTOL takeoff and landing stabilizing apparatus 200. As shown in FIG. 20, an enclosed VTOL takeoff and landing stabilizing apparatus 200 comprises many of the components of an enclosed VTOL takeoff and landing stabilizing apparatus 170 as shown in FIG. 17A, but with the addition of a plurality of pipes 205 that can be located with a pipe lower end 205a extending through an enclosure opening 206 in enclosure 204. Pipe second end 205b extends to a selected distance away from pipe first end 205a to pipe second end 205b, with the substantial length of pipe 205 as shown in FIG. 20 located exterior to enclosure 204 at enclosure exterior 204a and can be positioned proximate to or can be attached to or integral with enclosure 204. Alternatively, pipe 205 is angled outwardly and away from enclosure 204 such that pipe second end 205b is situated horizontally farther away from enclosure 204 than pipe first end 205a.

As a VTOL descends (during landing) or ascends (during takeoff) within the VTOL takeoff and landing stabilizing apparatus 200 (e.g., during a landing), the ground effect air turbulence is allowed to pass out of, and is otherwise directed from the VTOL takeoff and landing stabilizing apparatus enclosure 204 via the enclosure openings 206 bounded by the enclosure 204. The higher (than ambient) pressure ground effect turbulent air that escapes from the enclosure openings 206 can then be directed into pipes 205, and released from pipes 205 into the lower pressure atmosphere (as indicated by the arrows shown in FIG. 20) at a selected distance away from the ground that can be essentially equivalent to the height of the VTOL takeoff and landing stabilizing apparatus (e.g., a distance away from the ground ranging from about 10 ft. to about 200 ft., etc.). In FIGS. 17A, 17B, 18A, 18B, 19, 20, etc., the VTOL takeoff and landing stabilizing apparatuses 170, 180, 190, 200, etc., can comprise access doors to retrieve cargo or passengers delivered by the VTOL, or for loading cargo or passengers into the VTOL, etc.

The elimination, in substantially real time, of the higher pressure ground effect turbulent air from the VTOL takeoff and landing stabilizing apparatuses 190, 200 during a VTOL landing and/or takeoff further stabilizes the VTOL within the apparatus during landing, and otherwise facilitates the landing operation as pressure equilibrium is achieved between pressures within the landing apparatus and ambient pressure outside of the VTOL takeoff and landing stabilizing apparatus.

According to further present aspects, VTOL takeoff and landing stabilizing apparatuses are disclosed that ameliorate or otherwise significantly reduce VTOL operation noise during takeoff and landing by incorporating soundproofing measure into the VTOL takeoff and landing stabilizing apparatuses. FIGS. 21, 22, 23 are drawings that show soundproofing present aspects.

FIG. 21 shows a cutaway view into a VTOL takeoff and landing stabilizing apparatus 210 comprising an enclosure 214. The internal features of the apparatuses shown in previous FIGS. are omitted from FIGS. 21 and 22, although it is contemplated that the soundproofing aspects shown in FIGS. 21 and 22 can be incorporated into an enclosed VTOL takeoff and landing stabilizing apparatus 210 that incorporates enclosure 214 and that is shown in the present FIGS. including at least FIGS. 17A, 17B, for example. FIG. 21 shows a VTOL 20 engaged in a takeoff maneuver and ascending within the enclosed VTOL takeoff and landing stabilizing apparatus 210. FIG. 22 shows the VTOL 20 having ascended to a height greater than the height represented by the enclosure second end 214b, such that the VTOL 20 has exceeded the height of the enclosed VTOL takeoff and landing stabilizing apparatus 210.

As shown in FIGS. 21 and 22 the VTOL takeoff and landing stabilizing apparatus comprises enclosure 214, comprising enclosure first end 214a located proximate to the ground 16 or base and enclosure second end 214b, distal from the ground 16 or base, with enclosure 214 further comprising an enclosure inner wall 214c spaced a selected distance from enclosure outer wall 214d, with an internal inner volume 215 disposed between the enclosure inner wall 214c and the enclosure outer wall 214d.

Sound reduction can include reflection, absorption, and diffusion. In a present aspect, sound reflection or diffusion is obtained by various treatments of enclosure inner wall 214c, the walls in internal inner volume 215, and the enclosure outer wall 214d. Further, the enclosure internal volume 215 can be made from and otherwise incorporate or be filled with a single panel or a plurality of panels of materials or continuous or discrete materials. Examples of such materials having sound absorbing capabilities, include honeycomb materials, acoustic foam, phase cancellation materials, active and passive noise cancellation panels, acoustic tiles, other sound proofing materials and/or techniques, and combinations thereof, etc. According to present aspects, the enclosure 214 incorporating the enclosure internal volume 215 can reduce decibel levels of the sound generated by a VTOL taking off and/or landing from an unattenuated level ranging from about 68 dB (at 1 meter) for, for example, a relatively "quiet" drone, etc., to about 120 dB or higher (at 1 meter) for a flying car, etc. According to present aspects, these VTOL noise levels can be attenuated by different decibel amounts based on the materials used in the walls and inner internal volume 215 according to the material densities, energy absorption characteristics, and distance of the materials between enclosure inner wall 214c and enclosure outer wall 214d. According to present aspects, various selected amounts of noise reduction is obtained based on the selected design.

According to present aspects, the VTOL takeoff and landing stabilizing apparatuses can be dimensioned relative to width and height to complement the noise reduction at ground level afforded the apparatuses by incorporating the enclosure internal wall having the internal volume 215. That is, acceptable noise reduction levels at ground level can be selected to, for example, comply with local noise ordinances, safety ordinances etc., by selecting and incorporating sound absorbing materials for use in the enclosure internal volume 215, along with selected dimensioning of the internal inner wall as well as, for example, the height of the VTOL takeoff and landing stabilizing apparatus.

FIG. 23 shows the enclosed VTOL takeoff and landing stabilizing apparatus 20 (as shown in FIGS. 21 and 22) with optional guy-wire 218 attached to the enclosed VTOL takeoff and landing stabilizing apparatus 210 and anchored into, for example, the ground 16. For present purposes, the term "guy-wire" encompasses any tensioned cable or line that is selected to add stability to a free-standing VTOL takeoff and landing stabilizing apparatus according to present aspects.

According to further aspects, the VTOL takeoff and landing stabilizing apparatuses disclosed herein can attach to or can be positioned proximate to a dwelling structure. An exemplary dwelling structure 240 is shown in FIG. 24, with a proximately located enclosed VTOL takeoff and landing vehicle apparatus 244. As contemplated herein, VTOLs can be dimensioned to transport and deliver cargo (e.g. packages for delivery, etc.). Contemplated VTOLs also can be dimensioned to transport passengers, as would be the case, for example, where the VTOL is an airborne vehicle, including vehicles designed for both terrestrial and airborne use (e.g., flying cars, etc.), and where the VTOLs have "hybrid" or multi-functional terrestrial, waterborne, and airborne modalities, for example. In this aspect, an enclosed VTOL takeoff and landing stabilizing apparatus 244 can function, for example, as a "garage" that can be associated with a dwelling and located proximate to a dwelling, including being integral with the dwelling, for example, with the VTOL takeoff and landing stabilizing apparatus 244 in such "garage" configuration advantageously facilitating the takeoff and landing of a flying car VTOL, for example.

FIGS. 25A, 25B, 26A, 26B, 27A, and 27B show further various configurations for enclosed VTOL takeoff and landing stabilizing apparatuses associated with dwellings, with emphasis directed to the functional elements of a roof moveably configured to, for example, protect the enclosed VTOL apparatuses, and the VTOLs (e.g., a "parked" VTOL, etc.) from elements and "open" in various ways, and on demand to accommodate VTOL takeoff from and landing into the present enclosed VTOL takeoff and landing stabilizing apparatuses.

As shown in FIGS. 25A, an enclosed VTOL takeoff and landing stabilizing apparatus 254 is in a configuration that can be a "garage" that is located proximate to dwelling 240, with the enclosed VTOL takeoff and landing stabilizing apparatus 254 comprising a VTOL takeoff and landing stabilizing apparatus first end 254a proximate to ground level, and VTOL takeoff and landing stabilizing apparatus second end 254b located at a selected distance from the first end 254a, with the distance between the VTOL takeoff and landing stabilizing apparatus first and second ends 254a, 254b representing a distance that is approximately equal to the total height of the enclosed VTOL takeoff and landing stabilizing apparatus 254. FIG. 25A further shows a roof 256a in a closed roof position that can be moved to an open roof position (shown in dotted lines, with the movement between closed to open position indicated by the arrow in FIG. 25A). The inside of the enclosed VTOL takeoff and landing stabilizing apparatus 254 is exposed when the roof 256a is in the open position.

As shown in FIG. 25A, roof 256a can be dimensioned to be flat, and the roof can move between open and closed positions via, for example, pivoting about roof mechanism 255a that can be, for example, a motorized hinge, etc. The roof 256a can engage or otherwise be in communication with mechanical actuators in communication with controllers, and a power source that can be contained within, for example, control box 257. Control box 257 can further include a receiver for receiving a remote signal, with the signal sent from the receiver to a controller, with the controller in communication with an actuator that is further in communication with the roof mechanism. For example, upon receiving a signal (e.g., a signal sent from an approaching VTOL, or a signal from the dwelling, or a signal from the VTOL within the enclosed VTOL takeoff and landing stabilizing apparatus awaiting takeoff, etc.), a receiver in control box 257 (e.g. a receiver that can be integral with the controller or in communication with the controller in control box 257) can send a signal to the controller, and the controller can signal an actuator to move the roof 256a from an open to a closed position or from a closed position to an open position. FIG. 25A further shows VTOL 252 positioned at ground level within the enclosed VTOL takeoff and landing stabilizing apparatus, with the VTOL not drawn to scale, and with the VTOL being a cargo-carrying or a personnel-carrying VTOL.

FIG. 25B shows an alternate aspect of the enclosed VTOL takeoff and landing stabilizing apparatus shown in FIG. 25A, with the roof 256b shown in FIG. 25B dimensioned as a pitched roof. The remainder of the depicted and enumerated aspects in FIG. 25B are as indicated in FIG. 25A.

FIG. 26A shows an alternate aspect of the enclosed VTOL takeoff and landing stabilizing apparatus 254 shown in FIG. 25A, with the roof 256c shown in FIG. 26A dimensioned as a flat roof, with the roof mechanism 255b in communication with the roof 256c, and with roof mechanism configured to apply a lateral force to the roof 256c to, for example swivel or "slide" the roof from a closed position to an open roof 256c (as indicated by the arrow in FIG. 26A), with the inside of the enclosed VTOL takeoff and landing stabilizing apparatus 254 exposed when the roof 256c is in the open position. The supporting mechanisms disclosed herein that can be in communication with the roof 256c are similar to those disclosed with respect to the aspects shown in FIGS. 25A and 25B, with the understanding that the roof mechanism 255b shown in FIGS. 26A and 26B is selected to deliver a force required to, for example, laterally move the roof 256c and 256d between open and closed positions, with the roof mechanism 255b including, for example, necessary hydraulics, pneumatics, servos, pistons, etc.

FIG. 26B shows an alternate aspect of the enclosed VTOL takeoff and landing stabilizing apparatus shown in FIG. 26A, with the roof 256d shown in FIG. 26B dimensioned as a pitched roof (similar to the roof 256b shown in FIG. 25B), with the roof 256d comprising the roof mechanism 255b of the type shown and described in relation to FIG. 26A herein. FIGS. 26A and 26B can further comprise the control box 257 shown in FIGS. 25A, 25B, with the control box 257 configured to comprise the mechanisms and electronics to operate as described herein.

FIG. 27A shows another alternate present aspect of a VTOL takeoff and landing stabilizing apparatus 254 having a roof similar to that shown in FIGS. 25A and 26A (e.g., a roof having a flat orientation, etc.), with the roof 256e shown in FIG. 27A comprising roof mechanism 255c in communication with the roof 256e, and with roof mechanism 255c configured to deliver a force to the roof 256e and otherwise incorporating a rail or track to, for example, move the roof 256e from a closed roof position to an open roof position, with the inside of the enclosed VTOL takeoff and landing stabilizing apparatus 254 exposed when the roof 256e is in the open position. The supporting mechanisms disclosed herein that can be in communication with the roof 256e are similar to those disclosed with respect to the aspects shown in FIGS. 25A and 26A, with the understanding that the roof mechanism 255c shown in FIGS. 27A and 27B are selected to deliver a force required to, for example, move the roof 256e, 256f along, for example, a rail or track arrangement to move the roof 256e, 256f between open and closed positions, with the roof mechanism 255c including, for example, necessary hydraulics, pneumatics, servos, pistons, rails, tracks, pulleys, geared chains, etc.

FIG. 27B shows an alternate aspect of the enclosed VTOL takeoff and landing stabilizing apparatus 254 in FIG. 27A, with the roof 256f shown in FIG. 27B dimensioned as a roof 256f similar to the type of pitched roof shown in FIGS. 25B, 26B, and with the roof mechanism 255c comprising the elements described herein relative to the aspects shown in FIG. 27A. FIGS. 27A and 27B can further comprise the control box 257 shown in FIGS. 25A, 25B, 26A, 26B with the control box 257 configured to comprise the mechanisms and electronics to operate as described herein.

According to present aspects, the VTOL takeoff and landing stabilizing apparatuses as shown in the FIGS., including the enclosed VTOL takeoff and landing stabilizing apparatuses, can be powered for purposes of recharging a VTOL. That is, according to present aspects, the present methods, systems, and apparatuses contemplate the present VTOL takeoff and landing stabilizing apparatuses being in communication with an electrical power source and configured to accept or draw current from a power source, and then direct current (e.g., from the contacts present within the apparatus) to a VTOL present within the apparatus; for example, a VTOL that has landed into the apparatus. When present VTOL takeoff and landing stabilizing apparatuses provide charging capabilities to VTOLs, the apparatuses are said to incorporate and otherwise serve as electric charging elements. Further, present aspects contemplate charging both: 1) the presently disclosed VTOLs comprising the stabilizing elements and stabilizing adaptations (e.g., laterally outward extending standoffs comprising the second cooperating standoffs that can engage with features of the stabilizing apparatus); and 2) VTOLs that may not comprise such stabilizing elements, but that are otherwise configured to receive a charge from the presently disclosed VTOL takeoff and landing stabilizing apparatuses.

As shown in FIG. 28, a VTOL 270 is shown that is different from the present VTOLs described herein, in that VTOL 270 does not comprise the standoffs and second cooperating stabilizer elements shown, for example in VTOLs 20, 40, etc. Instead VTOL 280 shows an example where a VTOL different from the VTOLs associated with other present methods, systems, and apparatuses can avail itself of charging capabilities of the VTOL takeoff and landing stabilizing apparatus 280. As further shown in FIG. 28, VTOL 270 comprises a plurality of vertically oriented conductive support elements 272 with at least one of the plurality of vertically oriented conductive support elements 272 in communication with and extending in a downward direction from rotor guard 275, with the vertically oriented conductive supports 272 terminating in and otherwise comprising a conductive support element contact 27, (referred to equivalently herein as a "vehicle electrical contact").

FIG. 28 further shows an enclosed VTOL takeoff and landing stabilizing apparatus 280 comprising features as shown and described here, including an enclosure 282 comprising an enclosure first end 282a, an enclosure second end 282b, and an enclosure inner surface 282c. Enclosure 282 can further include circumferential frame supports 283a, 283b, or enclosure 282 can comprise a rigidity sufficient to obviate the need for the circumferential frame supports. FIG. 28 further shows guide 284 including guide first end 284a, guide second end 284b, with guide first end in communication with enclosure second end 282b. Guide 284 further comprises guide inner surface 284c and guide 284 can further include guide inner surface channels 284d, although guide inner surface channels 284d may not be used in the situation where a VTOL of the type shown by VTOL 270, does not include outwardly extending (e.g., laterally extending from a VTOL feature) standoff features having second cooperating stabilizer elements to engage guide surface channels 284d. Nevertheless, even a VTOL of the type shown by VTOL 270 can avail itself of the many stabilizing advantages of enclosed VTOL takeoff and landing stabilizing apparatus 280, including noise reduction, reduction of ground effect impacting regions proximate to an unenclosed landing area, etc.

As shown in FIG. 28, enclosed VTOL takeoff and landing stabilizing apparatus 280 further comprises an electric charging element 286 having a charging element surface 286a that can incorporate electrical charging contacts, with electric charging element 286 in communication with an optional transformer 287 (if AC power is used) via transformer cables 287a, and with optional transformer 287 in communication with an electrical power supply 288 (either AC or DC) via electrical power supply cable 288a.

As shown in FIG. 28, as VTOL 270 completes a landing maneuver within the enclosed VTOL takeoff and landing stabilizing apparatus 280 and VTOL 270 comes to rest on charging element surface 286a of electric charging element 286, conductive support elements 274 contact the charging element surface 286a. According to present aspects, when the electrical power supply 288 is configured to deliver electrical current from the electrical power supply 288 to the electric charging element 286 via optional transformer 287 (if AC power is used), the charging element becomes "live" and operational and is said to be in a "CHARGE/ON" mode, with electric current directed from the electrical power supply 288 to rechargeable VTOL battery supply (not shown) for purposes of recharging the VTOL, for example, for a future flight.

FIG. 29 shows a VTOL 290 consistent with VTOLs, and otherwise outfitted with, VTOL elements, for example, of the type shown as VTOL 40 and as disclosed herein. VTOL 290 comprises VTOL vehicle body 293 in communication with a plurality of rotor assemblies 295, each rotor assembly comprising a rotor guard 295a (shown in FIG. 29 as four rotor assemblies each with a rotor guard). Standoffs 292 are shown in communication with rotor guards 295a with the standoffs extending laterally outwardly from the rotor guards 295a and terminating in a second cooperating stabilizer element contact 294 (that is understood herein to be a type of "vehicle electrical contact"). If desired, VTOL 290 can further comprise a plurality of vertically oriented conductive supports 272 with at least one of the plurality of vertically oriented conductive supports 272 in communication with and extending in a downward direction (e.g., extending away from the rotor guard vertically or perpendicular from the general lateral plane of the VTOL and the general plane of the rotor, etc.) from rotor guard 295a, with the vertically oriented conductive supports 272 terminating in and otherwise comprising a conductive support contact 274, that can also serve as a landing support, and can further serve as an additional point of electrical contact.

As shown in FIG. 29, enclosed VTOL takeoff and landing stabilizing apparatus 280a further comprises an electric charging element 286 having a charging element surface 286a that can incorporate electrical contacts, with electric charging element 286 in communication with an optional transformer 287 (if AC power is used) via transformer cables 287a, and with optional transformer 287 in communication with an electrical power supply 288 (AC or DC) via electrical power supply cable 288a.

As shown in FIG. 29, VTOL 290 in flight, descends in a landing maneuver and is oriented proximate to the VTOL takeoff and landing stabilizing apparatus 280a that comprises the features described for VTOL takeoff and landing stabilizing apparatus 280, with the VTOL takeoff and landing stabilizing apparatus 280a further comprising a plurality of (e.g. two, as shown) vertically-oriented conductive support elements 291 having vertically-oriented conductive support element first end 291a and vertically-oriented support conductive element second end 291b. As VTOL 290 descends to contact approaches VTOL takeoff and landing stabilizing apparatus 280a, VTOL 290 can contact guide inner surface 284c, with second cooperating stabilizer element contact 294 engaging guide inner surface channel 284d (that can be a raised channel or other raised feature when the contact 294 has a "female configuration"). As the VTOL descent continues, the VTOL 290 enters enclosure 282 with the second cooperating stabilizer element contact 294 engaging vertically-oriented conductive support element 291.

The VTOL 290, as shown in broken lines in FIG. 290 continues a landing maneuver within enclosed VTOL takeoff and landing stabilizing apparatus 280a and comes to rest on charging element surface 286a of electric charging element 286, conductive support elements 274 contact the charging element surface 286a. According to present aspects, when the electrical power supply 288 is configured to deliver electrical current from the electrical power supply 288 to the electric charging element 286 via optional transformer 287 (if AC power is used), the charging element becomes "live" and operational and is said to be in a "CHARGE/ON" mode, with electric current directed from the electrical power supply 288 to rechargeable VTOL battery supply (not shown) for purposes of recharging the VTOL, for example, for a future flight.

According to further present aspects, during a landing maneuver, the CHARGE/ON mode can commence as a VTOL 290 approaches or contacts guide inner surface 284c, or contacts and engages the vertically-oriented conductive support element 291. In this aspect, an electric charge can be delivered to the VTOL and the VTOL battery before the VTOL has completed a landing maneuver (e.g., while the VTOL is still in the process of landing, etc.) for the purpose of, for example, shortening the total duration of a recharging process or recharging cycle.

In addition, according to the apparatuses, systems, and methods shown in FIG. 29, VTOL 290 possesses a plurality of charging contact points including the conductive support elements 274 and the second cooperating stabilizer element contacts 294. Both types of VTOL contacts are understood to be in communication with conductive features and conductive elements (e.g., electrical circuits, etc.) within the VTOL that are in communication with a rechargeable battery (e.g., rechargeable battery pack, rechargeable battery bank, etc.) such that, for example, a provided electrical current can pass from the charging elements (e.g., contacts, contact elements) within the enclosed VTOL takeoff and landing stabilizing apparatus 280a into the rechargeable VTOL battery via the plurality of VTOL electrical contacts.

For clarity, the charging elements housed within the enclosed VTOL takeoff and landing stabilizing apparatus 280a include, at least, the vertically-oriented conductive support elements 291, the electric charging element 286 (including the charging element surface 286a), and the guide inner surface 284c (including the guide inner surface channels 284d) all of which, according to present aspects, can deliver an electrical charge or a selected portion of an electrical charge (e.g., during a VTOL battery electrical charging cycle).

Although not shown in FIG. 29, with respect to the charging capability (e.g., the ability to deliver an electric charge) of the enclosed VTOL takeoff and landing stabilizing apparatus 280a, present aspects can include the presence of further electric contacts in communication with the enclosure inner surface 282c, or further electric contacts in communication with the electric charging element 286. With respect to the capacity to receive an electric charge, VTOLs, including, for example, the type represented by VTOL 290, can include the presence of further electric contacts in communication with the VTOL rechargeable battery, and that include conductive surfaces on the VTOL that can include or be oriented on a VTOL landing skid, VTOL body, or on any selected VTOL structure, etc.

In addition, while the apparatus shown in FIGS. 28 and 29 show use of an optional transformer (if AC power is used) located external from the apparatus, components for changing voltage and current levels, condensing current, converting current from AC to DC or vice versa, conditioning current from a power supply, etc., can be integrated into or can otherwise be integral with apparatuses 280, 280a, or can even be integrated into the VTOL if desired. In addition, the "wired" power supply 288 shown in FIGS. 28 and 29 can deliver alternating current (AC) or direct current (DC). If alternating current (AC) requires conversion to direct current or vice versa, these conversions can be provided at any point in the electrical circuits, either in the apparatuses 280, 280a, or on the VTOLs 270, 290. In further aspects, the recharging also can be conducted "wirelessly", for example, using piezo electronics, radio frequencies, optics, or any other wireless power transfer charging mechanisms, etc.

The apparatuses and the VTOLs shown in FIGS. 28 and 29 are not drawn to scale, and according to present aspects, the VTOLs can be dimensioned to accommodate the delivery and transport of packages and/or can further be dimensioned to transport passengers, including human passengers. Accordingly, present aspects, with respect to usefully powering a VTOL contemplate the incorporation of rechargeable batteries and rechargeable battery systems that can be selected based upon power required to transport payload weight, range of operation, duration of flight per charge, etc.

While VTOL 290 is similar in configuration to VTOL 40 disclosed here, with "female" type second cooperating stabilizer elements located at the terminal end of a standoff, it is understood that VTOL 290 can be configured to include second cooperating stabilizer elements of the "male" type, as shown in VTOL 40 herein. With respect to VTOL standoff engagement of the guide inner surface channel during a landing, it is understood that the guide inner surface channel can comprise a raised configuration to facilitate engagement of the female type of second cooperating stabilizer feature of the standoffs shown in VTOL 290.

While present aspects contemplate and make possible VTOL battery recharging scenarios and recharging protocols and capabilities that conserve time (e.g., decrease standard charging time, etc.) by beginning a recharging cycle virtually the moment that a VTOL contacts the enclosed VTOL takeoff and landing stabilizing apparatus, present aspects further contemplate conserving a VTOL battery charge during takeoff, such that, during takeoff, when power drain and power demands to achieve flight and initial "lift" (e.g., achieving an airborne state from a stationary state on the ground, etc.) a fully charged VTOL battery is not primarily responsible for supplying the required takeoff "power".

Further present aspects recognize, address, and overcome previous impediments to the wide scale use and adoption of vertical takeoff and landing vehicles for cargo and personnel transport, at least with regard to the power required to achieve a useful range and time of operation per charge, and the significant energy drain realized, for example, at takeoff. That is, once a VTOL is at a selected altitude, the power required for maintaining such altitude for a flight duration is significantly less than the energy expended from a VTOL power supply (e.g., a battery, a battery pack, a battery bank, etc.) at takeoff initiation, and as the VTOL lifts to a selected operational altitude. Accordingly, attaining the selected VTOL altitude can drain a VTOL power supply.

According to further present aspects, the apparatuses, systems, and methods described herein can further incorporate electrical charging systems for the VTOLs when the VTOLs are in communication with the disclosed vertical takeoff and landing apparatuses, including the enclosed vertical takeoff and landing apparatuses. According to present aspects, the VTOLs can incorporate batteries that can be rechargeable batteries. Present aspects contemplate the recharging of the VTOL batteries when the VTOL is in contact with at least one surface of the vertical takeoff and landing apparatuses disclosed herein.

As shown in FIG. 30, present apparatuses, systems, and methods reduce power drain (e.g., power requirements) from a VTOL battery by providing supplemental power in the form of electric power in combination with a "takeoff boost" created by redirecting energy in the form of increased pressure from ground effect during takeoff within the enclosure 282 of the enclosed VTOL takeoff and landing stabilizing apparatus.

As shown in FIG. 30, and explained more fully in FIGS. 31B, 32B, and 33B (that show a VTOL "takeoff progression"), and according to present aspects VTOL 290, is shown now in a takeoff mode within enclosed VTOL takeoff and landing stabilizing apparatus 280a that comprises the elements as set forth herein and described with regard to FIG. 29, including, the presence of an electric charging element 286 having a charging element surface 286a that can incorporate electrical contacts, with electric charging element 286 in communication with an optional transformer 287 via transformer cables 287a, and with optional transformer 287 in communication with an electrical power supply 288 via electrical power supply cable 288a. According to further present aspects, enclosed VTOL takeoff and landing stabilizing apparatus 280a can comprise a control box 177 as described herein (see FIGS. 17B and 17C), with control box 177 comprising an actuator and drive mechanism in communication with retainer 289 (in FIG. 30) with the retainer configured to be actuated from a first VTOL "retaining" position to a second "releasing" position when, for example a detector that can be a pressure detector (that can, for example, reside in control box 177) detects a pressure level within at least a selected region within enclosed VTOL takeoff and landing stabilizing apparatus 280a, and a pressure-assisted VTOL release is desired. In another aspect, the control box 177 can be located remotely, or may be obviated in the case where the retainer comprises, for example, a receiver that can receive a signal from e.g., a remotely located transmitter, wireless device, etc., for the purpose of activating/releasing retainer 289 to release VTOL for takeoff.

As shown in FIG. 30, VTOL 290, can have completed a VTOL battery charging regimen and is shown in the takeoff mode with rotors engaged and with the electric charging element within enclosed VTOL takeoff and landing stabilizing apparatus 280a selected to be, or remain, in a "CHARGE/ON" mode, with electric current directed from the electrical power supply 288 to rechargeable VTOL battery supply (not shown) via the electrical contacts described herein, for purposes of delivering charge to the VTOL battery and supplemental power to the VTOL during takeoff mode such that, if desired, the enclosed VTOL takeoff and landing stabilizing apparatus 280a and not the VTOL battery is primarily or solely responsible for powering VTOL takeoff. In this aspect, a VTOL is able, during the power-intensive (e.g., power-draining) VTOL takeoff mode to ascend at least to the height of the enclosed VTOL takeoff and landing stabilizing apparatus 280a without draining or otherwise diminishing the battery charge of a VTOL during takeoff.

In addition, FIG. 30 shows the presence of a retainer 289 (e.g. equivalently referred to herein as a retaining element, latch, etc.), that can maintain a VTOL in place near the base of the enclosed VTOL takeoff and landing stabilizing apparatus 280a during an initiated takeoff, and with the rotors engaged and building pressure within the within enclosed VTOL takeoff and landing stabilizing apparatus 280a. Once a selected pressure (e.g., degree of compression, etc.) has been reached (and has, for example, been detected by, for example, a detector such as, for example, a pressure sensor, etc.), a signal can be sent from a detector to a controller that then sends a signal to an actuator of a drive mechanism in communication with the retainer 289. The actuator can then move the retainer 289 from a first position (e.g., a retaining position of engagement) with the VTOL 290 to a second position (e.g., a release position allowing the disengagement of the VTOL from the retainer), at which point the VTOL 290 commences an ascent (e.g., takeoff) within enclosed VTOL takeoff and landing stabilizing apparatus 280a. According to a present aspect, the ground effect, turbulent air rotation, recirculating air vortices, etc. are advantageously used, during VTOL takeoff mode, to create compression within a region of the enclosed VTOL takeoff and landing stabilizing apparatus 280a below the VTOL 290 to facilitate an electrical power-conserving VTOL takeoff from the enclosed VTOL takeoff and landing stabilizing apparatus 280a, by effectively creating a "boosted VTOL launch" (e.g., a pressure-assisted VTOL takeoff).

Without the benefits presented according to present aspects, during stages of VTOL takeoff and landing, VTOLs can exhibit uneven, unbalanced, and/or destabilizing pressure profiles (collectively referred to as "destabilizing pressure profiles") beneath the VTOL at takeoff and landing. These destabilizing pressure profiles can impact VTOL flight proximate to the ground, at a mid-height, and up to a full takeoff height. For example, at VTOL initial takeoff from a stationary ground position, as the rotors are driven to create required lift to overcome forces of gravity, and as the VTOL expends the energy to create the lift required to overcome forces of gravity, the pressure generated to create lift also inefficiently allows portions of the ground effect to radiate upwardly, outwardly, and unevenly, creating substantial turbulence. The upward pressure profile gradient created during the VTOL takeoff results in an uneven degree of lift provided to the VTOL. At just above ground level, at initial takeoff (TH1) without the use of present apparatuses, systems, and methods, the downward air pressure from ground effect is dissipated, with the resulting upward force available minimized as seen from the upward pressure profile shown as decreasing in amount at distances away from the center of the VTOL, leading to VTOL instability and overall energy loss during takeoff (e.g., some energy "loss" at least caused by energy expended to attain VTOL stability amidst the changing forces, etc.).

Similarly, the upward pressure profile gradient created during the VTOL takeoff at "takeoff mid-height" ($TH_2$) can also result in an uneven degree of lift provided to the VTOL, and, at a height $TH_2$ during VTOL takeoff (and without the use of present apparatuses, systems, and methods) the downward air pressure from ground effect is now greatly dissipated, with the resulting upward force available minimized.

FIGS. 31, 32, 33 illustrate pressure profiles during stages of VTOL takeoff that occur with the benefits made possible by the present apparatuses, systems, and methods, and according to present aspects. FIG. 31 shows initial takeoff with the VTOL 290 having attained an initial takeoff height equal to $TH_1$ within enclosed VTOL takeoff and landing stabilizing apparatus 280a. FIG. 32 shows takeoff at a "mid-height" with the VTOL 290 having attained a mid-height equal to $TH_2$ within enclosed VTOL takeoff and landing stabilizing apparatus 280*a*. FIG. 33 shows takeoff at a "full takeoff height" with the VTOL 290 having attained a full-height equal to $TH_3$ within enclosed VTOL takeoff and landing stabilizing apparatus 280*a*.

As shown in FIG. 31, at VTOL 290 initial takeoff from a stationary ground level position within enclosed VTOL takeoff and landing stabilizing apparatus 280*a*, as the rotors are driven to create required lift to overcome forces of gravity, and as the VTOL expends the energy to create the lift required to overcome forces of gravity, the pressure generated (below the VTOL within enclosed VTOL takeoff and landing stabilizing apparatus 280*a*) creates a significantly more efficient VTOL lift. The upward pressure profile gradient created during the VTOL takeoff is shown in FIG. 31 as the series of vertical arrows, that show a substantially even and strong degree of lift provided to the VTOL. That is, at just above ground level, at initial takeoff ($TH_1$) with the use of present apparatuses, systems, and methods, the downward air pressure from ground effect cannot dissipate, with the resulting upward force available being maximized, as represented from the substantially consistent upward pressure profile shown by arrows.

As shown in FIG. 32, the upward pressure profile gradient created during the VTOL 290 takeoff at "takeoff mid-height" ($TH_2$) within enclosed VTOL takeoff and landing stabilizing apparatus 280*a* is shown as the series of vertical arrows, showing the substantially even and strong degree of lift provided to the VTOL 290, and, at a height $TH_2$ during VTOL takeoff within enclosed VTOL takeoff and landing stabilizing apparatus 280*a*, the downward air pressure from ground effect still cannot dissipate, with the resulting upward force available being maximized, as represented from the substantially consistent upward pressure profile shown by arrows.

As shown in FIG. 33, the upward pressure profile gradient created during the VTOL attaining "full takeoff height" ($TH_3$) is shown as the series of vertical arrows, showing the substantially even and strong degree of lift provided to the VTOL 290, and, at a height $TH_3$ during VTOL takeoff, yet still within enclosed VTOL takeoff and landing stabilizing apparatus 280*a*. Here, the downward air pressure from ground effect is slightly more greatly dissipated, with the resulting upward force available further maximized, as represented from the substantially consistent upward pressure profile shown by arrows.

Accordingly, present aspects facilitate the capture and repurposing of ground effect forces that would otherwise be lost during VTOL takeoff. In addition, the present apparatuses, systems, and methods conserve considerable VTOL battery energy at VTOL takeoff by facilitating a significantly more efficient and energy-conserving VTOL takeoff, at least in terms of energy expended to achieve takeoff to a selected altitude.

According to present aspects, the enclosed VTOL takeoff and landing stabilizing apparatuses can comprise, exhibit, and be otherwise configured to have, a selected external (e.g., outward) dimensional appearance and internal dimensional appearance. An exemplary list of controlling factors for an external dimensional appearance of the present enclosed VTOL takeoff and landing stabilizing apparatuses, according to present aspects, can encompass factors including, for example, area building codes, neighborhood aesthetics, architectural blending of neighborhood, including blending architectural features pertaining to a residence, with the enclosed VTOL takeoff and landing stabilizing apparatus appearing externally to be a chimney, a garage, etc.

An exemplary list of controlling factors for an internal dimensional configuration of the present enclosed VTOL takeoff and landing stabilizing apparatuses, according to present aspects, can encompass factors including, for example, dimension of VTOL expected to gain access to the enclosed VTOL takeoff and landing stabilizing apparatuses, the internal dimensions selected to maximize pressurization for pressure assisted takeoff, etc.

FIGS. 34A, 34B, 35A, 35B, 36A, 36B, 37A-37C, 38A-38C, 39A-39C, 40A-40C, 41A-41B, 42A-42B, and 43A-43B illustrate exemplary dimensional configurations of an enclosed VTOL takeoff and landing stabilizing apparatus, according to further present aspects, with enclosed VTOL takeoff and landing stabilizing apparatuses shown in simplified form to focus on the versatility of interior and exterior dimensions (e.g., including "shape" and comparative architectural blending, etc.), with the apparatuses shown in these FIGS. understood to comprise the elements shown in other FIGS., (e.g., guides, guide channels, vertically-oriented support elements, frame components including frame supports, electric charging elements, power supply, male or female first cooperating stabilizer elements, etc.), but that may not be specifically shown in these FIGS. Accordingly, in FIGS. 34A, 34B, 35, 36, 37A-37C, 38A-38C, 39A-39C, 40A-40C, 41A-41B, 42A-42B, and 43A-43B, the VTOLs shown associated with the enclosed VTOL takeoff and landing stabilizing apparatus may not show all the elements of VTOLs according to disclosed aspects herein (e.g., outwardly extending standoffs with male or female second cooperating stabilizer elements, etc.).

According to present aspects, the enclosed VTOL takeoff and landing stabilizing apparatus selected can be any shape, configuration, and dimension to accommodate the dimension, configuration, aerial profile, etc. of a selected VTOL. The selected VTOL is understood as potentially comprising propellers having a length longer than, shorter than or equivalent to the body or the payload of the VTOL. In addition, the VTOL selected can comprise single mono-rotor or multi-rotor platform, including stacked rotors, with the VTOL "platform" (referred to equivalently herein as the "VTOL body") being small (e.g., drone-sized for example, for package delivery) or larger (e.g., a crewed or uncrewed airborne vehicle for personnel/passenger transport).

FIGS. 34A and 34B show a further present aspect with enclosed VTOL takeoff and landing stabilizing apparatus 300 comprising a substantially rectangular (e.g., square, flat-sided, etc.) internal and external cross-sectional configuration taken along the length of the enclosed VTOL takeoff and landing stabilizing apparatus 300 that further comprises an enclosed VTOL takeoff and landing stabilizing apparatus first surface 300*a* (referred to equivalently herein as the enclosed VTOL takeoff and landing stabilizing apparatus "outer surface"), and an enclosed VTOL takeoff and landing stabilizing apparatus second surface 300*b* (referred to equivalently herein as the enclosed VTOL takeoff and landing stabilizing apparatus "inner" surface). VTOL 302 is shown present within the enclosed VTOL takeoff and landing stabilizing apparatus 300.

FIG. 34B is an overhead view of the enclosed VTOL takeoff and landing stabilizing apparatus 300 showing the contained exemplary VTOL 302 comprising (four) "quad-rotors", with the VTOL dimensioned and otherwise configured to land into and takeoff from the enclosed VTOL takeoff and landing stabilizing apparatus 300.

FIGS. 35 and 36 illustrate present aspects where the enclosed VTOL takeoff and landing stabilizing apparatus can further comprise an additional outer sleeve or other housing structure (equivalently referred to herein as a housing) that surrounds the stabilizing apparatus for aesthetic or other purposes. FIG. 35 shows an enclosed VTOL takeoff and landing stabilizing apparatus 310 comprising a substantially tubular (e.g., round) internal and external cross-sectional configuration taken along the length of the enclosed VTOL takeoff and landing stabilizing apparatus 310 comprising an enclosed VTOL takeoff and landing stabilizing apparatus first surface 310a (referred to equivalently herein as the enclosed VTOL takeoff and landing stabilizing apparatus "outer surface"), and an enclosed VTOL takeoff and landing stabilizing apparatus second surface 310b (referred to equivalently herein as the enclosed VTOL takeoff and landing stabilizing apparatus "inner" surface). FIG. 35 further show the enclosed VTOL takeoff and landing stabilizing apparatus 310 comprising a housing 312 (dimensioned to be a flat-sided or "square" configuration) surrounding the enclosed VTOL takeoff and landing stabilizing apparatus 310, with the housing 312 comprising a housing first (outer) surface 312a and a housing second (inner) surface 312b.

FIG. 36 is an overhead view of the enclosed VTOL takeoff and landing stabilizing apparatus 310 showing the contained exemplary VTOL 302 comprising (four) "quad-rotors", with the VTOL dimensioned and otherwise configured to land into and takeoff from the enclosed VTOL takeoff and landing stabilizing apparatus 310.

FIGS. 37A-37C, 38A-38C, 39A-39C, and 40A-40C are overhead views of exemplary and varying VTOL rotor configurations for use with the VTOLs according to present aspects. Rotor configuration includes the number of rotors present, the direction of the rotors with respect to one another (e.g., the clockwise or counterclockwise rotation of a particular rotor), etc. VTOL rotor configurations can include, according to present aspects, two rotors (a "bi-rotor"), three rotors (a "tri-rotor"), four rotors (a "quad-rotor"), 5 rotors (a "penta-rotor") or a greater number of rotors (a "poly-rotor"). In addition, the multiple VTOL rotor configurations can further include stacked rotor configurations, where multiple rotors are positioned in vertical alignment such that each rotor in a stacked rotor configuration rotates about the same point.

In addition, according to present aspects, the longitudinal body of an enclosed VTOL takeoff and landing stabilizing apparatus (otherwise referred to as the "chute") can vary with respect to the geometric cross-section along the length of the apparatus. FIGS. 37A-37C, 38A-38C, 39A-39C, and 40A-40C show exemplary and varying enclosed VTOL takeoff and landing stabilizing apparatus geometric configurations, where the geometry of the apparatuses are circular, rectangular, triangular, pentagonal, with other geometrical configurations possible (e.g., polygonal, etc.), but not shown.

According to present aspects, FIGS. 37A-37C respectively show exemplary overhead views of a bi-rotor VTOL 322; a tri-rotor VTOL 324; and a quad-rotor VTOL 326 housed within an enclosed VTOL takeoff and landing stabilizing apparatus 320 having a longitudinally cylindrical geometric configuration resulting in a circular cross-section. Arrows on rotors 321 indicate operational direction of a particular rotor, according to present aspects. However additional aspects include other operational directions and configurations (not shown).

According to further present aspects, FIGS. 38A-38C respectively show exemplary overhead views of a bi-rotor VTOL 322; a tri-rotor VTOL 324; and a quad-rotor VTOL 326 housed within an enclosed VTOL takeoff and landing stabilizing apparatus 330 having a longitudinally flat-sided and four-sided rectangular geometric configuration resulting in a square cross-section.

According to present aspects, FIGS. 39A-39C respectively show exemplary overhead views of a bi-rotor VTOL 322; a tri-rotor VTOL 324; and a quad-rotor VTOL 326 housed within an enclosed VTOL takeoff and landing stabilizing apparatus 340 having a longitudinally flat-sided and three-sided geometric configuration resulting in a triangular cross-section.

According to present aspects, FIGS. 40A-40C respectively show exemplary overhead views of a bi-rotor VTOL 322; a tri-rotor VTOL 324; and a quad-rotor VTOL 326 housed within an enclosed VTOL takeoff and landing stabilizing apparatus 350 having a longitudinally flat-sided and five-sided geometric configuration resulting in a pentagonal cross-section.

According to present aspects, the width or diameter of the open end of the present VTOL takeoff and landing stabilizing apparatuses (equivalently referred to herein as a VTOL takeoff and landing stabilizing apparatus second end) is dimensioned to accept a VTOL (e.g., an unmanned VTOL for, for example package delivery and/or a manned VTOL vehicle for personnel transport, etc.). If VTOL is delivering a package, the package profile or "footprint" (that can be a lateral or horizontal width or diameter) may exceed the "footprint" of the VTOL. In such cases, to effect package delivery, the width or diameter of the open end of the present VTOL takeoff and landing stabilizing apparatus will exceed a package or payload diameter or width. In addition, when the VTOL "footprint" is the limiting factor for entry into the present apparatuses (e.g., where the VTOL "footprint" exceeds the package "footprint", etc.), it is understood that the width or diameter of the open end of the present VTOL takeoff and landing stabilizing apparatus will exceed the width, or horizontal "footprint" of the VTOL.

FIGS. 41A (perspective view) and 41B (overhead view) illustrate a square package 327 delivered via a landed VTOL 326 into a present VTOL takeoff and landing stabilizing apparatus 320, with the apparatus 320 having a cylindrical or tubular configuration made possible as the diameter of the open end of the present VTOL takeoff and landing stabilizing apparatus 320 exceeds the "footprint" of the package 327 (e.g., VTOL payload, etc.) and also exceeds the "footprint" of the VTOL 326.

FIGS. 42A (perspective view) and 42B (overhead view) illustrate VTOL 326 landing into a present VTOL takeoff and landing stabilizing apparatus 320, with the apparatus 320 having a cylindrical or tubular configuration made possible as the diameter of the open end of the present VTOL takeoff and landing stabilizing apparatus exceeds the "footprint" of the VTOL 326.

According to further present aspects, stabilizing aspects of the disclosed VTOL takeoff and landing stabilizing apparatuses can be further enhanced by reducing the "dead" or unused space within the VTOL takeoff and landing stabilizing apparatus relative to the dimension of the VTOLs that are envisioned for use with the VTOL takeoff and landing stabilizing apparatuses. That is, while present aspects contemplate VTOL takeoff and landing stabilizing apparatuses dimensioned to launch, and accept for landing, VTOLs having a variety of dimensions, it is recognized that, when a VTOL "footprint" is small, the space between the VTOL and the inner walls of the VTOL takeoff and landing stabilizing apparatus may be considerable (e.g., space between an edge of the VTOL body or VTOL rotor guard, for example, being several inches, or even a foot or more, etc.). Such arrangement where a VTOL takeoff and landing stabilizing apparatus can be dimensioned to accept a wide variety of VTOL dimensions may be desirable and contribute to the versatility of the present apparatuses, systems, and methods.

In addition, present aspects contemplate VTOL takeoff and landing stabilizing apparatuses dimensioned internally to accept VTOL types that are dimensioned to closely match the inner dimension of a VTOL takeoff and landing stabilizing apparatus. In other words, according to present aspects, VTOL takeoff and landing stabilizing apparatuses can be internally dimensioned to only accept a customized VTOL, or a particular VTOL type, with the VTOL "footprint" dimensioned to "fit" more precisely within the VTOL takeoff and landing stabilizing apparatus. In such a contemplated configuration, a significant amount or area of "dead" space between the VTOL and the inner surface of a VTOL takeoff and landing stabilizing apparatus is intentionally obviated.

FIGS. 43A (perspective view) and 43B (overhead view) illustrate VTOL 364 having a specified "footprint" that will more closely "match" the "footprint" of internal regions of the VTOL takeoff and landing stabilizing apparatus 360, with VTOL takeoff and landing stabilizing apparatus 360 shown as having an elliptical cross-sectional dimension. According to present aspects, the inner dimension or "footprint" of the VTOL takeoff and landing stabilizing apparatus 360 is altered by, for example, installing an insert 362 or otherwise fabricating the VTOL takeoff and landing stabilizing apparatus 360 to have internal dimensions that more closely match the outline or footprint perimeter of the VTOL associated for takeoff from and landing into VTOL takeoff and landing stabilizing apparatus 364. According to further aspects, the reduction of the inner "free" area within VTOL takeoff and landing stabilizing apparatus 360 is advantageous during the pressurized takeoff procedures disclosed herein, as the energy required to accumulate pressure within VTOL takeoff and landing stabilizing apparatus 360 to assist in the VTOL takeoff is reduced, and the power required to produce the pressure is also reduced, resulting in, at least, enhanced system efficiency.

FIGS. 44, 45, 46, and 47 are flowcharts outlining methods according to present aspects. According to present aspects, and as shown in FIG. 44, a method 3000 is outlined for launching (e.g., a takeoff) and landing a vertical takeoff and landing vehicle, with the method 3000 including providing 3002 an at least partially enclosed vertical takeoff and landing apparatus, with the apparatus comprising at least one vertically-oriented support element, with the at least one vertically-oriented support element having a vertically-oriented support element first end and a vertically-oriented support element second end, with the vertically-oriented support element first end proximate to a base, with the vertically-oriented support element extending from the vertically-oriented support element first end to the vertically-oriented support element second end, with the vertically-oriented support element second end located at a selected distance away from the first end, with the vertically-oriented support element comprising a first cooperating stabilizer element, and with the first cooperating stabilizer element located proximate to the second end. The at least partially enclosed vertical takeoff and landing apparatus further comprises an enclosure, with the enclosure dimensioned to substantially surround the at least one vertically-oriented support element, and further comprises an electric charging element, with the electric charging element in communication with a power supply, and with the electric charging element further comprising at least one charging element contact that can be a charging element surface.

As shown in FIG. 44, the method 3000 further includes providing 3004 a vertical takeoff and landing vehicle, with the vertical takeoff and landing vehicle comprising at least one second cooperating stabilizer element, with the second cooperating stabilizer element dimensioned to engage with the first cooperating stabilizer element, and engaging the first cooperating stabilizer element of the vertically-oriented support element with the second cooperating stabilizer element of the vertical takeoff and landing vehicle. The VTOL further comprises a rechargeable battery, at least one vehicle electrical contact in communication with the rechargeable battery, and with the at least one vehicle electrical contact configured to engage the charging element charging contact.

Method 3000 further comprises engaging 3006 the first cooperating stabilizer element of the vertically-oriented support element with the second cooperating stabilizer element of the VTOL, and delivering 3008 an electric charge from the electric charging element to the VTOL.

FIG. 45 is a flowchart outlining a present method 3100 comprising elements of the method 3000 for launching and landing a vertical takeoff and landing vehicle as set forth in FIG. 44, with the method 3100 further comprising commencing 3102 a takeoff protocol by initiating vertical takeoff and landing vehicle rotor movement, restricting 3104 vertical movement of the vertical takeoff and landing vehicle within the enclosure, and increasing 3106 air pressure within the enclosure prior to vertical takeoff and landing vehicle takeoff.

FIG. 46 is a flowchart outlining a present method 3200 comprising elements of the methods 3000, 3100 for launching and landing a vertical takeoff and landing vehicle as set forth in FIGS. 44 and 45, with the method 3200 further comprising detecting 3202 air pressure in at least a region of the enclosure, and releasing 3204 the vertical takeoff and landing vehicle for takeoff at a selected enclosure internal pressure.

FIG. 47 is a flowchart outlining a present method 3300 comprising elements of the methods 3000, 3100, 3200 for launching and landing a vertical takeoff and landing vehicle as set forth in FIGS. 44, 45, 46 with the method 3300 further comprising maintaining 3302 contact of the at least one vehicle electrical contact with the charging element charging contact during takeoff, and optionally including powering 3304 the VTOL takeoff from at least one of an electric charging element and charging surfaces (e.g., electric charging contacts).

The presented aspects can, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A method for stabilizing takeoff and landing of a vertical takeoff and landing vehicle, the method comprising:
    providing an at least partially enclosed vertical takeoff and landing
       stabilizing apparatus, the at least partially enclosed vertical takeoff and landing stabilizing apparatus comprising;
       at least one vertically-oriented support element, said at least one vertically-oriented support element comprising a vertically-oriented support first end and a vertically-oriented support second end, said vertically-oriented support first end located proximate to a base, said at least one vertically-oriented support element extending from the vertically-oriented support first end to the vertically-oriented support second end, said vertically-oriented support second end located at a selected distance away from the vertically-oriented support first end, said at least one vertically-oriented support element comprising a first cooperating stabilizer element, said first cooperating stabilizer element located proximate to the vertically-oriented support second end;

an enclosure comprising an enclosure inner surface, said enclosure dimensioned to substantially surround the at least one vertically-oriented support element, said enclosure further comprising at least one moveable panel, said at least one moveable panel configured to have a range of motion between an open position and a closed position;

an electric charging element, said electric charging element in communication with a power supply, said electric charging element comprising at least one charging element charging surface;

providing a vertical takeoff and landing vehicle, said vertical takeoff and landing vehicle comprising at least one second cooperating stabilizer element, said at least one second cooperating stabilizer element dimensioned to engage with the first cooperating stabilizer element, said vertical takeoff and landing vehicle further comprising:

a rechargeable battery;

at least one vehicle electrical contact in communication with the rechargeable battery, said at least one vehicle electrical contact configured to engage the electric charging element;

engaging the first cooperating stabilizer element of the at least one vertically-oriented support element with the at least one second cooperating stabilizer element of the vertical takeoff and landing vehicle;

delivering an electric charge from the electric charging element to the vertical takeoff and landing vehicle;

commencing a takeoff protocol by initiating vertical takeoff and landing vehicle rotor movement;

restricting vertical movement of the vertical takeoff and landing vehicle within the enclosure; and increasing an air pressure within the enclosure prior to vertical takeoff and landing vehicle takeoff with said at least one moveable panel set in the closed position.

2. The method of claim 1, wherein the at least one moveable panel is proximate to the base.

3. The method of claim 1, further comprising:
detecting an air pressure in at least a region of the enclosure; and
releasing the vertical takeoff and landing vehicle for the takeoff at a selected enclosure internal pressure.

4. The method of claim 1, further comprising;
maintaining contact of the at least one vehicle electrical contact with the at least one charging element charging surface during the takeoff.

5. The method of claim 1, further comprising;
maintaining contact of the at least one vehicle electrical contact with the at least one charging element charging surface during the takeoff until the vertical takeoff and landing vehicle exits the enclosure.

6. The method of claim 1, further comprising;
powering the vertical takeoff and landing vehicle from the electric charging element.

7. The method of claim 1 further comprising:
stabilizing at least horizontally the vertical takeoff and landing vehicle during at least one of the takeoff and landing.

8. The method of claim 1 further comprising:
restricting at least angular movement of the vertical takeoff and landing vehicle during the takeoff and landing of the vertical takeoff and landing vehicle.

9. The method of claim 1, wherein the enclosure is in direct communication with the at least one vertically-oriented support element.

10. The method of claim 1, wherein said enclosure further comprises a frame comprising the at least one vertically-oriented support element.

11. The method of claim 1, wherein said vertically-oriented support first end is attached to the base, wherein said selected distance between the vertically-oriented support second end and the vertically-oriented support first end ranges from about 10 ft. to about 100 ft.

12. The method of claim 1, wherein said first cooperating stabilizer element comprises at least one of a male attachment portion, and a female attachment portion.

13. The method of claim 1, wherein said at least one second cooperating stabilizer element comprises at least one of a male attachment portion and a female attachment portion.

14. The method of claim 1, wherein said first cooperating stabilizer element comprises a standoff element, said standoff element configured to extend outwardly from the at least one vertically-oriented support element, said standoff element further configured to engage the at least one second cooperating stabilizer element.

15. The method of claim 1, wherein said at least one second cooperating stabilizer element comprising a vehicle standoff element, said vehicle standoff element configured to engage the first cooperating stabilizer element.

16. The method of claim 1, wherein the at least one second cooperating stabilizer element is configured to extend outwardly from a vertical takeoff and landing vehicle structure.

17. The method of claim 1, wherein the vertical takeoff and landing vehicle is a rotorcraft.

18. The method of claim 15, wherein the vehicle standoff element is configured to extend outwardly from a vertical takeoff and landing vehicle rotor guard.

19. The method of claim 15, wherein the vehicle standoff element is integral with the vertical takeoff and landing vehicle.

20. The method of claim 18, wherein the vehicle standoff element is integral with the vertical takeoff and landing vehicle rotor guard.

* * * * *